(12) United States Patent
Schrock et al.

(10) Patent No.: US 9,315,604 B2
(45) Date of Patent: Apr. 19, 2016

(54) METATHESIS CATALYSTS AND METHODS THEREOF

(71) Applicant: Massachusetts Institute of Technology, Cambridge, MA (US)

(72) Inventors: Richard Royce Schrock, Winchester, MA (US); Jian Yuan, Albany, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/248,712

(22) Filed: Apr. 9, 2014

(65) Prior Publication Data

US 2014/0309388 A1   Oct. 16, 2014

Related U.S. Application Data

(60) Provisional application No. 61/810,164, filed on Apr. 9, 2013.

(51) Int. Cl.
*C07F 11/00* (2006.01)
*C08F 132/08* (2006.01)
*C08G 61/08* (2006.01)
*B01J 31/34* (2006.01)

(52) U.S. Cl.
CPC .............. *C08F 132/08* (2013.01); *C08G 61/08* (2013.01); *B01J 31/34* (2013.01); *C08G 2261/21* (2013.01); *C08G 2261/3324* (2013.01); *C08G 2261/3325* (2013.01); *C08G 2261/418* (2013.01)

(58) Field of Classification Search
CPC .......... B01J 31/36; B01J 31/236; B01J 31/34; B01J 31/32; B01J 31/22; B01J 31/2204; C07F 11/00

USPC ........................................ 556/58, 57; 502/152
See application file for complete search history.

(56) References Cited

U.S. PATENT DOCUMENTS

| 6,121,473 | A | 9/2000 | Schrock et al. |
| 7,932,397 | B2 | 4/2011 | Hock et al. |
| 8,222,469 | B2 | 7/2012 | Schrock et al. |
| 8,350,073 | B2 | 1/2013 | Hock et al. |

(Continued)

FOREIGN PATENT DOCUMENTS

| WO | WO-2009/094201 A2 | 7/2009 |
| WO | WO-2011/008258 A2 | 1/2011 |

(Continued)

OTHER PUBLICATIONS

Yuan et al. Organometallics, 2013, 32, 2983-2992.*

(Continued)

*Primary Examiner* — Rip A Lee
(74) *Attorney, Agent, or Firm* — Stoel Rives LLP

(57) ABSTRACT

The present application provides, among other things, novel compounds for metathesis reactions, and methods for preparing and using provided compounds. In some embodiments, the present invention provides compounds having the structure of formula I or II. In some embodiments, the present invention provides methods for preparing a compound of formula I or II. In some embodiments, the present invention provides methods for using a provided compound. In some embodiments, a provided compound is useful for stereoselective ring-opening metathesis polymerization. In some embodiments, a provided metathesis method provides cis and/or isotactic polymers.

33 Claims, 11 Drawing Sheets

(56) References Cited

U.S. PATENT DOCUMENTS

| | | | |
|---|---|---|---|
| 8,362,311 B2 | 1/2013 | Schrock et al. | |
| 8,546,500 B2 | 10/2013 | Hoveyda et al. | |
| 8,598,400 B2 * | 12/2013 | Hoveyda | C07D 209/48 548/473 |
| 8,829,219 B2 | 9/2014 | Hock et al. | |
| 9,073,801 B2 * | 7/2015 | Hoveyda | C07D 313/00 540/451 |
| 9,079,173 B2 | 7/2015 | Schrock et al. | |
| 9,085,595 B2 | 7/2015 | Schrock et al. | |
| 2011/0015430 A1 | 1/2011 | Schrock et al. | |
| 2011/0065915 A1 | 3/2011 | Malcolmson et al. | |
| 2011/0077421 A1 | 3/2011 | Schrock et al. | |
| 2011/0237815 A1 | 9/2011 | Hock et al. | |
| 2011/0245477 A1 | 10/2011 | Hoveyda et al. | |
| 2012/0302710 A1 | 11/2012 | Hoveyda et al. | |
| 2012/0323000 A1 * | 12/2012 | Hoveyda | C07D 313/00 540/452 |
| 2013/0116434 A1 | 5/2013 | Schrock et al. | |
| 2013/0274482 A1 | 10/2013 | Schrock et al. | |
| 2013/0281706 A1 | 10/2013 | Hock et al. | |
| 2014/0309388 A1 * | 10/2014 | Schrock et al. | 526/170 |
| 2014/0316088 A1 | 10/2014 | Schrock et al. | |
| 2014/0330018 A1 | 11/2014 | Czirok et al. | |
| 2014/0378634 A1 | 12/2014 | Kol et al. | |
| 2014/0378637 A1 * | 12/2014 | Schrock | C08F 132/08 526/283 |
| 2015/0065723 A1 | 3/2015 | Hock et al. | |
| 2015/0240008 A1 * | 8/2015 | Schrock | C07F 11/00 525/332.1 |
| 2015/0246348 A1 | 9/2015 | Hoveyda et al. | |

FOREIGN PATENT DOCUMENTS

| | | | |
|---|---|---|---|
| WO | WO-2011/040963 A1 | 4/2011 | |
| WO | WO-2011/097642 A1 | 8/2011 | |
| WO | WO-2012/167171 A2 | 12/2012 | |
| WO | WO-2013/070725 A1 | 5/2013 | |
| WO | WO-2014/169014 A1 | 10/2014 | |
| WO | WO-2014/172534 A1 | 10/2014 | |
| WO | WO-2015/127192 A1 | 8/2015 | |

OTHER PUBLICATIONS

Yuan et al. Organometallics 2012, 31, 4650-4653.*
Marinescu et al. Organometallics 2011, 30, 1780-1782.*
Yuan et al. Adv. Synth. Catal. 2011, 353, 1985-1992.*
Yuan et al. Organometallics 2013, 32, 2983-2992.*
Reithofer, M.R.; Dobreiner, G.E.; Schrock, R.R.; Muller, P. Organometallcs 2013, 32, 2489-2492.*
Marinescu, S.C.; Schrock, R.R.; Muller, P.; Takase, M.K.; Hoyveda, A.H. Organometallics 2011, 30, 1780-1782.*
Yuan, J.; Tonwsend, E.M.; Schrock, R.R.; Goldman, A.S.; Muller, P.; Takase, M.K. Adv. Synth. Catal. 2011, 353,1985-1992.*
Addison, A.W. et al., Synthesis, structure, and spectroscopic properties of copper(II) compounds containing nitrogen-sulphur donor ligands; the crystal and molecular structure of aqua[1,7-bis(N-methylbenzimidazol-2'-yl)-2,6-dithiaheptane]copper(II) perchlorate, J. Chem. Soc., Dalton Trans., 1349-1356 (1984).
Bailey, B.C. et al., Evaluation of Molybdenum and Tungsten Metathesis Catalysts for Homogeneous Tandem Alkane Metathesis, Organometallics, 28:355-360 (2009).
Bencze, N. et al., Chemical transformations of cis-W(CO)4(C5H5N)2 in the ring-opening metathesis polymerization of norbornene, Can. J. Chem., 82:499-503 (2004).
Binger, P. et al., Vinylcarbene Complexes of Titanocene, Angew. Chem. Int. Ed. Engl., 28(5):610-611 (1989).
Churchill et al., X-Ray Crystallographic Studies on Octahedral Oxo Alkylidene Complexes of Tungsten VI: (W=O)(=CHCMe3)(PMe3)2 Cl2 and W(=O)(=CHCMe3)(PEt3)2Cl2, Journal of Organometallic Chemistry, 204:C17-C20 (1981).
Dabrowski, M. et al., (2-Meth-oxy-1, 3-phenyl-ene)diboronic acid, Acta Crystallogr Sect E Struct Rep Online, 64(Pt 2):0414-0415 (2008).

De La Mata, F.J. And Grubbs, R.H., Synthesis and Reactions of Tungsten Oxo Vinylalkylidene Complexes: Reactions of $WCl_2(O)(PX_3)$ (X = OMe, R) Precursors with 3,3-Diphenylcyclopropene, Organometallics, 15(2):577-584 (1996).
Flook et al., Z-selective olefin metathesis processes catalyzed by a molybdenum hexaisopropylterphenoxide monopyrrolide complex, J. Am. Chem. Soc., 131(23):7962-3 (2009).
Flook, M. M., et al. Z-Selective and Syndioselective Ring-Opening Metathesis Polymerization (ROMP) Inititated by Monoaryloxidepyrrolide (MAP) Catalysts. Macromolecule.43, 7515-7522 (2010).
Flook, M. M., et al., Synthesis of cis, syndiotactic ROMP Polymers Containing Alternating Enantiomers, J. Am. Chem. Soc.133:1784-6 (2011).
Flook, M.M. et al., Five-Coordinate Rearrangements of Metal-lacyclobutane Intermediates during Ring-Opening Metathesis Polymerization of 2,3-Dicarboalkoxynorbornenes by Molybdenum and Tungsten Monoalkoxide Pyrrolide Initiators Organometallics, 31(17):6231-6243 (2012).
Fox, H. H. et al., Simple, high yield syntheses of molybdenum(VI) bis(imido) complexes of the type Mo(NR)2Cl2(1,2-dimethoxyethane), Inorg. Chem., 31(11):2287-2289 (1992).
Goldman, AS et al, Catalytic alkane metathesis by tandem alkane dehydrogenation-olefin metathesis, Science, 312(5771):257-261 (2006).
Grubbs, R.H., Olefin-metathesis catalysts for the preparation of molecules and materials (Nobel Lecture), Angew Chem. Int. Ed. Engl., 45(23):3760-5 (2006).
Hirsekorn, K.F. et al., Thermodynamics, kinetics, and mechanism of (silox)3M(olefin) to (silox)3M(alkylidene) rearrangements (silox = tBu3SiO; M = Nb, Ta), J. Am. Chem. Soc., 127(13):4809-30 (2005).
Hock, A.S. et al., Dipyrrolyl Precursors to Blsalkaxoide Molybdenum Olefin Metathesis Catalysts, J. Am. Chem. Soc., 128:16373-16375 (2008).
Ibrahem et al., Highly Z- and enantioselective ring-opening/cross-metathesis reactions catalyzed by stereogenic-at-Mo adamantylimido complexes, J. Am. Chem Soc., 131(11):3844-5 (2009).
International Search Report for PCT/US12/63898, 3 pages (Jan. 28, 2013).
International Search Report for PCT/US2014/033450, 4 pages (Aug. 28, 2014).
Ivin, K.J. et al., The $^{13}$C NMR spectra of poly(1-pentenylene) and poly(1,3-cyclopentylenevinylene), Die Makromolekulare Chemie, 178(5):1545-1560 (1977).
Javier De La Mata, F., Synthesis and characterization of tungsten oxo alkylidene complexes via the reaction of WCl2(O)[PX3]3 (PX3=P (OMe)3, PMe2Ph, PMePh2) with 4,8-dioxaspiro[2,5]oct-1-ene (ketalcyclopropene), Journal of Organometallic Chemistry, 525:183-189 (1996).
Jiang et al., Fundamental studies of tungsten alkylidene imido monoalkoxidepyrrolide complexes. J Am Chem Soc.131(22):7770-80 (2009).
Jiang et al., Highly Z-selective metathesis homocoupling of terminal olefins, J Am Chem Soc. 131(46):16630-1 (2009).
Jiang, A. J. et al., Cationic Molybdenum Imido Alkylidene Complexes, Organometallics, 27, 4428-4438 (2008).
Johnson, L.K. et al., Synthesis of tungsten vinyl alkylidene complexes via the reactions of WCl2(NAr)(PX3)3 (X = R, OMe) precursors with 3,3-disubstituted cyclopropenes, J. Am. Chem. Soc., 115(18):8130-8145 (1993).
Marinescu et al., Inversion of configuration at the metal in diastereomeric imido alkylidene monoaryloxide monopyrrolide complexes of molybdenum. J Am Chem Soc.131 (1):58-9 (2009).
Marinescu et al., Syntheses of Variations of Stereogenic-at-Metal Imido Alkylidene Complexes of Molybdenum, Organometallics, 31: 6336-6343 (2012).
Marinescu, S. C., et al., Room-Temperature Z-Selective Homocoupling of α-Olefins by Tungsten Catalysts. Organometallics. 30, 1780-1782 (2011).
Marinescu, S. C., et al., Syntheses and Structures of Molybdenum Imido Alkylidene Pyrrolide and Indolide Complexes. Organometallics. 27, 6570-6578 (2008).

(56) References Cited

OTHER PUBLICATIONS

Marinescu, S.C. et al., Simple Molybdenum(IV) Olefin Complexes of the Type Mo(NR)(X)(Y)(olefin), Organometallics, 29(24):6816-6828 (2010).

McConville, D.H. et al., Synthesis of chiral molybdenum ROMP initiators and all-cis highly tactic poly(2,3-(R)2norbornadiene) (R = $CF_3$ or $CO_2Me$), J. Am. Chem. Soc., 115(10): 4413-4414 (1993).

Meek, S. J., et al., Catalytic Z-selective olefin cross-metathesis for natural product synthesis, Nature 471:461-466 (2011).

Müller, P., Practical suggestions for better crystal structures, Crystallography Reviews, 15(1):57-83 (2009).

Nguyen, S.T. et al., Ring-opening metathesis polymerization (ROMP) of norbornene by a Group VIII carbene complex in protic media J. Am. Chem. Soc., 114(10):3974-3975 (1992).

O'Donoghue et al., Preparation of Well-Defined, Metathetically Active Oxo Alkylidene Complexes of Tungsten, Organometallics, 15:1334-1336 (1996).

Peryshkov, D. et al., Synthesis of Tungsten Oxo Alkylidene Complexes, Organometallics, 7278-7286 (2012).

Peryshkov, D. V., et al., Z-Selective Olefin Metathesis Reaction Promoted by Tungsten Oxo Alkylidene Comlexes. J. Am. Chem. Soc. 133, 20754-20757 (2011).

Rappe, A.K. et al., Olefin metathesis. A mechanistic study of high-valent group 6 catalysts, JACS, 104:448-456 (1982).

Schrock, R.R. et al. Synthesis of stereoregular ROMP polymers using molybdenum and tungsten imido alkylidene initiators, Dalton Trans., 40(29):7484-95 (2011).

Schrock, R.R. et al., Catalytic homologation of vinyltributylstannane to allyltributylstannane by Mo(IV) complexes in the presence of ethylene, J. Am. Chem. Soc., 126(7):1948-9 (2004).

Schrock, R.R. et al., Olefin Metathesis Reactions Initiated by d2 Molybdenum; or Tungsten Complexes, Organometallics, 24:5211-5213 (2005).

Schrock, R.R. et al., Recent advances in olefin metathesis by molybdenum and tungsten imido alkylidene complexes, Journal of Molecular Catalysis A: Chemical 213:21-30 (2004).

Schrock, R.R., Multiple metal-carbon bonds for catalytic metathesis reactions (Nobel Lecture), Angew Chem. Int. Ed. Engl., 45(23):3748-59 (2006).

Schrock, Recent advances in high oxidation state Mo and W imido alkylidene chemistry, Chem. Rev., 109(8):3211-26 (2009).

Sheldrick, G.M, Phase annealing in *SHELX*-90: direct methods for larger structures, Acta Crystallographica, A46:467-473 (1990).

Sheldrick, GM et al., A short history of SHELX, Acta Crystallographica A., 64(Pt 1):112-22 (2008).

Siaj, M. et al., Preparation and olefin-metathesis activity of cyclopentylidene-oxo initiator sites on a molybdenum carbide surface, Journal of Organometallic Chemistry, 691:5497-5504 (2006).

Singh, R., Cyclopropene Polymerization and Enyne Metathesis Catalyzed by High Oxidation State Molybdenum Alkylidenes, PhD Thesis, Massachusetts Institute of Technology (2008), downloaded from DSpace@MIT, <http://dspace.mit.edu/handle/1721.1/43771#files-area> [last accessed Mar. 25, 2015].

Townsend, E.M. et al., Z-selective metathesis homocoupling of 1,3-dienes by molybdenum and tungsten monoaryloxide pyrrolide (MAP) complexes, J. Am. Chem. Soc., 134(28):11334-7 (2012).

Tsang, W.C.P. et al., Investigations of Reactions between Chiral Molybdenum Imido Alkylidene Complexes and Ethylene:? Observation of Unsolvated Base-Free Methylene Complexes, Metalacyclobutane and Metalacyclopentane Complexes, and Molybdenum(IV) Olefin Complexes, Organometallics, 23(9):1997-2007 (2004).

Vorozhtsov, N. et al., Zhurnal Obshchei Khimii, 37:1225-1227 (1967).

Wang, C. et al., Efficient and selective formation of macrocyclic disubstituted Z alkenes by ring-closing metathesis (RCM) reactions catalyzed by Mo- or W-based monoaryloxide pyrrolide (MAP) complexes: applications to total syntheses of epilachnene, yuzu lactone, ambrettolide, epothilone C, and nakadomarin A, Chemistry, 19(8):2726-40 (2013).

Wang, C. et al., Molybdenum-based complexes with two aryloxides and a pentafluoroimido ligand: catalysts for efficient Z-selective synthesis of a macrocyclic trisubstituted alkene by ring-closing metathesis, Angew Chem. Int. Ed. Engl., 52(7):1939-43 (2013).

Written Opinion for PCT/US12/63898, 4 pages (Jan. 28, 2013).

Written Opinion of PCT/US2014/033450, 5 pages (Aug. 28, 2014).

Yu, M., et al., Enol Ethers as Substrates for Efficient Z- and Enantioselective RingOpening/Cross-Metathesis Reactions Promoted by Stereogenic-at-Mo Complexes: Utility in Chemical Synthesis and Mechanistic Attributes. J. Am. Chem. Soc.134, 2788-2799 (2012).

Yuan, J. et al., Pentafluorophenylimido Alkylidene Complexes of Molybdenum and Tungsten, Organometallics, 31: 4650-4653 (2012).

Yuan, J. et al., Synthesis and ROMP Chemistry of Decafluoroterphenoxide Molybdenum Imido Alkylidene and Ethylene Complexes, Organometallics, 32:2983-2992 (2013).

* cited by examiner

METATHESIS CATALYSTS AND METHODS THEREOF

CROSS-REFERENCE TO RELATED APPLICATIONS

The present invention claims priority to U.S. Provisional Application Ser. No. 61/810,164, filed Apr. 9, 2013, the entirety of which is incorporated herein by reference.

STATEMENT REGARDING FEDERALLY SPONSORED RESEARCH OR DEVELOPMENT

This invention was made with government support under Grant No. DE-FG02-86ER13564 awarded by the Department of Energy and under Grant No. CHE1111133 awarded by the National Science Foundation. The government has certain rights in the invention.

FIELD OF THE INVENTION

The present invention generally relates to metathesis reactions.

BACKGROUND

Catalytic metathesis has transformed chemical synthesis and offers exceptionally efficient pathways for the synthesis of many commercially important chemicals, including but not limited to biologically active molecules, oleochemicals, renewables, fine chemicals, and polymeric materials. Accordingly, there remains an unmet need for improved methods and catalysts for metathesis reactions, for example, in terms of better catalyst stability and/or activity, efficiency and stereoselectivity.

SUMMARY

The present invention, among other things, provides new compounds for promoting metathesis reactions. In some embodiments, a provide compound has the structure of formula I:

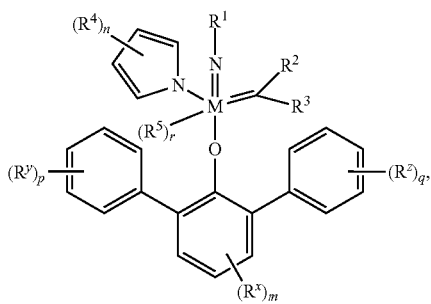

wherein:
M is molybdenum or tungsten;
$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;
each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R';
m is 0-3;
n is 0-4;
each of p and q is independently 0-5, and at least one of p and q is not 0;
r is 0-2;
each of $R^x$, $R^y$ and $R^z$ is independently an electron-withdrawing group;
each $R^4$ is independently hydrogen or optionally substituted $C_{1-4}$ aliphatic;
each $R^5$ is independently a monodentate ligand, or two $R^5$ are optionally taken together to form a bidentate ligand; and
each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, a compound of formula I has the structure of formula I-a:

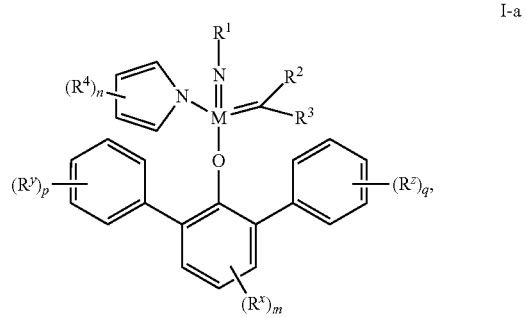

wherein each variable is independently as defined above and described herein.

In some embodiments, the present invention provides a compound having the structure of formula II:

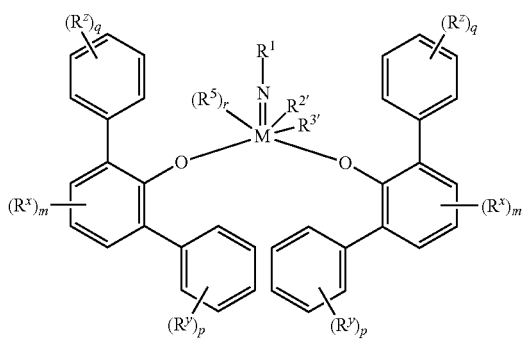

II

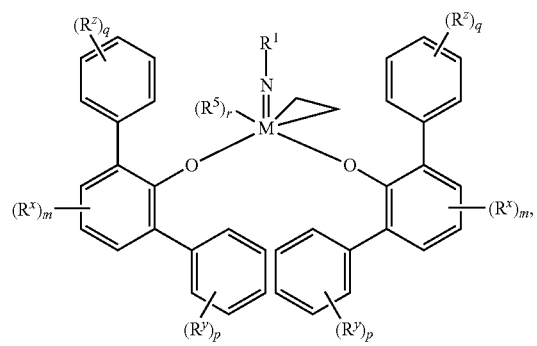

wherein
M is molybdenum or tungsten;
R¹ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;
$R^{2'}$ and $R^{3'}$ are taken together with their intervening metal atoms to form an optionally substituted 3-8 membered saturated or partially unsaturated ring having, in addition to the intervening metal atom, 0-4 heteroatoms independently selected from nitrogen, oxygen, or sulfur;
m is 0-3;
each of p and q is independently 0-5, and at least one of p and q is not 0;
r is 0-2;
each of $R^x$, $R^y$ and $R^z$ is independently an electron-withdrawing group;
each $R^5$ is independently a monodentate ligand, or two $R^5$ are optionally taken together to form a bidentate ligand; and
each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, compound of formula II has the structure of formula II':

II'

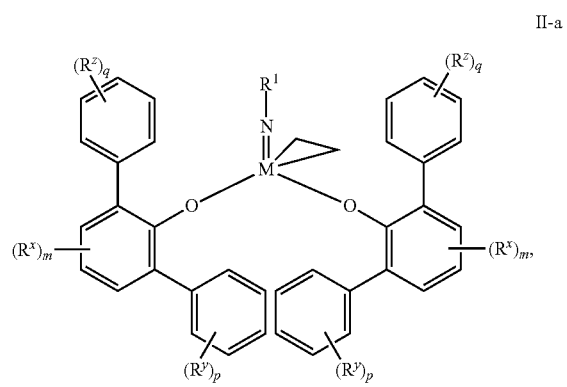

wherein each variable is independently as defined above and described herein.

In some embodiments, a compound of formula II has the structure of formula II-a:

II-a

[structure]

wherein each variable is independently as defined above and described herein.

In some embodiments, the present invention provides methods for preparing provided compounds.

In some other embodiments, the present invention provides methods for metathesis reactions. In some embodiments, a provided method comprises providing a compound provided by this invention. In some embodiments, a provided method produces a product with novel selectivity.

DETAILED DESCRIPTION OF CERTAIN EMBODIMENTS

Figure 1:
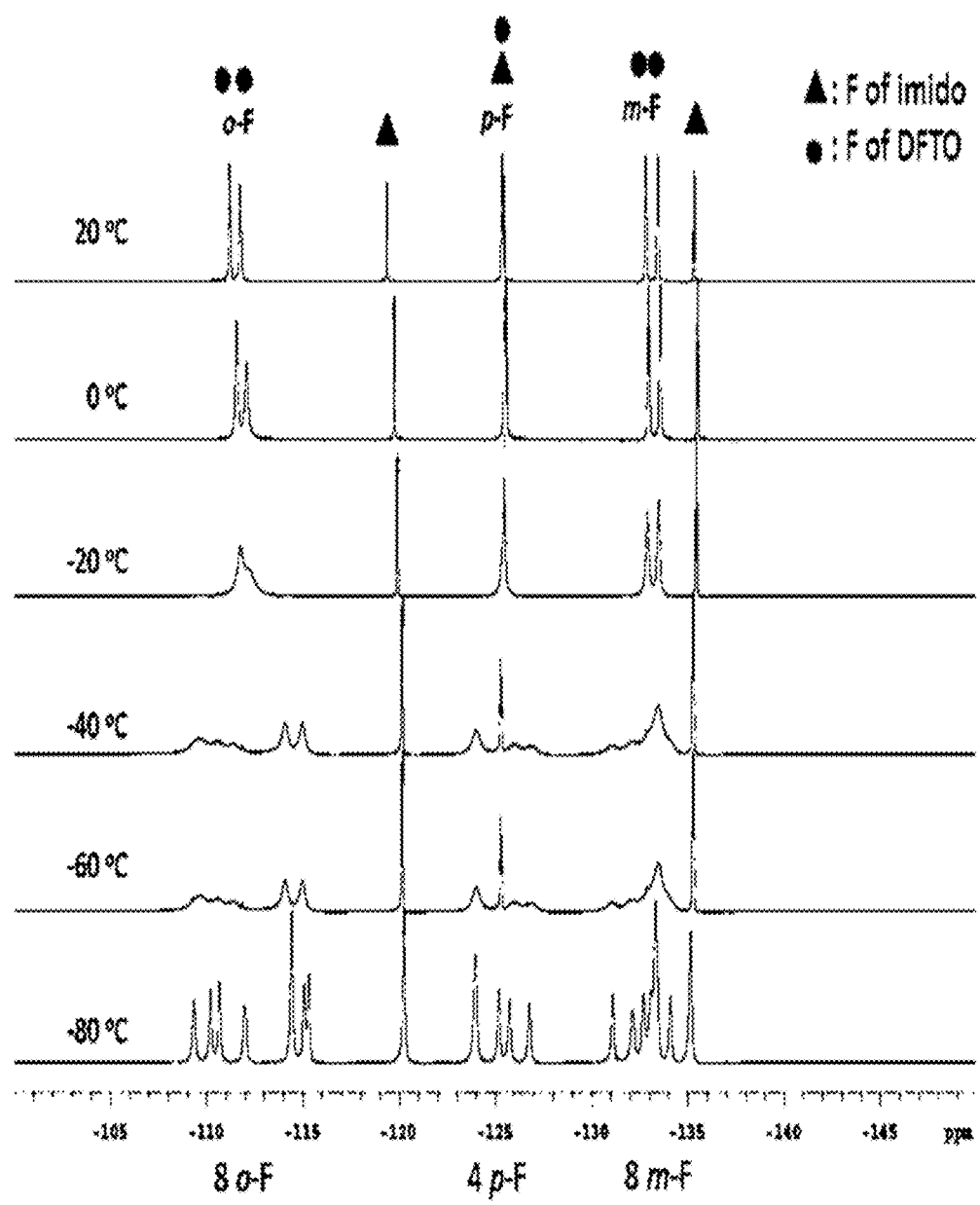
FIG. 1. Variable temperature $^{19}F$ NMR spectra of 1c (in toluene-$d_8$).

1. General Description of Certain Embodiments of the Invention

Olefin metathesis is of continuing importance to the synthesis of organic molecules including polymers. The present invention, among other things, provides new compounds for promoting metathesis reactions. In some embodiments, the present invention provides a compound having the structure of formula I:

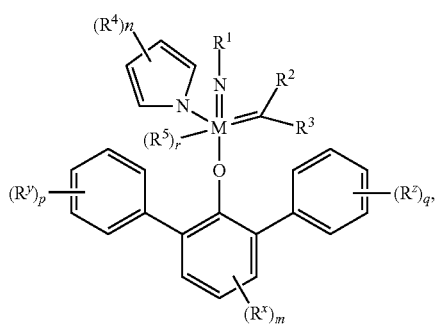

I wherein:
M is molybdenum or tungsten;
R$^1$ is an optionally substituted group selected from C$_{1-20}$ aliphatic, C$_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each of R$^2$ and R$^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R';
m is 0-3;
n is 0-4;
each of p and q is independently 0-5, and at least one of p and q is not 0;
r is 0-2;
each of R$^x$, R$^y$ and R$^z$ is independently an electron-withdrawing group;
each R$^4$ is independently hydrogen or optionally substituted C$_{1-4}$ aliphatic;
each R$^5$ is independently a monodentate ligand, or two R$^5$ are optionally taken together to form a bidentate ligand; and
each R' is independently hydrogen or an optionally substituted group selected from C$_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, a compound of formula I has the structure of formula I-a:

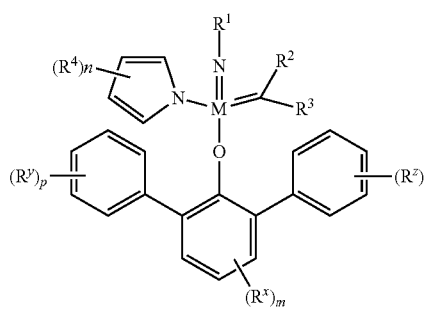

I-a wherein:
M is molybdenum or tungsten;
R$^1$ is an optionally substituted group selected from C$_{1-20}$ aliphatic, C$_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R';

m is 0-3;

n is 0-4;

each of p and q is independently 0-5, and at least one of p and q is not 0;

each of $R^x$, $R^y$ and $R^z$ is independently an electron-withdrawing group;

each $R^4$ is independently hydrogen or optionally substituted $C_{1-4}$ aliphatic; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, the present invention provides a compound having the structure of formula II:

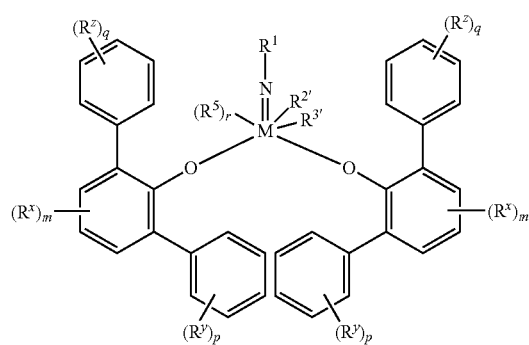

wherein
M is molybdenum or tungsten;
$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

$R^{2'}$ and $R^{3'}$ are taken together with their intervening metal atoms to form an optionally substituted 3-8 membered saturated or partially unsaturated ring having, in addition to the intervening metal atom, 0-4 heteroatoms independently selected from nitrogen, oxygen, or sulfur;

m is 0-3;

each of p and q is independently 0-5, and at least one of p and q is not 0;

r is 0-2;

each of $R^x$, $R^y$ and $R^z$ is independently an electron-withdrawing group;

each $R^5$ is independently a monodentate ligand, or two $R^5$ are optionally taken together to form a bidentate ligand; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, a compound of formula II has the structure of formula II':

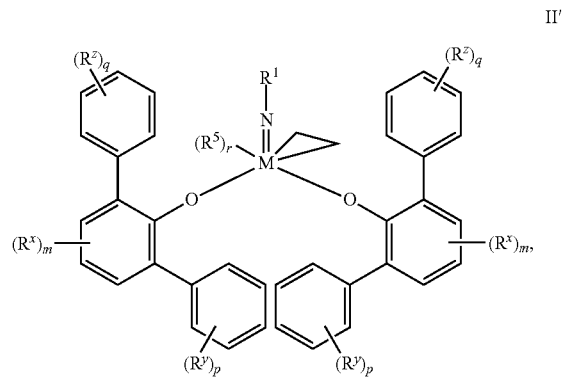

wherein:

M is molybdenum or tungsten;

R$^1$ is an optionally substituted group selected from C$_{1-20}$ aliphatic, C$_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each m is independently 0-3;

each of p and q is independently 0-5, and at least one of p and q is not 0;

r is 0-2;

each of R$^x$, R$^y$ and R$^z$ is independently an electron-withdrawing group;

each R$^4$ is independently hydrogen or optionally substituted C$_{1-4}$ aliphatic; and each R$^5$ is independently a monodentate ligand, or two R$^5$ are optionally taken together to form a bidentate ligand.

In some embodiments, a compound of formula II has the structure of formula II-a:

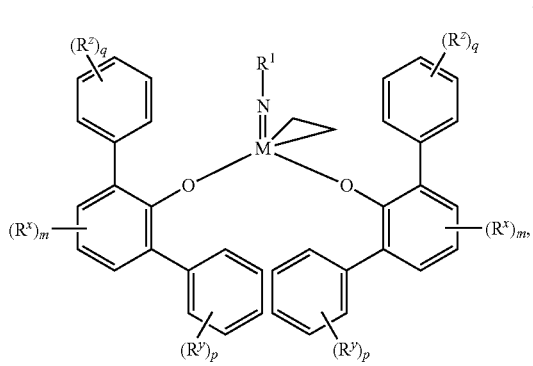

II-a wherein:

M is molybdenum or tungsten;

R$^1$ is an optionally substituted group selected from C$_{1-20}$ aliphatic, C$_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each m is independently 0-3;

each of p and q is independently 0-5, and at least one of p and q is not 0;

each of R$^x$, R$^y$ and R$^z$ is independently an electron-withdrawing group; and each R$^4$ is independently hydrogen or optionally substituted C$_{1-4}$ aliphatic.

The present invention, among other things, recognizes that provided compounds are particularly challenging to prepare. In some embodiments, a person having ordinary skill in the art, when using known methods in the art, cannot obtain a provided compound in satisfactory yields and/or purity. In some embodiments, the present invention provides methods for preparing provided compounds.

In some embodiments, the present invention provides a method for preparing a compound having the structure of formula I, comprising steps of:

1) providing a compound having the structure of formula III:

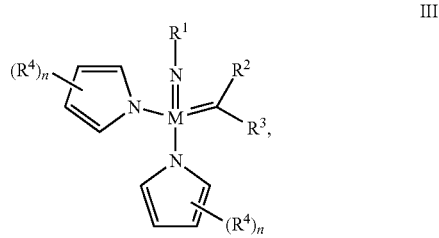

III wherein each variable is independently as defined above and described herein;

2) providing a first ligand or ligand precursor; and 3) reacting the compound of formula III with a second ligand or ligand precursor in the presence of the first ligand or ligand precursor, wherein the second ligand or ligand precursor having the structure of formula IV:

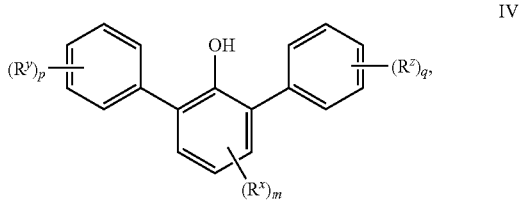

IV or its salt thereof, wherein each variable is independently as defined above and described herein.

In some embodiments, the present invention provides a method for preparing a compound having the structure of formula I-a, comprising:

1) providing a compound having the structure of formula III:

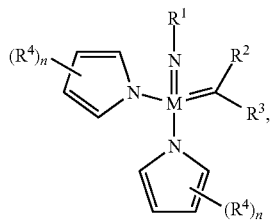

wherein each variable is independently as defined above and described herein;

2) providing a first ligand or ligand precursor;

3) reacting the compound of formula III with a second ligand or ligand precursor in the presence of the first ligand or ligand precursor, wherein the second ligand or ligand precursor having the structure of formula IV:

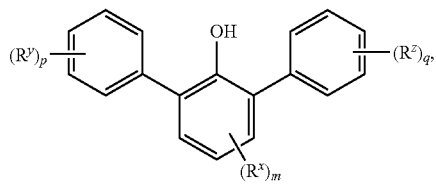

or its salt thereof, wherein each variable is independently as defined above and described herein.

In some embodiments, a provided method for preparing a compound having the structure of formula I-a further comprising the step of converting a compound of formula I, wherein r is 1-5, into a compound of formula I-a.

In some embodiments, the present invention provides a method for preparing a compound having the structure of formula II, comprising:

reacting a compound having the structure of formula V:

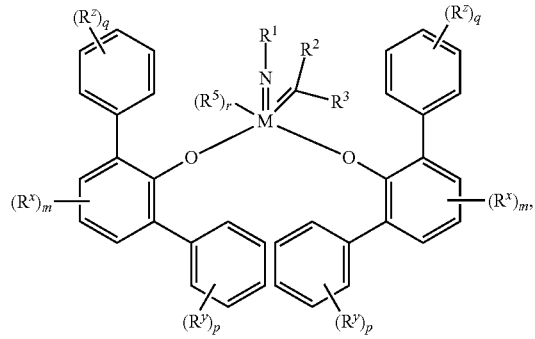

wherein each variable is independently as defined above and described herein;

with an olefin.

In some embodiments, the present invention provides a method for preparing a compound having the structure of formula II, wherein r is 1-2, comprising:

reacting a compound having the structure of formula II-a:

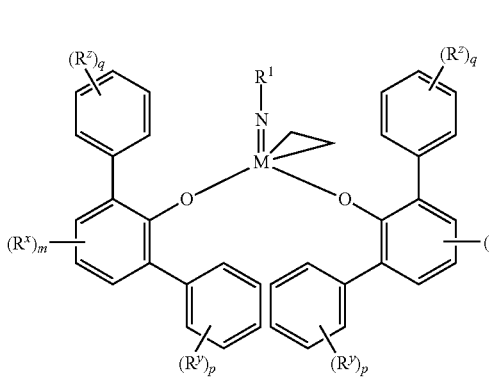

wherein each variable is independently as defined above and described herein;

with one or more ligand or ligand precursor. In some embodiments, a ligand or ligand precursor comprises $R^5$ or has the structure of $R^5$.

In some embodiments, the present invention provides a method for preparing a compound having the structure of formula II-a, comprising:

reacting a compound having the structure of formula V-a:

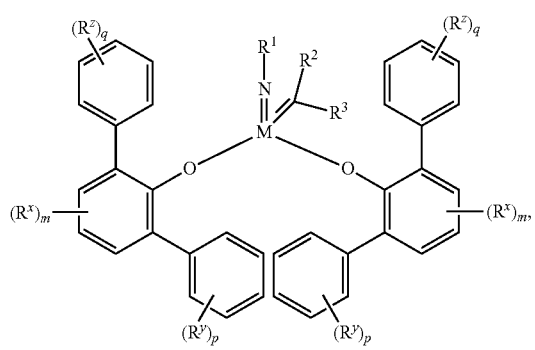

wherein each variable is independently as defined above and described herein;

with ethylene.

In some other embodiments, a provided compound has unexpected stability and/or reactivity. In some embodiments, a provided compound comprising an ethylene ligand, for example, a compound of formula II, promotes metathesis reactions with good efficiency. In some embodiments, a metathesis reaction is ring-opening metathesis polymerization (ROMP).

In some other embodiments, the present invention provides methods for metathesis reactions. In some embodiments, a provided method comprises providing a compound provided by this invention. In some embodiments, a provided method produces a product with unexpected selectivity. For example, ROMP of dicarbomethoxynorbornadiene (DCMNBD) promoted by a compound of formula I or II produces polymers with high cis, isotactic selectivity.

In some embodiments, the present invention provides a method for performing a metathesis reaction, comprising providing a compound having the structure of formula I, II, or V. In some embodiments, the present invention provides a method for performing a metathesis reaction, comprising providing a compound having the structure of formula I or II. In some embodiments, the present invention provides a method for performing a metathesis reaction, comprising providing a compound having the structure of formula I. In some embodiments, the present invention provides a method for performing a metathesis reaction, comprising providing a compound having the structure of formula II. In some embodiments, a metathesis reaction is olefin metathesis. In some embodiments, a metathesis reaction is ring-opening metathesis polymerization (ROMP). In some embodiments, a metathesis reaction is ROMP, and a product is produced with cis, isotactic selectivity.

2. DEFINITIONS

Compounds of the present invention include those described generally herein, and are further illustrated by the classes, subclasses, and species disclosed herein. As used herein, the following definitions shall apply unless otherwise indicated. For purposes of this invention, the chemical elements are identified in accordance with the Periodic Table of the Elements, CAS version, Handbook of Chemistry and Physics, 75$^{th}$ Ed. Additionally, general principles of organic chemistry are described in "Organic Chemistry", Thomas Sorrell, University Science Books, Sausalito: 1999, and "March's Advanced Organic Chemistry", 5$^{th}$ Ed., Ed.: Smith, M. B. and March, J., John Wiley & Sons, New York: 2001, the entire contents of which are hereby incorporated by reference.

The term "aliphatic" or "aliphatic group", as used herein, means a straight-chain (i.e., unbranched) or branched, substituted or unsubstituted hydrocarbon chain that is completely saturated or that contains one or more units of unsaturation, or a monocyclic hydrocarbon, bicyclic hydrocarbon, or tricyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-30 aliphatic carbon atoms. In some embodiments, aliphatic groups contain 1-20 aliphatic carbon atoms. In other embodiments, aliphatic groups contain 1-10 aliphatic carbon atoms. In still other embodiments, aliphatic groups contain 1-5 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "cycloaliphatic," as used herein, refers to saturated or partially unsaturated cyclic aliphatic monocyclic, bicyclic, or polycyclic ring systems, as described herein, having from 3 to 14 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic," may also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a carbocyclic group is tricyclic. In some embodiments, a carbocyclic group is polycyclic. In some embodiments, "cycloaliphatic" (or "carbocycle" or "cycloalkyl") refers to a monocyclic $C_3$-$C_6$ hydrocarbon, or a $C_8$-$C_{10}$ bicyclic hydrocarbon that is completely saturated or that contains one or more units of unsaturation, but which is not aromatic, that has a single point of attachment to the rest of the molecule, or a $C_9$-$C_{16}$ tricyclic hydrocarbon that is completely saturated or that contains one or more units of unsaturation, but which is not aromatic, that has a single point of attachment to the rest of the molecule.

As used herein, the term "alkyl" is given its ordinary meaning in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 1-20 carbon atoms in its backbone (e.g., $C_1$-$C_{20}$ for straight chain, $C_2$-$C_{20}$ for branched chain), and alternatively, about 1-10. In some embodiments, a cycloalkyl ring has from about 3-10 carbon atoms in their ring structure where such rings are monocyclic or bicyclic, and alternatively about 5, 6 or 7 carbons in the ring structure. In some embodiments, an alkyl group may be a lower alkyl group, wherein a lower alkyl group comprises 1-4 carbon atoms (e.g., $C_1$-$C_4$ for straight chain lower alkyls).

As used herein, the term "alkenyl" refers to an alkyl group, as defined herein, having one or more double bonds.

As used herein, the term "alkynyl" refers to an alkyl group, as defined herein, having one or more triple bonds.

The term "heteroalkyl" is given its ordinary meaning in the art and refers to alkyl groups as described herein in which one or more carbon atoms is replaced with a heteroatom (e.g., oxygen, nitrogen, sulfur, and the like). Examples of heteroalkyl groups include, but are not limited to, alkoxy, poly(ethylene glycol)-, alkyl-substituted amino, tetrahydrofuranyl, piperidinyl, morpholinyl, etc.

The term "aryl" used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring." In certain embodiments of the present invention, "aryl" refers to an aromatic ring system which includes, but not limited to, phenyl, biphenyl, naphthyl, binaphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

The terms "heteroaryl" and "heteroar-," used alone or as part of a larger moiety, e.g., "heteroaralkyl," or "heteroaralkoxy," refer to groups having 5 to 10 ring atoms (i.e., monocyclic or bicyclic), in some embodiments 5, 6, 9, or 10 ring atoms. In some embodiments, such rings have 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. In some embodiments, a heteroaryl is a heterobiaryl group, such as bipyridyl and the like. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7-10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothiophenyl pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring, for example N (as in 3,4-dihydro-2H-pyrrolyl), NH (as in pyrrolidinyl) or NR$^+$ (as in N-substituted pyrrolidinyl)).

The term "unsaturated," as used herein, means that a moiety has one or more units of unsaturation.

The term "halogen" means F, Cl, Br, or I.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —$O(CH_2)_{0-4}R°$, —O—$(CH_2)_{0-4}C(O)OR°$; —$(CH_2)_{0-4}CH(OR°)_2$; —$(CH_2)_{0-4}Ph$, which may be substituted with $R°$; —$(CH_2)_{0-4}O(CH_2)_{0-1}Ph$ which may be substituted with $R°$; —CH═CHPh, which may be substituted with $R°$; —$(CH_2)_{0-4}O(CH_2)_{0-1}$-pyridyl which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR_2$; —$N(R°)C(S)NR_2$; —$(CH_2)_{0-4}N(R°)C(O)OR°$; —$N(R°)N(R°)C(O)R°$; —$N(R°)N(R°)C(O)NR_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR$—, $SC(S)SR°$; —$(CH_2)_{0-4}SC(O)R°$; —$(CH_2)_{0-4}C(O)NR_2$; —$C(S)NR_2$; —$C(S)SR°$; —$SC(S)SR°$, —$(CH_2)_{0-4}OC(O)NR_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR_2$; —$(CH_2)_{0-4}S(O)R°$; —$N(R°)S(O)_2NR_2$; —$N(R°)S(O)_2R°$; —$N(OR°)R°$; —$C(NH)NR_2$; —$P(O)_2R°$; —$P(O)R°_2$; —$OP(O)R°_2$; —$OP(O)(OR°)_2$; —$SiR°_3$; —$OSiR°_3$; —$(C_{1-4}$ straight or branched)alkylene)O—$N(R°)_2$; or —$(C_{1-4}$ straight or branched)alkylene)C(O)O—$N(R°)_2$, wherein each $R°$ may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of $R°$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R°$ (or the ring formed by taking two independent occurrences of $R°$ together with their intervening atoms), are independently halogen, —$(CH_2)_{0-2}R^•$, -(haloR$^•$), —$(CH_2)_{0-2}OH$, —$(CH_2)_{0-2}OR^•$, —$(CH_2)_{0-2}CH(OR^•)_2$; —O(haloR$^•$), —CN, —$N_3$, —$(CH_2)_{0-2}C(O)R^•$, —$(CH_2)_{0-2}C(O)OH$, —$(CH_2)_{0-2}C(O)OR^•$, —$(CH_2)_{0-2}SR^•$, —$(CH_2)_{0-2}SH$, —$(CH_2)_{0-2}NH_2$, —$(CH_2)_{0-2}NHR^•$, —$(CH_2)_{0-2}NR^•_2$, —$NO_2$, —$SiR^•_3$, —$OSiR^•_3$, —$C(O)SR^•$, —$(C_{1-4}$ straight or branched alkylene)C(O)OR$^•$, or —$SSR^•$ wherein each $R^•$ is unsubstituted or where preceded by "halo" is substituted only with one or more halogens, and is independently selected from $C_1$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R°$ include ═O and ═S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†$$_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†$$_2$, —C(S)NR$^†$$_2$, —C(NH)NR$^†$$_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "stereogenic metal atom" is given its ordinary meaning, and refers to a metal atom coordinated by at least two ligands (e.g., at least four ligands), wherein the ligands are arranged about the metal atom such that the overall structure (e.g., metal complex) lacks a plane of symmetry with respect to the metal atom. In some cases, the stereogenic metal atom may be coordinated by at least three ligands, at least four ligands, at least five ligands, at least six ligands, or more. In certain embodiments, the stereogenic metal atom may be coordinated by four ligands. Metal complexes comprising a stereogenic metal center may provide sufficient space specificity at a reaction site of the metal complex, such that a molecular substrate having a plane of symmetry may be reacted at the reaction site to form a product that is free of a plane of symmetry. That is, the stereogenic metal center of the metal complex may impart sufficient shape specificity to induce stereogenicity effectively, producing a chiral product. Such metal complexes may exhibit improved catalytic activity and stereoselectivity, relative to previous systems, and may reduce undesired side reactions (e.g., dimerization or oligomerization of the metal complex).

The term "chiral" is given its ordinary meaning in the art and refers to a molecule that is not superimposable with its mirror image, wherein the resulting nonsuperimposable mirror images are known as "enantiomers" and are labeled as either an (R) enantiomer or an (S) enantiomer. Typically, chiral molecules lack a plane of symmetry.

The term "achiral" is given its ordinary meaning in the art and refers to a molecule that is superimposable with its mirror image. Typically, achiral molecules possess a plane of symmetry.

As used herein, a ligand may be either monodentate or polydentate. In some embodiments, a ligand is monodentate. In some embodiments, a ligand is bidentate. In some embodiments, a ligand is tridentate. In some embodiments, two or more monodentate ligands are taken together to form a polydentate ligand. A ligand may have hapticity of more than one. In some cases, a ligand has a hapticity of 1 to 10. In some embodiments, a ligand has a hapticity of 1. In some embodiments, a ligand has a hapticity of 2. In some embodiments, a ligand has a hapticity of 3. In some embodiments, a ligand has a hapticity of 4. In some embodiments, a ligand has a hapticity of 5. In some embodiments, a ligand has a hapticity of 6. For a ligand having hapticity greater than one, as sometimes done in the art, a single bond may be drawn between the ligand and the metal. In some cases, a ligand is alkylidene. In some cases, a ligand is a nitrogen-containing ligand. In some cases, a ligand is an oxygen-containing ligand. In some cases, a ligand is a phosphorus-containing ligand. In some embodiments, a ligand comprises an unsaturated bond, and the unsaturated bond is coordinated to a metal. In some embodiments, a ligand comprises a carbon-carbon double bond, and the double bond is coordinated to a metal. In some embodiments, a ligand is an olefin. When an olefin double bond is coordinated to a metal, the chemical bonding between the olefin and the metal can either be depicted as a 3-membered ring wherein the ring members comprises the metal and both carbon atoms of the double bond, or as a single bond between the metal and the double bond.

As used herein, a "nitrogen-containing ligand" may be any species comprising a nitrogen atom. In some cases, the nitrogen atom may bind to the metal atom. In some cases, the nitrogen-containing ligand may bind the metal center via a different atom. In some cases, the nitrogen atom may be a ring atom of a heteroaryl or heteroalkyl group. In some cases, the nitrogen atom may be a substituted amine group. It should be understood that, in catalyst precursors described herein, the nitrogen-containing ligand may have sufficiently ionic character to coordinate a metal center, such as a Mo or W metal center. Examples of nitrogen-containing ligands include, but are not limited to, pyrrolyl, pyrazolyl, pyridinyl, pyrazinyl, pyrimidinyl, imidazolyl, triazolyl, tetrazolyl, oxazolyl, isoxazolyl, thiazolyl, isothiazolyl, indolyl, indazolyl, carbazolyl, morpholinyl, piperidinyl, oxazinyl, substituted derivatives thereof, and the like. For example, the nitrogen-containing ligand may be pyrrolide or 2,5-dimethylpyrrolide. The nitrogen-containing ligand may be selected to interact with an oxygen-containing ligand such that the oxygen-containing ligand can readily replace the nitrogen-containing ligand in a precatalyst to generate a catalyst. In cases where the catalyst composition may be generated in situ in order to carry out a chemical reaction, the first, nitrogen-containing ligand may be selected such that, upon replacement by an oxygen-containing ligand, the nitrogen-containing ligands or protonated versions thereof do not interfere with the chemical reaction. In some embodiments, the nitrogen-containing ligand may be chiral and the precatalyst may be provided as a racemic mixture or a purified stereoisomer.

In some embodiments, a nitrogen-containing ligand may also describe a ligand precursor comprising at least one hydrogen atom directly bonded to a nitrogen atom, wherein deprotonation of the at least one hydrogen atom results in a negatively charged nitrogen atom, which may coordinate to a metal atom. Exemplary such precursors include but are not limited to amines, amides, and pyrrole and its derivatives thereof. A nitrogen-containing ligand may be a heteroaryl or heteroalkyl group comprising at least one nitrogen ring atom. In some cases, the nitrogen atom may be positioned on a substituent of an alkyl, heteroalkyl, aryl, or heteroaryl group. For example, a nitrogen-containing ligand may be an amine- or amide-substituted aryl group, wherein the amine or amide group is deprotonated upon coordination to the metal center.

As used herein, the term "oxygen-containing ligand" may be used to refer to ligands comprising at least one oxygen atom. In some cases, the oxygen atom binds to the metal atom thereby forming an ether-linkage. In other cases, the oxygen-containing ligand may bind the metal center via a different atom. The term "oxygen-containing ligand" may also describe ligand precursors comprising at least one hydroxyl group (e.g., a hydroxyl-containing ligand), wherein deprotonation of the hydroxyl group results in a negatively charged oxygen atom, which may coordinate to a metal atom. The oxygen-containing ligand may be a heteroaryl or heteroalkyl group comprising at least one oxygen ring atom. In some cases, the oxygen atom may be positioned on a substituent of an alkyl, heteroalkyl, aryl, or heteroaryl group. For example, the oxygen-containing ligand may be a hydroxy-substituted aryl group, wherein the hydroxyl group is deprotonated upon coordination to the metal center.

In some embodiments, an oxygen-containing ligand may also describe a ligand precursor comprising at least one hydroxyl group (e.g., a hydroxyl-containing ligand), wherein deprotonation of the hydroxyl group results in a negatively charged oxygen atom, which may coordinate to a metal atom. An oxygen-containing ligand may be a heteroaryl or heteroalkyl group comprising at least one oxygen ring atom. In some cases, the oxygen atom may be positioned on a substituent of an alkyl, heteroalkyl, aryl, or heteroaryl group. For example, an oxygen-containing ligand may be a hydroxy-substituted aryl group, wherein the hydroxyl group is deprotonated upon coordination to the metal center.

As used herein, the term "phosphorus-containing ligand" may be used to refer to ligands comprising at least one phosphorus atom. In some cases, the phosphorus atom binds to the metal. In other cases, the phosphorus-containing ligand may bind to the metal center via a different atom (i.e., an atom other than the phosphorous). The phosphorus-containing ligand may have phosphorus atom of various oxidation states. In some cases the phosphorus-containing ligand is phosphine. In some cases the phosphorus-containing ligand is phosphite. In some cases the phosphorus-containing ligand is phosphate. The phosphorus-containing ligand may be either monodentate or polydentate. In some cases, two or more phosphorus atoms bind to the metal. In some cases, one or more phosphorus atoms together with one or more non-phosphorus atoms bind to the metal.

As defined herein, a "metal complex" is any complex used to form a provided precursor complex or any complex generated from a provided precursor complex (e.g., for use as a catalyst in a reaction such as a metathesis reaction). In some embodiments, a metal complex is a compound having the structure of formula II described herein. In some embodiments, a metal complex is a compound having the structure of formula III described herein.

The phrase "protecting group," as used herein, refers to temporary substituents which protect a potentially reactive functional group from undesired chemical transformations. Examples of such protecting groups include esters of carboxylic acids, silyl ethers of alcohols, and acetals and ketals of aldehydes and ketones, respectively. A "Si protecting group" is a protecting group comprising a Si atom, such as Si-trialkyl (e.g., trimethylsilyl, tributylsilyl, t-butyldimethylsilyl), Si-triaryl, Si-alkyl-diphenyl (e.g., t-butyldiphenylsilyl), or Si-aryl-dialkyl (e.g., Si-phenyldialkyl). Generally, a Si protecting group is attached to an oxygen atom. The field of protecting group chemistry has been reviewed (Greene, T. W.; Wuts, P. G. M. Protective Groups in Organic Synthesis, 2nd ed.; Wiley: New York, 1991). Such protecting groups (and associated protected moieties) are described in detail below.

Protected hydroxyl groups are well known in the art and include those described in detail in *Protecting Groups in Organic Synthesis*, T. W. Greene and P. G. M. Wuts, 3$^{rd}$ edition, John Wiley & Sons, 1999, the entirety of which is incorporated herein by reference. Examples of suitably protected hydroxyl groups further include, but are not limited to, esters, carbonates, sulfonates allyl ethers, ethers, silyl ethers, alkyl ethers, arylalkyl ethers, and alkoxyalkyl ethers. Examples of suitable esters include formates, acetates, proprionates, pentanoates, crotonates, and benzoates. Specific examples of suitable esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)pentanoate, pivaloate (trimethylacetate), crotonate, 4-methoxy-crotonate, benzoate, p-benzylbenzoate, 2,4,6-trimethylbenzoate. Examples of suitable carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Examples of suitable alkyl ethers include methyl, benzyl, p-methoxybenzyl, 3,4-dimethoxybenzyl, trityl, t-butyl, and allyl ether, or derivatives thereof. Alkoxyalkyl ethers include acetals such as methoxymethyl, methylthiomethyl, (2-methoxyethoxy) methyl, benzyloxymethyl, beta-(trimethylsilyl)ethoxymethyl, and tetrahydropyran-2-yl ether. Examples of suitable arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

Protected amines are well known in the art and include those described in detail in Greene (1999). Suitable mono-protected amines further include, but are not limited to, aralkylamines, carbamates, allyl amines, amides, and the like. Examples of suitable mono-protected amino moieties include t-butyloxycarbonylamino (—NHBOC), ethyloxycarbonylamino, methyloxycarbonylamino, trichloroethyloxycarbonylamino, allyloxycarbonylamino (—NHAlloc), benzyloxocarbonylamino (—NHCBZ), allylamino, benzylamino (—NHBn), fluorenylmethylcarbonyl (—NHFmoc), formamido, acetamido, chloroacetamido, dichloroacetamido, trichloroacetamido, phenylacetamido, trifluoroacetamido, benzamido, t-butyldiphenylsilyl, and the like. Suitable di-protected amines include amines that are substituted with two substituents independently selected from those described above as mono-protected amines, and further include cyclic imides, such as phthalimide, maleimide, succinimide, and the like. Suitable di-protected amines also include pyrroles and the like, 2,2,5,5-tetramethyl-[1,2,5]azadisilolidine and the like, and azide.

Protected aldehydes are well known in the art and include those described in detail in Greene (1999). Suitable protected aldehydes further include, but are not limited to, acyclic acetals, cyclic acetals, hydrazones, imines, and the like. Examples of such groups include dimethyl acetal, diethyl acetal, diisopropyl acetal, dibenzyl acetal, bis(2-nitrobenzyl) acetal, 1,3-dioxanes, 1,3-dioxolanes, semicarbazones, and derivatives thereof.

Protected carboxylic acids are well known in the art and include those described in detail in Greene (1999). Suitable protected carboxylic acids further include, but are not limited to, optionally substituted $C_{1-6}$ aliphatic esters, optionally substituted aryl esters, silyl esters, activated esters, amides, hydrazides, and the like. Examples of such ester groups include methyl, ethyl, propyl, isopropyl, butyl, isobutyl, benzyl, and phenyl ester, wherein each group is optionally substituted. Additional suitable protected carboxylic acids include oxazolines and ortho esters.

Protected thiols are well known in the art and include those described in detail in Greene (1999). Suitable protected thiols further include, but are not limited to, disulfides, thioethers, silyl thioethers, thioesters, thiocarbonates, and thiocarbamates, and the like. Examples of such groups include, but are not limited to, alkyl thioethers, benzyl and substituted benzyl thioethers, triphenylmethyl thioethers, and trichloroethoxycarbonyl thioester, to name but a few.

Unless otherwise stated, structures depicted herein are also meant to include all isomeric (e.g., enantiomeric, diastereomeric, and geometric (or conformational)) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and geometric (or conformational) mixtures of the present compounds are within the scope of the invention.

Unless otherwise stated, all tautomeric forms of the compounds of the invention are within the scope of the invention.

Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a $^{11}C$- or $^{13}C$- or $^{14}C$-enriched carbon are within the scope of this invention. Such compounds are useful, for example, as analytical tools or probes in biological assays.

As used herein, the term "electron-withdrawing group" is given its ordinary meaning in the art and refers to an atom or group that draws electron density from a neighboring atom or group, usually by resonance and/or inductive effects. In some embodiments, an electron-withdrawing group withdraws electron density from an aromatic ring system by resonance and/or inductive effects. In some embodiments, an electron-withdrawing group withdraws electron density from an aromatic ring system by resonance and inductive effects. In some embodiments, an electron-withdrawing group lowers the electron density of an aromatic ring system such as phenyl. Exemplary electron-withdrawing groups are extensively described in the art, including but not limited to halogen, carbonyl moieties (e.g., aldehyde and ketone groups), —COOH and its derivatives (e.g., ester and amide moieties), protonated amines, quaternary ammonium groups, —CN, —NO₂, —S(O)—, and —S(O)₂—. In some embodiments, an electron-withdrawing group is halogen. In some embodiments, an electron-withdrawing group is —F. In some embodiments, an electron-withdrawing group is —Cl. In some embodiments, an electron-withdrawing group is —Br. In some embodiments, an electron-withdrawing group is —I. In some embodiments, hydrogen is used as reference and regarded as having no effect.

As used herein and in the claims, the singular forms "a", "an", and "the" include the plural reference unless the context clearly indicates otherwise. Thus, for example, a reference to "a compound" includes a plurality of such compounds.

3. Description of Certain Embodiments of the Invention

In some embodiments, the present invention provides compounds and methods for metathesis reactions. As used herein, the term "metathesis reaction" is given its ordinary meaning in the art and refers to a chemical reaction in which two reacting species exchange partners in the presence of a transition-metal catalyst. In some cases, a byproduct of a metathesis reaction may be ethylene. A metathesis reaction may involve reaction between species comprising, for example, olefins and/or alkynes. Examples of different kinds of metathesis reactions include cross metathesis, ring-closing metathesis, ring-opening metathesis, acyclic diene metathesis, alkyne metathesis, enyne metathesis, ring-opening metathesis polymerization (ROMP), and the like. A metathesis reaction may occur between two substrates which are not joined by a bond (e.g., intermolecular metathesis reaction) or between two portions of a single substrate (e.g., intramolecular metathesis reaction).

In some embodiments, M is molybdenum. In some embodiments, M is tungsten.

As defined generally above, $R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur.

In some embodiments, $R^1$ is optionally substituted $C_{1-20}$ aliphatic. In some embodiments, $R^1$ is optionally substituted $C_{1-20}$ cycloaliphatic. In some embodiments, $R^1$ is optionally substituted $C_{1-12}$ aliphatic. In some embodiments, $R^1$ is optionally substituted $C_{1-12}$ cycloaliphatic. In some embodiments, $R^1$ is optionally substituted $C_{1-12}$ cycloalkyl. In some embodiments, $R^1$ is optionally substituted adamantyl. In some embodiments, $R^1$ is adamantyl. In some embodiments, $R^1$ is optionally substituted $C_{1-6}$ aliphatic. In some embodiments, $R^1$ is optionally substituted $C_{1-6}$ alkyl. In some embodiments, $R^1$ is optionally substituted hexyl, pentyl, butyl, propyl, ethyl or methyl. In some embodiments, $R^1$ is optionally substituted hexyl. In some embodiments, $R^1$ is optionally substituted pentyl. In some embodiments, $R^1$ is optionally substituted butyl. In some embodiments, $R^1$ is optionally substituted propyl. In some embodiments, $R^1$ is optionally substituted ethyl. In some embodiments, $R^1$ is optionally substituted methyl. In some embodiments, $R^1$ is hexyl. In some embodiments, $R^1$ is pentyl. In some embodiments, $R^1$ is butyl. In some embodiments, $R^1$ is propyl. In some embodiments, $R^1$ is ethyl. In some embodiments, $R^1$ is methyl. In some embodiments, $R^1$ is isopropyl.

In certain embodiments, $R^1$ is optionally substituted phenyl. In some embodiments, $R^1$ is substituted phenyl. In some embodiments, $R^1$ is mono-, di-, tri-, tetra- or penta-substituted phenyl. In some embodiments, $R^1$ is mono-substituted phenyl. In certain embodiments, $R^1$ is 2,6-disubstituted phenyl. In some embodiments, $R^1$ is tri-substituted phenyl. In some embodiments, $R^1$ is tetra-substituted phenyl. In some embodiments, $R^1$ is penta-substituted phenyl. In some embodiments, a substituent is a halogen. In some embodiments, a substituent is —F, and $R^1$ is phenyl substituted with one or more —F. In some embodiments, $R^1$ is pentafluorophenyl. In some embodiments, a substituent is optionally substituted $C_{1-4}$ aliphatic. In some embodiments, $R^1$ is phenyl disubstituted with halogen or $C_{1-4}$ aliphatic. Such $R^1$ groups include but are not limited to 2,6-dichlorophenyl, 2,6-dibromophenyl, 2,6-dimethylphenyl, 2,6-di-tert-butylphenyl, and 2,6-diisopropylphenyl.

In some embodiments, $R^1$ is selected from:

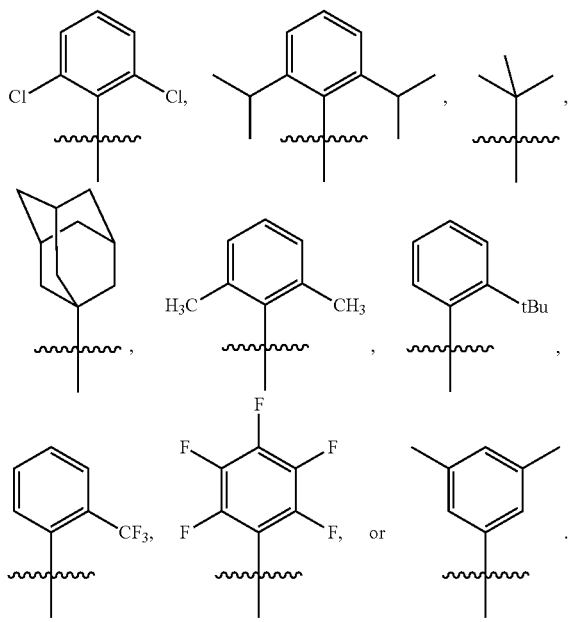

As defined generally above, each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R', wherein each R' is independently as defined above and described herein.

In some embodiments, both of $R^2$ and $R^3$ are hydrogen. In some embodiments, one of $R^2$ and $R^3$ is hydrogen and the other is an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 4-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur, —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R'. In some embodiments, one of $R^2$ and $R^3$ is hydrogen and the other is an optionally substituted group selected from $C_{1-6}$ aliphatic, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 4-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur.

In certain embodiments, $R^2$ or $R^3$ is optionally substituted $C_{1-6}$ aliphatic. In some embodiments, $R^2$ or $R^3$ is optionally substituted $C_{1-6}$ alkyl. In certain embodiments, $R^2$ or $R^3$ is $C_{1-6}$ alkyl substituted with phenyl and one or two additional substituents. In certain embodiments, $R^2$ or $R^3$ is a lower alkyl group optionally substituted with one or two methyl groups and phenyl. In certain embodiments, $R^2$ or $R^3$ is —C(Me)$_2$Ph. In certain embodiments, $R^2$ or $R^3$ is —C(Me)$_3$. In certain embodiments, $R^2$ or $R^3$ is —CH=C(Me)Ph. In certain embodiments, $R^2$ or $R^3$ is —$^{13}$CH=C(Me)Ph. In certain embodiments, $R^2$ or $R^3$ is —CH=$^{13}$C(Me)Ph.

In some embodiments, each of $R^2$ and $R^3$ is independently R', wherein R' is as defined above and described herein. In some embodiments, each of $R^2$ and $R^3$ is independently R', wherein at least one of $R^2$ and $R^3$ is not hydrogen.

In certain embodiments, $R^2$ is hydrogen and $R^3$ is R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R', wherein each R' is independently as defined above and described herein. In certain embodiments, $R^2$ is hydrogen and $R^3$ is R', wherein R' is as defined above and described herein. In certain embodiments, $R^2$ is hydrogen and $R^3$ is optionally substituted $C_{1-20}$ aliphatic. In some embodiments, $R^2$ is hydrogen and $R^3$ is optionally substituted $C_{1-20}$ alkyl. In certain embodiments, $R^2$ is hydrogen and $R^3$ is $C_{1-6}$ alkyl substituted with phenyl and one or two additional substituents. In certain embodiments, $R^2$ is hydrogen and $R^3$ is a lower alkyl group optionally substituted with one or two methyl groups and phenyl. In certain embodiments, $R^2$ is hydrogen and $R^3$ is —C(Me)$_2$Ph. In certain embodiments, $R^2$ is hydrogen and $R^3$ is —C(Me)$_3$. In certain embodiments, $R^2$ is hydrogen and $R^3$ is —CH=C(Me)Ph. In certain embodiments, $R^2$ is hydrogen and $R^3$ is —$^{13}$CH=C(Me)Ph. In certain embodiments, $R^2$ is hydrogen and $R^3$ is —CH=$^{13}$C(Me)Ph.

As defined above and described herein, $R^{2'}$ and $R^{3'}$ are taken together with the intervening metal atom to form an optionally substituted 3-8 membered saturated or partially unsaturated ring having, in addition to the intervening metal atom, 0-4 heteroatoms independently selected from nitrogen, oxygen, or sulfur. In some embodiments, $R^{2'}$ and $R^{3'}$ are taken together with the intervening metal atom to form an optionally substituted 3-8 membered saturated or partially unsaturated ring, wherein each ring atom is either M or carbon.

In some embodiments, $R^{2'}$ and $R^{3'}$ are taken together with the intervening metal atom to form an optionally substituted 3-8 membered saturated ring having, in addition to the intervening metal atom, 0-4 heteroatoms independently selected from nitrogen, oxygen, or sulfur. In some embodiments, $R^{2'}$ and R³' are taken together with the intervening metal atom to form an optionally substituted 3-8 membered saturated ring having, in addition to the intervening metal atom, 0-2 heteroatoms independently selected from nitrogen, oxygen, or sulfur. In some embodiments, R²' and R³' are taken together with the intervening metal atom to form an optionally substituted 3-8 membered saturated ring, wherein each ring atom is either M or carbon. In some embodiments, R²' and R³' are taken together with the intervening metal atom to form an optionally substituted 3-5 membered saturated ring having, in addition to the intervening metal atom, 0-4 heteroatoms independently selected from nitrogen, oxygen, or sulfur. In some embodiments, R²' and R³' are taken together with the intervening metal atom to form an optionally substituted 3-5 membered saturated ring having, in addition to the intervening metal atom, 0-2 heteroatoms independently selected from nitrogen, oxygen, or sulfur. In some embodiments, R²' and R³' are taken together with the intervening metal atom to form an optionally substituted 3-5 membered saturated ring, wherein each ring atom is either M or carbon.

In some embodiments, R²' and R³' are taken together with the intervening metal atom to form an optionally substituted 3-membered saturated ring. In certain embodiments, R²' and R³' are taken together with the intervening metal atom to form a substituted 3-membered saturated ring. In certain embodiments, R²' and R³' are taken together with the intervening metal atom to form a 3-membered saturated ring unsubstituted at the ring carbon atoms. In certain embodiments, R²' and R³' are taken together with the intervening metal atom to form a metallacyclopropane ring optionally substituted at the ring carbon atoms. In certain embodiments, R²' and R³' are taken together with the intervening metal atom to form metallacyclopropane, wherein the ring carbon atoms of the metallacyclobutane are not substituted. In some embodiments, a compound of formula II wherein R²' and R³' are taken together with the intervening metal atom to form a metallacyclopropane ring has the structure of formula II'. In some embodiments, a compound of formula II wherein R²' and R³' are taken together with the intervening metal atom to form a metallacyclopropane ring can be considered as a compound comprising an olefin ligand. For example, a

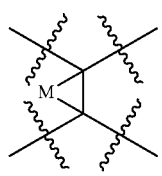

moiety may be considered as

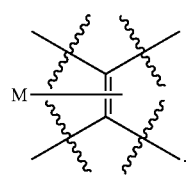

In certain embodiments, R²' and R³' are taken together with the intervening metal atom to form an optionally substituted 4-membered saturated ring. In certain embodiments, R²' and R³' are taken together with the intervening metal atom to form a substituted 4-membered saturated ring. In certain embodiments, R²' and R³' are taken together with the intervening metal atom to form a 4-membered saturated ring unsubstituted at the ring carbon atoms. In certain embodiments, R²' and R³' are taken together with the intervening metal atom to form a metallacyclobutane ring optionally substituted at the ring carbon atoms. In certain embodiments, R²' and R³' are taken together with the intervening metal atom to form metallacyclobutane, wherein the ring carbon atoms of the metallacyclobutane are not substituted.

In certain embodiments, R²' and R³' are taken together with the intervening metal atom to form an optionally substituted 5-membered saturated ring. In certain embodiments, R²' and R³' are taken together with the intervening metal atom to form a substituted 5-membered saturated ring. In certain embodiments, R²' and R³' are taken together with the intervening metal atom to form a 5-membered saturated ring unsubstituted at the ring carbon atoms. In certain embodiments, R²' and R³' are taken together with the intervening metal atom to form a metallacyclopentane ring optionally substituted at the ring carbon atoms. In certain embodiments, R²' and R³' are taken together with the intervening metal atom to form metallacyclopentane, wherein the ring carbon atoms of the metallacyclopentane are not substituted.

In some embodiments, R²' and R³' are taken together with the intervening metal atom to form an optionally substituted 3-8 membered partially unsaturated ring having, in addition to the intervening metal atom, 0-4 heteroatoms independently selected from nitrogen, oxygen, or sulfur. In some embodiments, R²' and R³' are taken together with the intervening metal atom to form an optionally substituted 3-8 membered partially unsaturated ring having, in addition to the intervening metal atom, 0-2 heteroatoms independently selected from nitrogen, oxygen, or sulfur. In some embodiments, R²' and R³' are taken together with the intervening metal atom to form an optionally substituted 5-6 membered partially unsaturated ring having, in addition to the intervening metal atom, 0-4 heteroatoms independently selected from nitrogen, oxygen, or sulfur. In some embodiments, R²' and R³' are taken together with the intervening metal atom to form an optionally substituted 5-6 membered partially unsaturated ring having, in addition to the intervening metal atom, 0-2 heteroatoms independently selected from nitrogen, oxygen, or sulfur. In some embodiments, R²' and R³' are taken together with the intervening metal atom to form an optionally substituted 3-4 membered partially unsaturated ring having, in addition to the intervening metal atom, 0-4 heteroatoms independently selected from nitrogen, oxygen, or sulfur. In some embodiments, R²' and R³' are taken together with the intervening metal atom to form an optionally substituted 3-4 membered partially unsaturated ring having, in addition to the intervening metal atom, 0-2 heteroatoms independently selected from nitrogen, oxygen, or sulfur.

As generally defined above, m is 0-3. In some embodiments, m is 0. In some embodiments, m is 1-3. In some embodiments, m is 1. In some embodiments, m is 2. In some embodiments, m is 3.

In some embodiments, m is 0, and a compound of formula I has the structure of formula I-b:

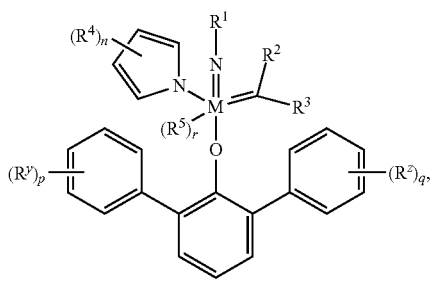

I-b wherein each variable is independently as defined above and described herein.

In some embodiments, m is 0, and a compound of formula II' has the structure of formula II-b:

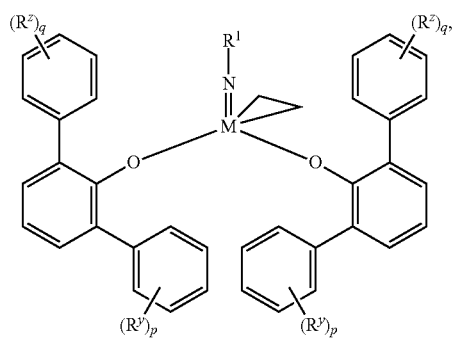

II-b wherein each variable is independently as defined above and described herein.

As generally defined above, n is 0-4. In some embodiments, n is 0. In some embodiments, n is 1-4. In some embodiments, n is 1. In some embodiments, n is 2. In some embodiments, n is 3. In some embodiments, n is 4.

In some embodiments, n is 0, and a compound of formula I has the structure of formula I-c:

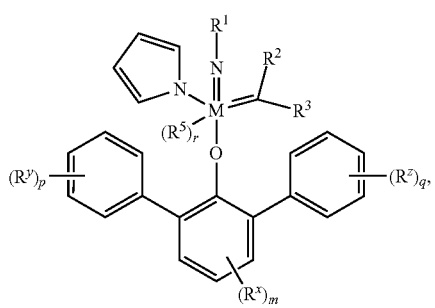

I-c wherein each variable is independently as defined above and described herein.

In some embodiments, n is 0, and a compound of formula I-a has the structure of formula I-d:

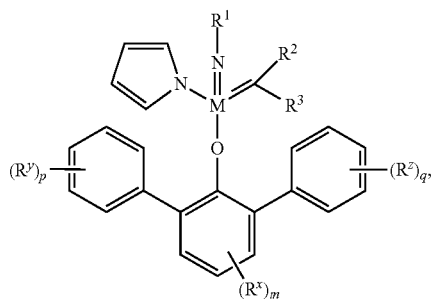

I-d wherein each variable is independently as defined above and described herein.

In some embodiments, n is 2, and a compound of formula I has the structure of formula I-e:

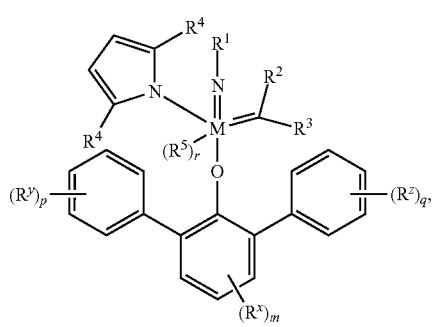

I-e wherein each variable is independently as defined above and described herein.

In some embodiments, n is 2, and a compound of formula I-a has the structure of formula I-f:

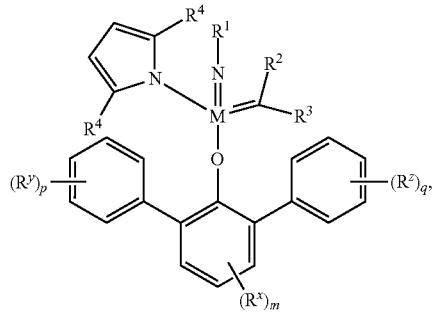

I-f wherein each variable is independently as defined above and described herein.

In some embodiments, m is 0 and n is 0. In some embodiments, m is 0 and n is 2. In some embodiments, m is 0 and

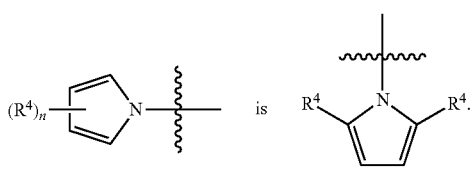

As generally defined above, each of p and q is independently 0-5, and at least one of p and q is not 0. In some embodiments, p is 1-5 and q is 0-5. In some embodiments, p is 0-5 and q is 1-5. In some embodiments, p is 1-5 and q is 1-5. In some embodiments, p is 5 and q is 5.

In some embodiments, p is 0. In some embodiments, p is 1-5. In some embodiments, p is 1. In some embodiments, p is 2. In some embodiments, p is 3. In some embodiments, p is 4. In some embodiments, p is 5.

In some embodiments, q is 0. In some embodiments, q is 1-5. In some embodiments, q is 1. In some embodiments, q is 2. In some embodiments, q is 3. In some embodiments, q is 4. In some embodiments, q is 5.

In some embodiments, r is 0-2. In some embodiments, r is 0. In some embodiments, r is 1. In some embodiments, r is 2.

In some embodiments, r is 0, and a compound of formula I has the structure of formula I-a.

In some embodiments, r is 1-2. In some embodiments, a provided compound has the structure of formula II, wherein r is 1-2. A person having ordinary skill in the art understands that such compounds are particularly challenging to prepare because of the steric limits associated with, or imposed by, the two sterically-demanding terphenoxide ligands.

In some embodiments, a compound of formula II has the structure of formula II-d:

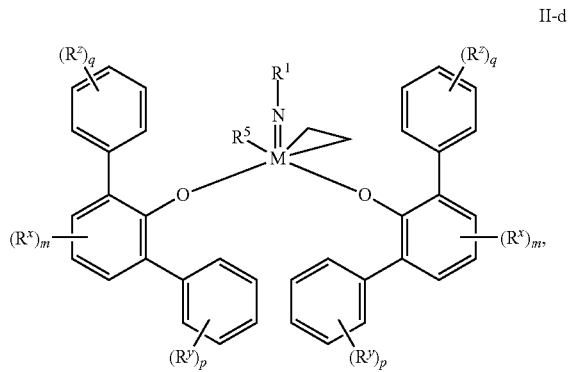

II-d wherein each variable independently as defined above and described herein.

In some embodiments, a compound of formula II has the structure of formula II-e:

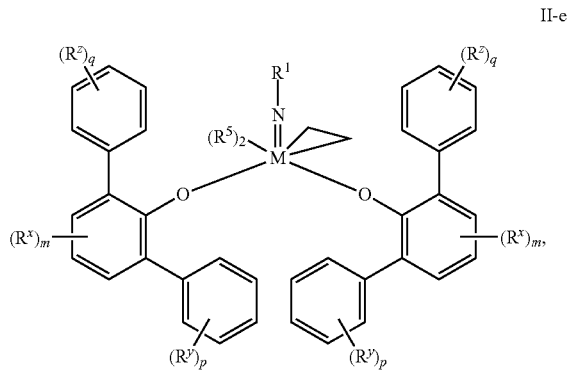

II-e wherein each variable independently as defined above and described herein.

As generally defined above, each of $R^x$, $R^y$ and $R^z$ is independently an electron-withdrawing group. Exemplary electron-withdrawing groups are extensive described in the art, including but not limited to halogen, carbonyl moieties (e.g., aldehyde and ketone groups), —COOH and its derivatives (e.g., ester and amide moieties), protonated amines, quaternary ammonium groups, —CN, —NO$_2$, —S(O)—, and —S(O)$_2$—. In some embodiments, an electron-withdrawing group is selected from halogen, —C(O)R", —S(O)R", —S(O)$_2$R", —CN, —N$^+$(R')$_3$, or —P(O)(R")$_3$, wherein each R" is independently R', —OR' or —N(R')$_2$, and each R' is independently as defined above and described herein. In some embodiments, an electron-withdrawing group is selected from halogen, —C(O)R', —C(O)OR', —C(O)N(R')$_2$, —S(O)R', —S(O)$_2$R', —S(O)$_2$OR', —CN, —N$^+$(R')$_3$, or —P(O)(R")$_3$, wherein R" is independently R' or —OR', and each R' is independently as defined above and described herein.

In some embodiments, an electron-withdrawing group is halogen. In some embodiments, an electron-withdrawing group is —F. In some embodiments, an electron-withdrawing group is —Cl. In some embodiments, an electron-withdrawing group is —Br. In some embodiments, an electron-withdrawing group is —I. In some embodiments, an electron-withdrawing group is —C(O)R'. In some embodiments, an electron-withdrawing group is —C(O)R'. In some embodiments, an electron-withdrawing group is —C(O)OR'. In some embodiments, an electron-withdrawing group is —C(O)N(R')$_2$. In some embodiments, an electron-withdrawing group is —S(O)R'. In some embodiments, an electron-withdrawing group is —S(O)R'. In some embodiments, an electron-withdrawing group is —S(O)OR'. In some embodiments, an electron-withdrawing group is —S(O)N(R')$_2$. In some embodiments, an electron-withdrawing group is —S(O)$_2$R". In some embodiments, an electron-withdrawing group is —S(O)$_2$R'. In some embodiments, an electron-withdrawing group is —S(O)$_2$OR'. In some embodiments, an electron-withdrawing group is —S(O)$_2$N(R)$_2$. In some embodiments, an electron-withdrawing group is —CN. In some embodiments, an electron-withdrawing group is protonated amine. In some embodiments, an electron-withdrawing group is —N$^+$(R')$_3$. In some embodiments, an electron-withdrawing group is —NO$_2$. In some embodiments, an electron-withdrawing group is —P(O)(R")$_3$. In some embodiments, an electron-withdrawing group is —P(O)(R")$_3$, wherein each R" is independently R' or —OR'.

In some embodiments, at least one of $R^x$, $R^y$ and $R^z$ is —F. In some embodiments, at least two of $R^x$, $R^y$ and $R^z$ are —F. In some embodiments, at least three of $R^x$, $R^y$ and $R^z$ are —F. In some embodiments, at least four of $R^x$, $R^y$ and $R^z$ are —F. In some embodiments, at least five of $R^x$, $R^y$ and $R^z$ are —F. In some embodiments, at least six of $R^x$, $R^y$ and $R^z$ are —F. In some embodiments, at least seven of $R^x$, $R^y$ and $R^z$ are —F. In some embodiments, at least eight of $R^x$, $R^y$ and $R^z$ are —F. In some embodiments, at least nine of $R^x$, $R^y$ and $R^z$ are —F. In some embodiments, at least ten of $R^x$, $R^y$ and $R^z$ are —F.

In some embodiments, at least one of $R^y$ and $R^z$ is —F. In some embodiments, at least two of $R^y$ and $R^z$ are —F. In some embodiments, at least three of $R^y$ and $R^z$ are —F. In some embodiments, at least four of $R^y$ and $R^z$ are —F. In some embodiments, at least five of $R^y$ and $R^z$ are —F. In some embodiments, at least six of $R^y$ and $R^z$ are —F. In some embodiments, at least seven of $R^y$ and $R^z$ are —F. In some embodiments, at least eight of $R^y$ and $R^z$ are —F. In some embodiments, at least nine of $R^y$ and $R^z$ are —F. In some embodiments, all ten of $R^y$ and $R^z$ are —F.

In some embodiments, each of $R^x$, $R^y$ and $R^z$ is —F. In some embodiments, each of $R^y$ and $R^z$ is —F. In some embodiments, p is 5, q is 5, and each of $R^y$ and $R^z$ is —F.

In some embodiments,

[structure: central phenol with $(R^y)_p$-substituted phenyl and $(R^z)_q$-substituted phenyl at 2,6 positions; $(R^x)_m$ on central ring] is

[structure: central phenol with $(F)_p$-substituted phenyl and $(F)_q$-substituted phenyl at 2,6 positions; $(F)_m$ on central ring].

In some embodiments,

[structure: central phenol with $(R^y)_p$-phenyl and $(R^z)_q$-phenyl; $(R^x)_m$] is

[structure: central phenol with $(F)_p$-phenyl and $(F)_q$-phenyl].

In some embodiments,

[structure: central phenol with $(R^y)_p$-phenyl and $(R^z)_q$-phenyl; $(R^x)_m$] is -continued

[structure: central phenoxide with $C_6F_5$ groups at 2,6 positions]

(2,6-$(C_6F_5)_2C_6H_3O$—, decafluoroterphenoxide, DFTO).

In some embodiments, the present invention provides a compound of formula I having the structure of formula I-g:

I-g

[structure showing pyrrole with $(R^4)_n$, N=, $R^1$, $R^2$, $R^3$, M, $(R^5)_r$, O, with $C_6F_5$ groups]

In some embodiments, the present invention provides a compound of formula I-a having the structure of formula I-h:

I-h

[structure similar to I-g]

In some embodiments, the present invention provides a compound of formula II having the structure of formula II-c:

II-c

[structure showing $R^1$, N, M with two O-linked aryl groups bearing $C_6F_5$ substituents]

As generally defined above, each $R^4$ is independently hydrogen or optionally substituted $C_{1-4}$ aliphatic. In some embodiments, at least one $R^4$ is hydrogen. In some embodiments, each $R^4$ is hydrogen. In some embodiments, at least one $R^4$ is independently optionally substituted $C_{1-4}$ aliphatic. In some embodiments, each $R^4$ is independently optionally substituted $C_{1-4}$ aliphatic. In some embodiments, at least one $R^4$ is hydrogen, and at least one $R^4$ is independently optionally substituted $C_{1-4}$ aliphatic.

In some embodiments, $R^4$ is hydrogen. In some embodiments, $R^4$ is independently optionally substituted $C_{1-4}$ aliphatic. In some embodiments, $R^4$ is independently optionally substituted $C_{1-4}$ alkyl. In some embodiments, $R^4$ is optionally substituted methyl. In some embodiments, $R^4$ is methyl. In some embodiments, $R^4$ is optionally substituted ethyl. In some embodiments, $R^4$ is ethyl. In some embodiments, $R^4$ is optionally substituted propyl. In some embodiments, $R^4$ is propyl. In some embodiments, $R^4$ is n-propyl. In some embodiments, $R^4$ is isopropyl. In some embodiments, $R^4$ is optionally substituted butyl. In some embodiments, $R^4$ is butyl. In some embodiments, $R^4$ is n-butyl. In some embodiments, $R^4$ is sec-butyl. In some embodiments, $R^4$ is tert-butyl.

In some embodiments,

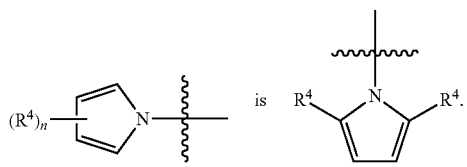

In some embodiments,

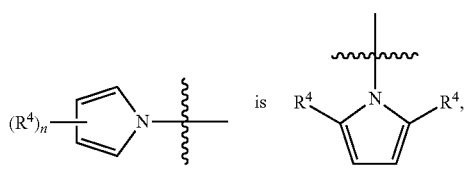

and each $R^4$ is independently optionally substituted $C_{1-4}$ aliphatic. In some embodiments,

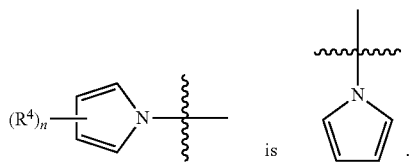

In some embodiments,

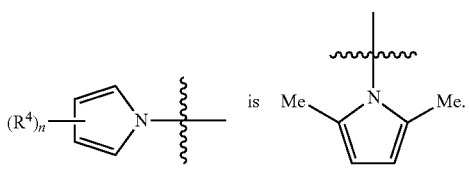

As generally defined above, each $R^5$ is independently a monodentate ligand, or two $R^5$ are optionally taken together to form a bidentate ligand.

In some embodiments, $R^5$ dissociates easily. In some embodiments, $R^5$ dissociates easily as detected by NMR. In some embodiments, $R^5$ is volatile and can be removed under vacuum.

In some embodiments, $R^5$ is a neutral ligand. In some embodiments, $R^5$ is a nitrogen-containing ligand. In some embodiments, $R^5$ is a neutral nitrogen-containing ligand. In some embodiments, $R^5$ is a neutral heteroaryl compound comprising a ring nitrogen atom bonded to M. In some embodiments, $R^5$ is pyridine. In some embodiments, $R^5$ is an oxygen-containing ligand. In some embodiments, $R^5$ is a neutral oxygen-containing ligand. In some embodiments, $R^5$ is an oxygen-containing ligand comprising a carbonyl group, wherein the ligand is bonded to M through the oxygen atom of the carbonyl group. In some embodiments, $R^5$ is a phosphine-containing ligand. In some embodiments, $R^5$ is a neutral phosphine-containing ligand. In some embodiments, a phosphine-containing ligand has the structure of $P(R')_3$, wherein each R' is independently as defined above and described herein.

In some embodiments, $R^5$ is a nitrile. In some embodiments, $R^5$ is R'—CN. In some embodiments, $R^5$ is $CH_3CN$.

In some embodiments, two $R^5$ are taken together to form a bidentate ligand. Exemplary bidentate ligands include but are not limited to

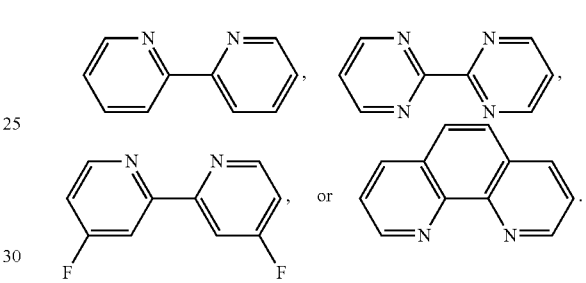

In some embodiments, two $R^5$ are taken together to form a bidentate ligand, wherein the ligand comprises two carbonyl groups, and the ligand is bonded to M through the two oxygen atoms of the two carbonyl groups. In some embodiments, an exemplary ligand is dicarbomethoxynorbornadiene (DCMNBD). In some embodiments, DCMNBD is coordinated to M as illustrated in $Mo(NC_6F_5)(CH_2CH_2)(DCMNBD)(DFTO)_2$.

As generally defined above, each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, R' is hydrogen. In some embodiments, R' is an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur. In some embodiments, two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

In some embodiments, R' is optionally substituted $C_{1-6}$ aliphatic. In some embodiments, R' is optionally substituted $C_{1-6}$ alkyl. In some embodiments, R' is optionally substituted hexyl, pentyl, butyl, propyl, ethyl or methyl. In some embodiments, R' is optionally substituted hexyl. In some embodiments, R' is optionally substituted pentyl. In some embodiments, R' is optionally substituted butyl. In some embodiments, R' is optionally substituted propyl. In some embodiments, R' is optionally substituted ethyl. In some embodiments, R' is optionally substituted methyl. In some embodiments, R' is hexyl. In some embodiments, R' is pentyl. In some embodiments, R' is butyl. In some embodiments, R' is propyl. In some embodiments, R' is ethyl. In some embodiments, R' is methyl. In some embodiments, R' is isopropyl. In some embodiments, R' is tert-butyl. In some embodiments, R' is —C(Me)$_2$Ph.

In some embodiments, R' is optionally substituted phenyl. In some embodiments, R' is optionally substituted phenyl wherein one or more substituents are halogen. In some embodiments, R' is optionally substituted phenyl wherein one or more substituents are —F. In some embodiments, R' is optionally substituted phenyl wherein one or more substituents are —Cl. In some embodiments, R' is optionally substituted phenyl wherein one or more substituents are —Br. In some embodiments, R' is optionally substituted phenyl wherein one or more substituents are —I. In some embodiments, R' is phenyl.

In some embodiments, R' is a 3-7 membered saturated or partially unsaturated carbocyclic ring. In some embodiments, R' is a 3-membered saturated or partially unsaturated carbocyclic ring. In some embodiments, R' is a 4-membered saturated or partially unsaturated carbocyclic ring. In some embodiments, R' is a 5-membered saturated or partially unsaturated carbocyclic ring. In some embodiments, R' is a 6-membered saturated or partially unsaturated carbocyclic ring. In some embodiments, R' is a 7-membered saturated or partially unsaturated carbocyclic ring. In some embodiments, R' is an optionally substituted cycloheptyl. In some embodiments, R' is an optionally substituted cyclohexyl. In some embodiments, R' is an optionally substituted cyclopentyl. In some embodiments, R' is an optionally substituted cyclobutyl. In some embodiments, R' is an optionally substituted cyclopropyl.

In some embodiments, R' is an 8-10 membered bicyclic saturated, partially unsaturated or aryl ring. In some embodiments, R' is an 8-10 membered bicyclic saturated ring. In some embodiments, R' is an 8-10 membered bicyclic partially unsaturated ring. In some embodiments, R' is an 8-10 membered bicyclic aryl ring.

In some embodiments, R' is a 5-6 membered monocyclic heteroaryl ring having 1-4 heteroatoms independently selected from nitrogen, oxygen, or sulfur. In some embodiments, R' is a substituted 5-6 membered monocyclic heteroaryl ring having 1-3 heteroatoms independently selected from nitrogen, oxygen, or sulfur. In some embodiments, R' is an unsubstituted 5-6 membered monocyclic heteroaryl ring having 1-3 heteroatoms independently selected from nitrogen, oxygen, or sulfur.

In some embodiments, R' is an optionally substituted 5-membered monocyclic heteroaryl ring having 1-3 heteroatoms independently selected from nitrogen, oxygen or sulfur. In some embodiments, R' is an optionally substituted 6-membered monocyclic heteroaryl ring having 1-3 heteroatoms independently selected from nitrogen, oxygen, or sulfur.

In some embodiments, R' is an optionally substituted 5-membered monocyclic heteroaryl ring having 1 heteroatom selected from nitrogen, oxygen, or sulfur. In some embodiments, R' is selected from pyrrolyl, furanyl, or thienyl.

In some embodiments, R' is an optionally substituted 5-membered heteroaryl ring having two heteroatoms independently selected from nitrogen, oxygen, or sulfur. In certain embodiments, R' is an optionally substituted 5-membered heteroaryl ring having one nitrogen atom, and an additional heteroatom selected from sulfur or oxygen. Exemplary R' groups include optionally substituted pyrazolyl, imidazolyl, thiazolyl, isothiazolyl, oxazolyl or isoxazolyl.

In some embodiments, R' is a 6-membered heteroaryl ring having 1-3 nitrogen atoms. In other embodiments, R' is an optionally substituted 6-membered heteroaryl ring having 1-2 nitrogen atoms. In some embodiments, R' is an optionally substituted 6-membered heteroaryl ring having two nitrogen atoms. In certain embodiments, R' is an optionally substituted 6-membered heteroaryl ring having one nitrogen. Exemplary R' groups include optionally substituted pyridinyl, pyrimidinyl, pyrazinyl, pyridazinyl, triazinyl, or tetrazinyl.

In some embodiments, R' is an optionally substituted 3-7 membered saturated or partially unsaturated heterocyclic ring having 1-2 heteroatoms independently selected from nitrogen, oxygen, or sulfur. In some embodiments, R' is a substituted 3-7 membered saturated or partially unsaturated heterocyclic ring having 1-2 heteroatoms independently selected from nitrogen, oxygen, or sulfur. In some embodiments, R' is an unsubstituted 3-7 membered saturated or partially unsaturated heterocyclic ring having 1-2 heteroatoms independently selected from nitrogen, oxygen, or sulfur.

In certain embodiments, R' is an optionally substituted 5-6 membered partially unsaturated monocyclic ring having 1-2 heteroatoms independently selected from nitrogen, oxygen, or sulfur. In certain embodiments, R' is an optionally substituted tetrahydropyridinyl, dihydrothiazolyl, dihydrooxazolyl, or oxazolinyl group.

In some embodiments, R' is an optionally substituted 6-membered saturated or partially unsaturated heterocyclic ring having 1-2 heteroatoms independently selected from nitrogen, oxygen, or sulfur. In some embodiments, R' is an optionally substituted 6-membered partially unsaturated heterocyclic ring having 2 heteroatoms independently selected from nitrogen, oxygen, or sulfur. In some embodiments, R' is an optionally substituted 6-membered partially unsaturated heterocyclic ring having 2 oxygen atom.

In certain embodiments, R' is an optionally substituted 5-6 membered partially unsaturated monocyclic ring having 1-2 heteroatoms independently selected from nitrogen, oxygen, or sulfur. In certain embodiments, R' is an optionally substituted tetrahydropyridinyl, dihydrothiazolyl, dihydrooxazolyl, or oxazolinyl group.

In certain embodiments, R' is optionally substituted oxiranyl, oxetanyl, tetrahydrofuranyl, tetrahydropyranyl, oxepaneyl, aziridineyl, azetidineyl, pyrrolidinyl, piperidinyl, azepanyl, thiiranyl, thietanyl, tetrahydrothiophenyl, tetrahydrothiopyranyl, thiepanyl, dioxolanyl, oxathiolanyl, oxazolidinyl, imidazolidinyl, thiazolidinyl, dithiolanyl, dioxanyl, morpholinyl, oxathianyl, piperazinyl, thiomorpholinyl, dithianyl, dioxepanyl, oxazepanyl, oxathiepanyl, dithiepanyl, diazepanyl, dihydrofuranonyl, tetrahydropyranonyl, oxepanonyl, pyrrolidinonyl, piperidinonyl, azepanonyl, dihydrothiophenonyl, tetrahydrothiopyranonyl, thiepanonyl, oxazolidinonyl, oxazinanonyl, oxazepanonyl, dioxolanonyl, dioxanonyl, dioxepanonyl, oxathiolinonyl, oxathianonyl, oxathiepanonyl, thiazolidinonyl, thiazinanonyl, thiazepanonyl, imidazolidinonyl, tetrahydropyrimidinonyl, diazepanonyl, imidazolidinedionyl, oxazolidinedionyl, thiazolidinedionyl, dioxolanedionyl, oxathiolanedionyl, piperazinedionyl, morpholinedionyl, thiomorpholinedionyl, tetrahydropyranyl, tetrahydrofuranyl, morpholinyl, thiomorpholinyl, piperidinyl, piperazinyl, pyrrolidinyl, tetrahydrothiophenyl, or tetrahydrothiopyranyl.

In some embodiments, R is a 7-10 membered bicyclic saturated or partially unsaturated heterocyclic ring having 1-5 heteroatoms independently selected from nitrogen, oxygen, or sulfur. In some embodiments, R' is an optionally substituted indolinyl. In some embodiments, R' is an optionally substituted isoindolinyl. In some embodiments, R' is an optionally substituted 1,2,3,4-tetrahydroquinoline. In some embodiments, R' is an optionally substituted 1,2,3,4-tetrahydroisoquinoline.

In some embodiments, R is an 8-10 membered bicyclic heteroaryl ring having 1-5 heteroatoms independently selected from nitrogen, oxygen, or sulfur. In some embodiments, R' is an optionally substituted 5,6-fused heteroaryl ring having 1-5 heteroatoms independently selected from nitrogen, oxygen, or sulfur. In other embodiments, R' is an optionally substituted 5,6-fused heteroaryl ring having 1-2 heteroatoms independently selected from nitrogen, oxygen, or sulfur. In certain embodiments, R' is an optionally substituted 5,6-fused heteroaryl ring having 1 heteroatom independently selected from nitrogen, oxygen, or sulfur. In some embodiments, R' is an optionally substituted indolyl. In some embodiments, R' is an optionally substituted azabicyclo[3.2.1]octanyl. In certain embodiments, R' is an optionally substituted 5,6-fused heteroaryl ring having 2 heteroatoms independently selected from nitrogen, oxygen, or sulfur. In some embodiments, R' is an optionally substituted azaindolyl. In some embodiments, R' is an optionally substituted benzimidazolyl. In some embodiments, R' is an optionally substituted benzothiazolyl. In some embodiments, R' is an optionally substituted benzoxazolyl. In some embodiments, R' is an optionally substituted indazolyl. In certain embodiments, R' is an optionally substituted 5,6-fused heteroaryl ring having 3 heteroatoms independently selected from nitrogen, oxygen, or sulfur.

In certain embodiments, R' is an optionally substituted 6,6-fused heteroaryl ring having 1-4 heteroatoms independently selected from nitrogen, oxygen, or sulfur. In some embodiments, R' is an optionally substituted 6,6-fused heteroaryl ring having 1-2 heteroatoms independently selected from nitrogen, oxygen, or sulfur. In other embodiments, R' is an optionally substituted 6,6-fused heteroaryl ring having 1 heteroatom independently selected from nitrogen, oxygen, or sulfur. In some embodiments, R' is an optionally substituted quinolinyl. In some embodiments, R' is an optionally substituted isoquinolinyl. According to one aspect, R' is an optionally substituted 6,6-fused heteroaryl ring having 2 heteroatoms independently selected from nitrogen, oxygen, or sulfur. In some embodiments, R' is a quinazoline or a quinoxaline.

In some embodiments, each of $R^x$, $R^y$, and $R^z$ is independently R', wherein R' is as defined above and described herein and is not hydrogen. In some embodiments, $R^x$ is R', wherein R' is as defined above and described herein and R' is not hydrogen. In some embodiments, $R^y$ is R', wherein R' is as defined above and described herein and R' is not hydrogen. In some embodiments, $R^z$ is R', wherein R' is as defined above and described herein and R' is not hydrogen.

The present invention, among other things, recognizes that provided compounds are particularly challenging to prepare. In some embodiments, a person having ordinary skill in the art, when using known methods in the art, cannot obtain a provided compound in satisfactory yields and/or purity. Monoaryloxide pyrrolide (MAP) imido alkylidene complexes of Mo and W were generally prepared through protonation of the corresponding bispyrrolide compounds using ArOH, wherein ArO— is the aryloxide ligand ((a) Ibrahem, I; Yu, M.; Schrock, R. R.; Hoveyda, A. H. *J. Am. Chem. Soc.* 2009, 131, 3844. (b) Flook, M. M.; Jiang, A. J.; Schrock, R. R.; Müller, P.; Hoveyda, A. H. *J. Am. Chem. Soc.* 2009, 131, 7962. (c) Jiang, A. J.; Zhao, Y.; Schrock, R. R.; Hoveyda, A. H. *J. Am. Chem. Soc.* 2009, 131, 16630. (d) Flook, M. M.; Gerber, L. C. H.; Debelouchina, G. T.; Schrock, R. R. *Macromolecules* 2010, 43, 7515. (e) Flook, M. M.; Ng, V. W. L.; Schrock, R. R. *J. Am. Chem. Soc.* 2011, 133, 1784. (f) Meek, S. J.; O'Brien, R. V.; Llayeria, J.; Schrock, R. R.; Hoveyda, A. H. *Nature* 2011, 471, 461. (g) Marinescu, S. C.; Schrock, R. R.; Müller, P.; Takase, M. K.; Hoveyda, A. H. *Organometallics* 2011, 30, 1780. (h) Yu, M.; Ibrahem, I.; Hasegawa, M.; Schrock, R. R.; Hoveyda, A. H. *J. Am. Chem. Soc.* 2012, 134, 2788. (i) Townsend, E. M.; Schrock, R. R.; Hoveyda, A. H. *J. Am. Chem. Soc.* 2012, 134, 11334. (j) Wang, C.; Yu, M.; Kyle, A. F.; Jacubec, P.; Dixon, D. J.; Schrock, R. R.; Hoveyda, A. H. *Chem. Eur. J.* 2013, 19, 2726. (k) Wang, C.; Haeffner, F.; Schrock, R. R.; Hoveyda, A. H. *Angew. Chem. Int. Ed.* 2013, 52, 1939. (l) Flook, M. M.; Börner, J.; Kilyanek, S.; Gerber, L. C. H.; Schrock, R. R. *Organometallics* 2012, 31, 6231). For example, treatment of $Mo(NC_6F_5)(CHCMe_2Ph)(Me_2Pyr)_2$ with one equivalent of 2,6-dimesitylphenol (HMTOH) at 70° C. for 16 h led to formation of the MAP complex $Mo(NC_6F_5)(CHCMe_2Ph)(Me_2Pyr)(HMTO)$ in 60% yield. However, when this method was used for the preparation of a provided compound of this invention, $Mo(NC_6F_5)(CHCMe_2Ph)(DFTO)_2$, a complex mixture was formed: addition of one equivalent of DFTOH to $Mo(NC_6F_5)(CHCMe_2Ph)(Me_2Pyr)_2$ at 22° C. or −30° C. in toluene followed by warming the sample to 20° C. produced an approximate 1:1:1 mixture of $Mo(NC_6F_5)(CHCMe_2Ph)(Me_2Pyr)_2$, $Mo(NC_6F_5)(CHCMe_2Ph)(Me_2Pyr)(DFTO)$ and $Mo(NC_6F_5)(CHCMe_2Ph)(DFTO)_2$. New methods are required for the preparation of provided MAP species, for example, compounds of formula I.

In some embodiments, the present invention provides methods for preparing provided compounds. In some embodiments, the present invention provides a method for preparing a compound having the structure of formula I, comprising steps of:

1) providing a compound having the structure of formula III:

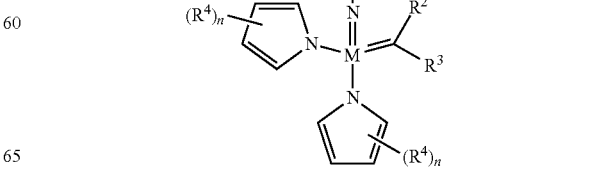

wherein each variable is independently as defined above and described herein;

2) providing a first ligand or ligand precursor; and 3) reacting the compound of formula III with a second ligand or ligand precursor in the presence of the first ligand or ligand precursor, wherein the second ligand or ligand precursor having the structure of formula IV:

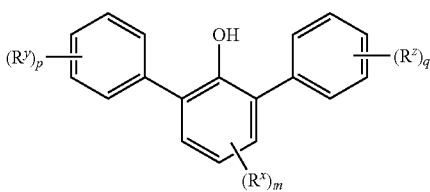

IV or its salt thereof, wherein each variable is independently as defined above and described herein.

In some embodiments, the present invention provides a method for preparing a compound having the structure of formula I-a, comprising:

1) providing a compound having the structure of formula III:

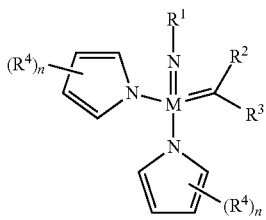

III wherein each variable is independently as defined above and described herein;

2) providing a first ligand or ligand precursor;

3) reacting the compound of formula III with a second ligand or ligand precursor in the presence of the first ligand or ligand precursor, wherein the second ligand or ligand precursor having the structure of formula IV:

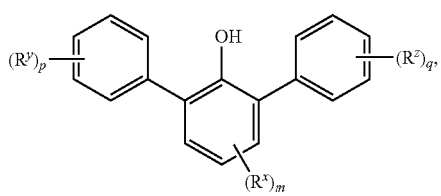

IV or its salt thereof, wherein each variable is independently as defined above and described herein.

In some embodiments, a provided method for preparing a compound having the structure of formula I-a further comprising a step of removing the first ligand or ligand precursor. In some embodiments, a provided method for preparing a compound having the structure of formula I-a further comprising a step of converting a compound of formula I, wherein r is 1-2, into a compound of formula I-a. In some embodiments, a provided method for preparing a compound having the structure of formula I-a comprising the step of converting a compound of formula I, wherein r is 1, into a compound of formula I-a. In some embodiments, a provided method for preparing a compound having the structure of formula I-a comprising the step of converting a compound of formula I, wherein r is 2, into a compound of formula I-a. In some embodiments, the process of converting a compound of formula I, wherein r is 1-2, into a compound of formula I-a comprises the use of reduced pressure. In some embodiments, a compound of formula I, wherein r is 1-2, is converted into a compound of formula I-a by subjecting the compound of formula I to reduced pressure.

In some embodiments, a compound of formula III has the structure of formula III-a:

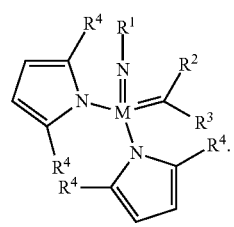

III-a

In some embodiments, a first ligand or ligand precursor is a monodentate ligand. In some embodiments, a first ligand or ligand precursor is $R^5$. In some embodiments, a first ligand or ligand precursor is a bidentate ligand. In some embodiments, a first ligand or ligand precursor is a bidentate ligand formed by two $R^5$ taken together. Exemplary embodiments of $R^5$ are as defined above and described herein. In some embodiments, a first ligand or ligand precursor is a neutral oxygen-, nitrogen-, or phosphorus-containing ligand. In some embodiments, a first ligand or ligand precursor is pyridine. In some embodiments, a first ligand or ligand precursor is a nitrile. In some embodiments, a first ligand or ligand precursor has the structure of R'—CN. In some embodiments, a first ligand or ligand precursor is acetonitrile. In some embodiments, a first ligand or ligand precursor dissociates easily and can be removed, for example, under vacuum.

In some embodiments, a compound of formula IV has the structure of formula IV-a:

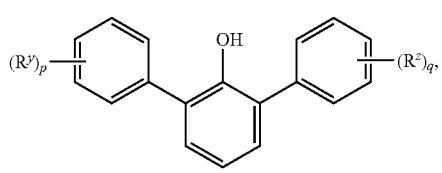

IV-a or its salt thereof.

In some embodiments, a compound of formula IV has the structure of formula IV-b:

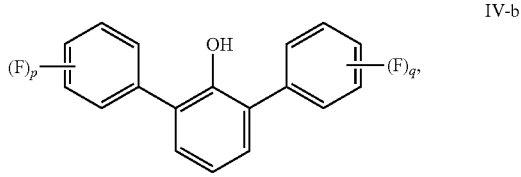

or its salt thereof.

In some embodiments, a compound of formula IV is DFTOH. In some embodiments, a compound of formula IV is DFTOLi.

In some embodiments, the present invention provides a method for preparing a compound having the structure of formula II, comprising:

reacting a compound having the structure of formula V:

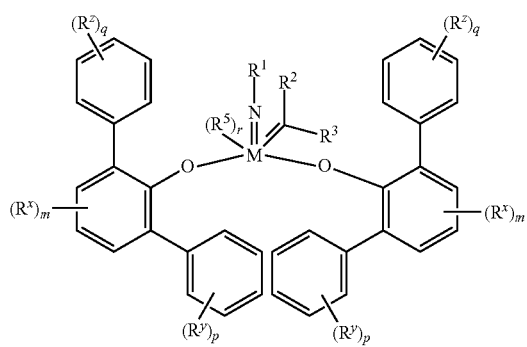

wherein each variable is independently as defined above and described herein;
with an olefin.

In some embodiments, the present invention provides a method for preparing a compound having the structure of formula II-a, comprising:

reacting a compound having the structure of formula V-a:

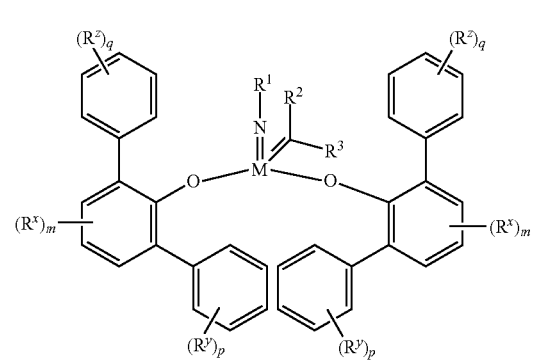

wherein each variable is independently as defined above and described herein;
with ethylene.

In some embodiments, the present invention provides a method for preparing a compound having the structure of formula II', comprising:

reacting a compound having the structure of formula II-a with a ligand or ligand precursor comprising or having the structure of $R^5$.

In some embodiments, ethylene is added externally. In some embodiments, ethylene is generated through the reaction of a compound of formula V with an olefin.

In some other embodiments, a provided compound has unexpected stability and/or reactivity. In some embodiments, a provided compound comprising an ethylene ligand, for example, a compound of formula II, promotes metathesis reactions with unexpectedly high efficiency. In some embodiments, a metathesis reaction is ring-opening metathesis polymerization (ROMP).

Exemplary compounds having the structure of formula I include but are not limited to those depicted below:
$Mo(NC_6F_5)(CHCMe_2Ph)(Me_2Pyr)(DFTO)$, $Mo(NC_6F_5)(CHCMe_2Ph)(Me_2Pyr)(DFTO)(MeCN)$, $Mo(N(2,6-Me_2C_6H_3))(CHCMe_2Ph)(Me_2Pyr)(DFTO)$, and $Mo(N(2,6-Me_2C_6H_3))(CHCMe_2Ph)(Me_2Pyr)(DFTO)(MeCN)$.

Exemplary compounds having the structure of formula II include but are not limited to those depicted below:
$Mo(NC_6F_5)(CH_2CH_2)(DFTO)_2$, $Mo(NC_6F_5)(^{13}CH_2^{13}CH_2)(DFTO)_2$, and $Mo(NC_6F_5)(CH_2CH_2)(DCMNBD)(DFTO)_2$, $Mo(NC_6F_5)(CH_2CH_2CH_2)(DFTO)_2$, $Mo(NC_6F_5)(CH_2CH_2CH_2CH_2)(DFTO)_2$, $Mo(NC_6F_5)(^{13}CH_2^{13}CH_2^{13}CH_2)(DFTO)_2$, and $Mo(NC_6F_5)(^{13}CH_2^{13}CH_2^{13}CH_2^{13}CH_2)(DFTO)_2$.

In some embodiments, a compound having the structure of formula III is $Mo(NC_6F_5)(CHCMe_2Ph)(Me_2Pyr)_2$.

In some embodiments, a compound having the structure of formula IV is DFTOH or its salt thereof. In some embodiments, a compound having the structure of formula IV is DFTOH. In some embodiments, a compound having the structure of formula IV is DFTLi.

Exemplary compounds having the structure of formula V include but are not limited to those depicted below:
$Mo(NC_6F_5)(CHCMe_2Ph)(DFTO)_2$, $Mo(NC_6F_5)(CHCH=C(Me)Ph)(DFTO)_2$, $Mo(N(2,6-i-Pr_2C_6H_3))(CHCMe_2Ph)(DFTO)_2$, $Mo(N(2,6-Me_2C_6H_3))(CHCMe_2Ph)(DFTO)_2$, and $Mo(N(1-adamantyl))(CHCMe_2Ph)(DFTO)_2$.

In some embodiments, a compound of formula V is selected from $Mo(N(2,6-i-Pr_2C_6H_3))(CHCMe_2Ph)(DFTO)_2$, $Mo(N(2,6-i-Pr_2C_6H_3))(CHCMe_2Ph)(DFTO)_2$, $Mo(N(2,6-Me_2C_6H_3))(CHCMe_2Ph)(DFTO)_2$, and $Mo(N(1-adamantyl))(CHCMe_2Ph)(DFTO)_2$.

In some other embodiments, the present invention provides methods for metathesis reactions. In some embodiments, a provided method comprises providing a compound provided by this invention. In some embodiments, a provided method produces a product with unexpected selectivity. For example, ROMP of dicarbomethoxynorbornadiene (DCMNBD) promoted by a compound of formula I or II produces polymers with high cis, isotactic selectivity.

In some embodiments, the present invention provides a method for performing a metathesis reaction, comprising providing a compound having the structure of formula I, II, or V. In some embodiments, the present invention provides a method for performing a metathesis reaction, comprising providing a compound having the structure of formula I or II. In some embodiments, the present invention provides a method for performing a metathesis reaction, comprising providing a compound having the structure of formula I. In some embodiments, the present invention provides a method for performing a metathesis reaction, comprising providing a compound having the structure of formula II. In some embodiments, a metathesis reaction is olefin metathesis. In some embodiments, a metathesis reaction is ring-opening metathesis polymerization (ROMP). In some embodiments, a metathesis reaction is ROMP, and a product is produced with cis, isotactic selectivity.

In some embodiments, the present invention provides a method for ring-opening metathesis polymerization (ROMP), comprising providing a compound having the structure of formula I, wherein the ROMP polymer product has greater than about 50% isotactic structure.

In some embodiments, the present invention provides a method for ring-opening metathesis polymerization (ROMP), comprising providing a compound having the structure of formula II, wherein the ROMP polymer product has greater than about 50% isotactic structure.

In some embodiments, the present invention provides a method for ring-opening metathesis polymerization (ROMP), comprising providing a compound having the structure of formula V, wherein the ROMP polymer product has greater than about 50% isotactic structure.

In some embodiments, an ROMP product is greater than about 50% isotactic. In some embodiments, an ROMP product is greater than about 60% isotactic. In some embodiments, an ROMP product is greater than about 70% isotactic. In some embodiments, an ROMP product is greater than about 80% isotactic. In some embodiments, an ROMP product is greater than about 85% isotactic. In some embodiments, an ROMP product is greater than about 90% isotactic. In some embodiments, an ROMP product is greater than about 91% isotactic. In some embodiments, an ROMP product is greater than about 92% isotactic. In some embodiments, an ROMP product is greater than about 93% isotactic. In some embodiments, an ROMP product is greater than about 94% isotactic. In some embodiments, an ROMP product is greater than about 95% isotactic. In some embodiments, an ROMP product is greater than about 96% isotactic. In some embodiments, an ROMP product is greater than about 97% isotactic. In some embodiments, an ROMP product is greater than about 98% isotactic. In some embodiments, an ROMP product is greater than about 99% isotactic.

In some embodiments, an ROMP product is greater than about 50% cis. In some embodiments, an ROMP product is greater than about 60% cis. In some embodiments, an ROMP product is greater than about 70% cis. In some embodiments, an ROMP product is greater than about 80% cis. In some embodiments, an ROMP product is greater than about 85% cis. In some embodiments, an ROMP product is greater than about 90% cis. In some embodiments, an ROMP product is greater than about 91% cis. In some embodiments, an ROMP product is greater than about 92% cis. In some embodiments, an ROMP product is greater than about 93% cis. In some embodiments, an ROMP product is greater than about 94% cis. In some embodiments, an ROMP product is greater than about 95% cis. In some embodiments, an ROMP product is greater than about 96% cis. In some embodiments, an ROMP product is greater than about 97% cis. In some embodiments, an ROMP product is greater than about 98% cis. In some embodiments, an ROMP product is greater than about 99% cis.

In some embodiments, an ROMP product is greater than about 50% cis and greater than about 50% isotactic. In some embodiments, an ROMP product is greater than about 60% cis and greater than about 50% isotactic. In some embodiments, an ROMP product is greater than about 70% cis and greater than about 50% isotactic. In some embodiments, an ROMP product is greater than about 80% cis and greater than about 50% isotactic. In some embodiments, an ROMP product is greater than about 85% cis and greater than about 50% isotactic. In some embodiments, an ROMP product is greater than about 90% cis and greater than about 50% isotactic. In some embodiments, an ROMP product is greater than about 95% cis and greater than about 50% isotactic. In some embodiments, an ROMP product is greater than about 98% cis and greater than about 50% isotactic. In some embodiments, an ROMP product is greater than about 90% cis and greater than about 60% isotactic. In some embodiments, an ROMP product is greater than about 90% cis and greater than about 70% isotactic. In some embodiments, an ROMP product is greater than about 90% cis and greater than about 80% isotactic. In some embodiments, an ROMP product is greater than about 90% cis and greater than about 90% isotactic. In some embodiments, an ROMP product is greater than about 95% cis and greater than about 90% isotactic. In some embodiments, an ROMP product is greater than about 98% cis and greater than about 90% isotactic. In some embodiments, an ROMP product is greater than about 95% cis and greater than about 95% isotactic.

In some embodiments, the present invention provides exemplary compounds and methods as follows:

E1. A compound of formula I:

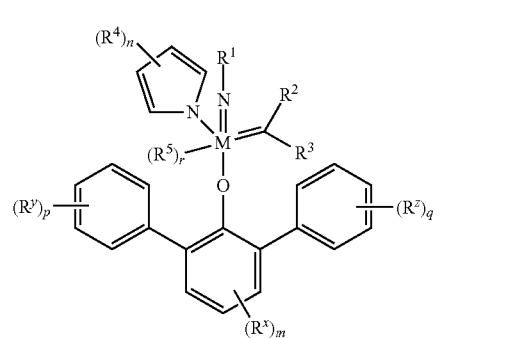

wherein:

M is molybdenum or tungsten;

$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR'SO$_2$R';

m is 0-3;

n is 0-4;

each of p and q is independently 0-5, and at least one of p and q is not 0;

r is 0-2;

each of $R^x$, $R^y$ and $R^z$ is independently an electron-withdrawing group;

each $R^4$ is independently hydrogen or optionally substituted $C_{1-4}$ aliphatic;

each $R^5$ is independently a monodentate ligand, or two $R^5$ are optionally taken together to form a bidentate ligand; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

E2. The compound of example E1, wherein r is 1.

E3. The compound of any one of the preceding examples, wherein $R^5$ is a neutral ligand.

E4. The compound of any one of the preceding examples, wherein $R^5$ is R'—CN.

E5. The compound of any one of the preceding examples, wherein $R^5$ is $CH_3CN$.

E6. The compound of example E1, wherein the compound has the structure of formula I-a:

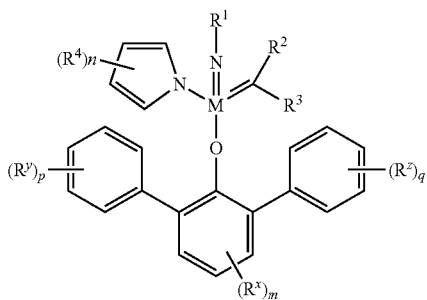

I-a

E7. The compound of any one of the preceding examples, wherein each of $R^2$ and $R^3$ is independently R'.

E8. The compound of any one of the preceding examples, wherein one of $R^2$ and $R^3$ is hydrogen and the other is not hydrogen.

E9. The compound of any one of the preceding examples, wherein one of $R^2$ and $R^3$ is hydrogen and the other is optionally substituted $C_{1-20}$ aliphatic.

E10. The compound of any one of the preceding examples, wherein one of $R^2$ and $R^3$ is hydrogen and the other is —$C(Me)_3$ or —$C(Me)_2Ph$.

E11. The compound of any one of the preceding examples, wherein n is 2.

E12. The compound of any one of the preceding examples, wherein

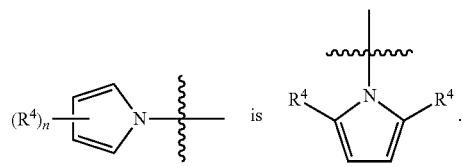

E13. The compound of any of the preceding examples, wherein $R^4$ is optionally substituted $C_{1-4}$ aliphatic.

E14. The compound of any one of the preceding examples, wherein $R^4$ is methyl.

E15. The compound of any one of examples E1-E10, wherein n is 0.

E16. A compound of formula II:

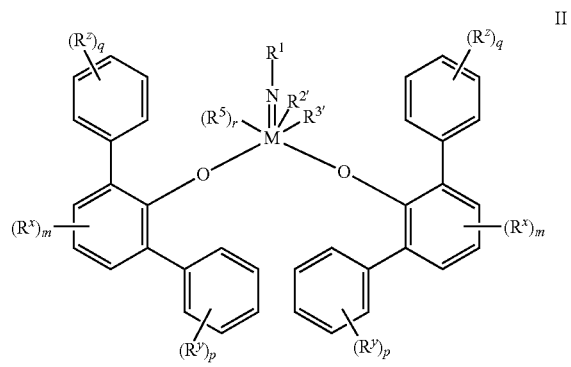

II wherein

M is molybdenum or tungsten;

$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

$R^{2'}$ and $R^{3'}$ are taken together with their intervening metal atoms to form an optionally substituted 3-8 membered saturated or partially unsaturated ring having, in addition to the intervening metal atom, 0-4 heteroatoms independently selected from nitrogen, oxygen, or sulfur;

m is 0-3;

each of p and q is independently 0-5, and at least one of p and q is not 0;

r is 0-2;

each of $R^x$, $R^y$ and $R^z$ is independently an electron-withdrawing group;

each $R^5$ is independently a monodentate ligand, or two $R^5$ are optionally taken together to form a bidentate ligand; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

E17. The compound of example E16, wherein $R^{2'}$ and $R^{3'}$ are taken together with M to form an optionally substituted 3-membered ring.

E18. The compound of example E17, wherein the compound has the structure of formula II':

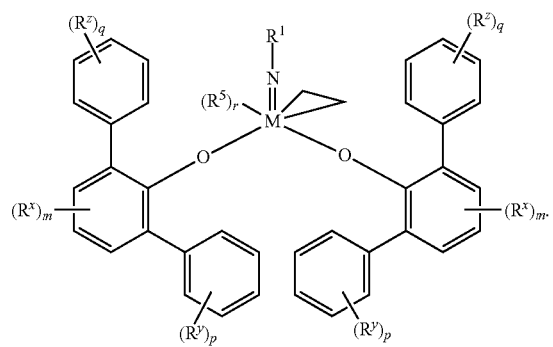

II'

E19. The compound of example E16, wherein $R^{2'}$ and $R^{3'}$ are taken together with M to form an optionally substituted 4-membered ring.

E20. The compound of example E16, wherein $R^{2'}$ and $R^{3'}$ are taken together with M to form an optionally substituted 5-membered ring.

E21. The compound of any one of examples E16-E20, wherein r is 0.

E22. The compound of any one of examples E16-E20, wherein r is 1 or 2.

E23. The compound of example E22, wherein r is 1 and $R^5$ is R'CN.

E24. The compound of example E22, wherein two $R^5$ are taken together to form a bidentate ligand.

E25. The compound of example E24, wherein the bidentate ligand is DCMNBD.

E26. The compound of example E16, wherein the compound has the structure of formula II-a:

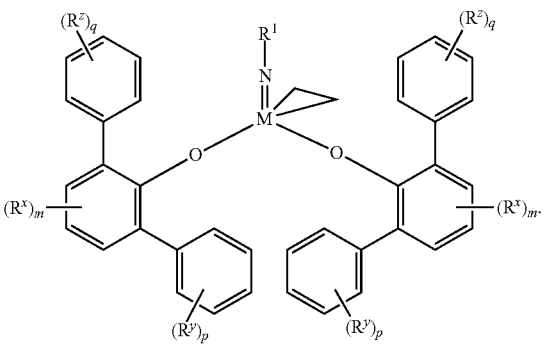

II-a

E27. The compound of any one of the preceding examples, wherein one of $R^x$ is —F.

E28. The compound of any one of the preceding examples, wherein m is 0.

E29. The compound of any one of the preceding examples, wherein p is 1-5.

E30. The compound of any one of the preceding examples, wherein p is 5.

E31. The compound of any one of the preceding examples, wherein q is 1-5.

E32. The compound of any one of the preceding examples, wherein q is 5.

E33. The compound of any one of the preceding examples, wherein at least one of $R^y$ or $R^z$ is —F.

E34. The compound of any one of the preceding examples, wherein each of $R^y$ and $R^z$ is —F.

E35. The compound of any of the preceding examples, wherein

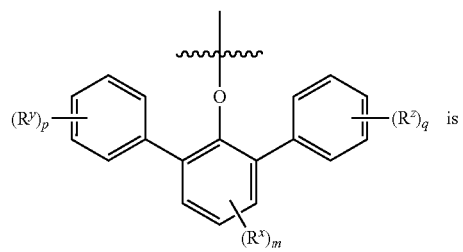 is

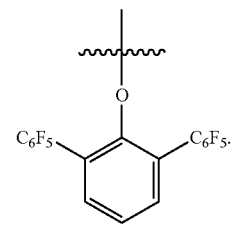

E36. The compound of example E1, wherein the compound has the structure of formula I-b:

E37. The compound of example E1, wherein the compound has the structure of formula I-b:

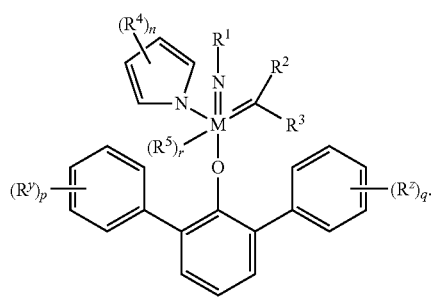

I-b

E38. The compound of example E1, wherein the compound has the structure of formula I-c:

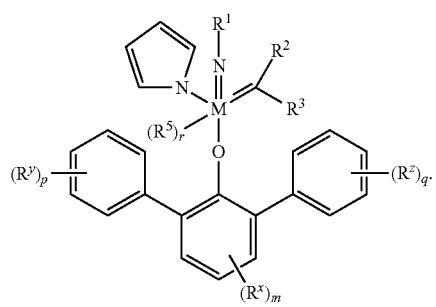

I-c

E39. The compound of example E1, wherein the compound has the structure of formula I-d:

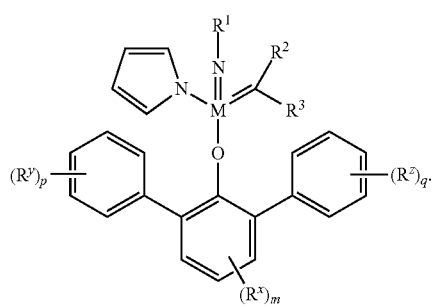

I-d

E40. The compound of example E1, wherein the compound has the structure of formula I-e:

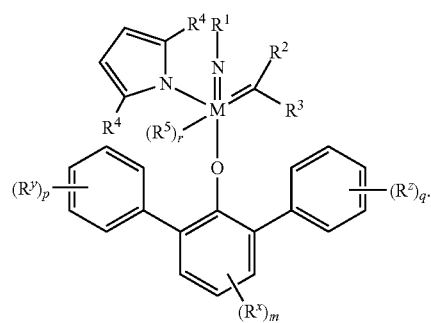

I-e

E40. The compound of example E1, wherein the compound has the structure of formula I-f:

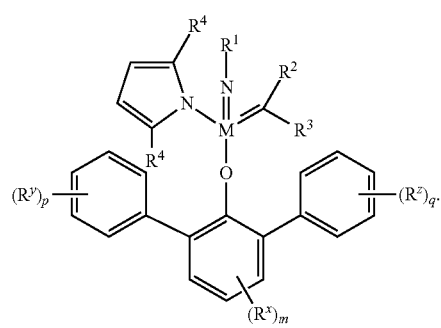

I-f

E41. The compound of example E1, wherein the compound has the structure of formula I-g:

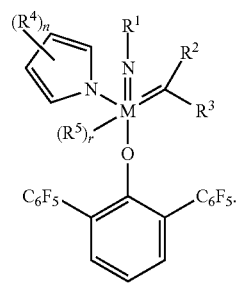

I-g

E42. The compound of example E1, wherein the compound has the structure of formula I-h:

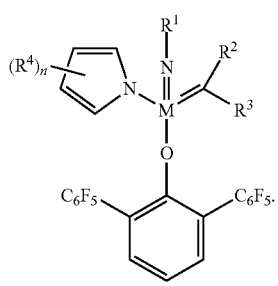

I-h

E43. The compound of example E16, wherein the compound has the structure of formula II-b:

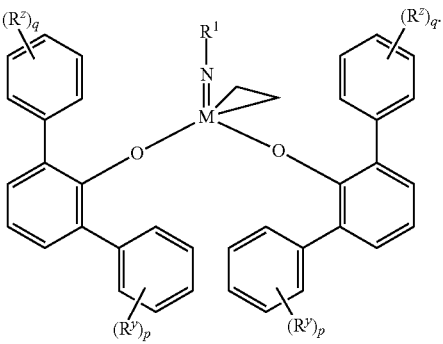

II-b

E44. The compound of example E16, wherein the compound has the structure of formula II-c:

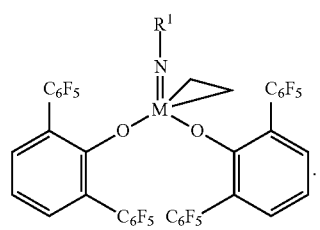

II-c

E45. The compound of any one of the preceding examples, wherein $R^1$ is optionally substituted $C_{1-20}$ aliphatic.

E46. The compound of any one of the preceding examples, wherein $R^1$ is adamantyl.

E47. The compound of any one of examples E1-E34, wherein $R^1$ is optionally substituted phenyl.

E48. The compound of any one of examples E1-E44, wherein $R^1$ is selected from

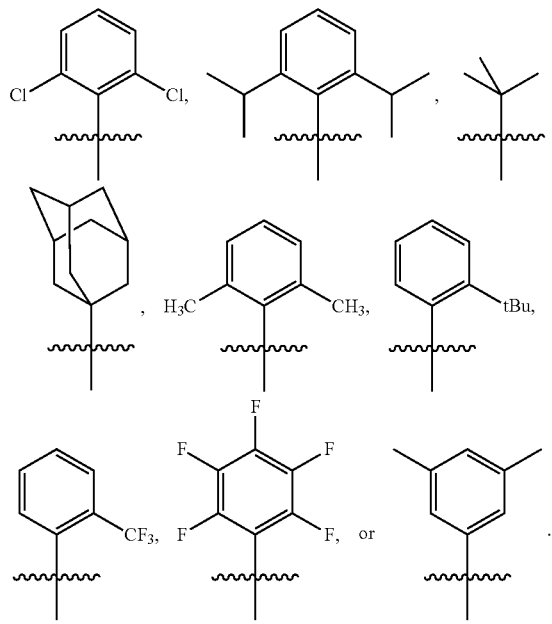

E49. A method for preparing a compound having the structure of formula I:

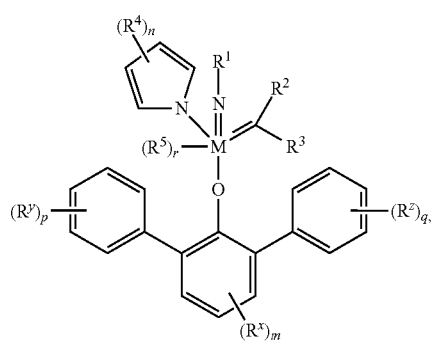

I comprising steps of:

1) providing a compound having the structure of formula III:

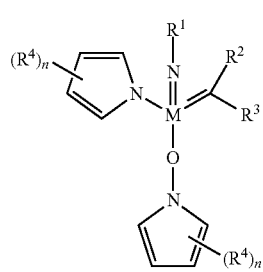

III 2) providing a first ligand or ligand precursor; and 3) reacting the compound of formula III with a second ligand or ligand precursor in the presence of the first ligand or ligand precursor, wherein the second ligand or ligand precursor having the structure of formula IV:

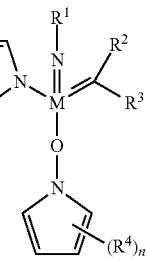

IV or its salt thereof.

E50. The method of example 49, wherein a compound of formula I has the structure of formula I-a.

E51. The method of example 50, further comprising a step of converting a compound of formula I, wherein r is 1-2, into a compound of formula I-a.

E52. The method of any one of examples E49-E51, wherein a first ligand or ligand precursor is $R^5$.

E53. The method of any one of examples E49-E52, wherein a first ligand or ligand precursor has the structure of R'—CN.

E54. The method of example E53, wherein a first ligand or ligand precursor is $CH_3CN$.

E55. The method of example E54, wherein the solvent of a reaction in the method comprises $CH_3CN$.

E56. The method of any one of examples E49-E55, wherein each of $R^2$ and $R^3$ is independently R'.

E57. The method of any one of examples E49-E56, wherein one of $R^2$ and $R^3$ is hydrogen and the other is not hydrogen.

E58. The method of any one of examples E49-E58, wherein one of $R^2$ and $R^3$ is hydrogen and the other is optionally substituted $C_{1-20}$ aliphatic.

E59. The method of any one of examples E49-E58, wherein one of $R^2$ and $R^3$ is hydrogen and the other is —$C(Me)_3$ or —$C(Me)_2Ph$.

E60. The method of any one of examples E49-E59, wherein n is 2.

E61. The method of any one of examples E49-E60, wherein

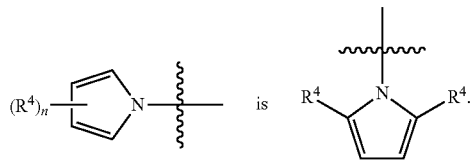

E62. The method of any one of examples E49-E61, wherein $R^4$ is optionally substituted $C_{1-4}$ aliphatic.
E63. The method of any one of examples E49-E62, wherein $R^4$ is methyl.
E64. The method of any one of examples E49-E59, wherein n is 0.
E65. A method for preparing a compound having the structure of formula II, comprising:
reacting a compound having the structure of formula V:

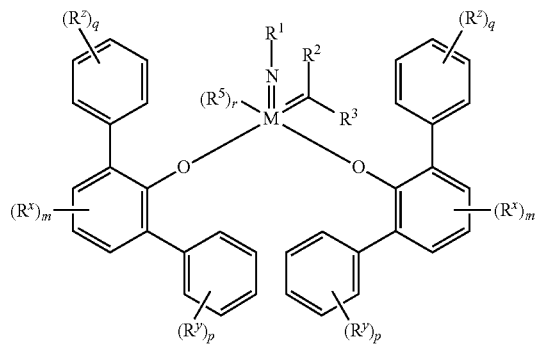

with an olefin.
E66 The method of example E65, wherein:
the compound of formula II has the structure of formula II-a;
the compound of formula V has the structure of formula V-a; and
the olefin is ethylene.
E67. A method for preparing a compound having the structure of formula II', comprising:
reacting a compound having the structure of formula II-a with a ligand or ligand precursor comprising or having the structure of $R^5$.
E68. The method of any one of examples E49-E67, wherein one of $R^x$ is —F.
E69. The method of any one of examples E49-E67, wherein m is 0.
E70. The method of any one of examples E49-E69, wherein p is 1-5.
E71. The method of any one of examples E49-E70, wherein p is 5.
E72. The method of any one of examples E49-E71, wherein q is 1-5.
E73. The method of any one of examples E49-E72, wherein q is 5.
E74. The method of any one of examples E49-E73, wherein at least one of $R^y$ or $R^z$ is —F.
E75. The method of any one of examples E49-E74, wherein each of $R^y$ and $R^z$ is —F.

E76. The method of any one of examples E49-E75, wherein

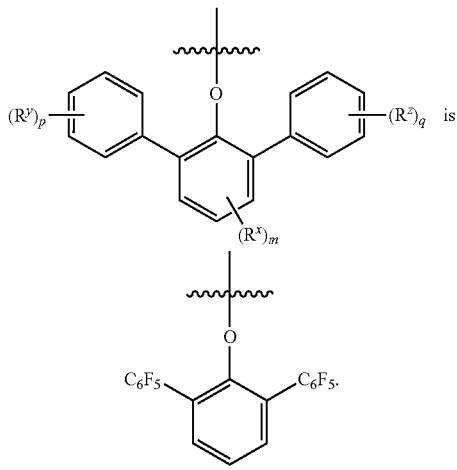

E77. A method for performing a metathesis reaction, comprising providing a compound having the structure of formula I, II, or V.
E78. The method of example E77, wherein the metathesis reaction is olefin metathesis.
E79. The method of example E77, wherein the reaction is ring-opening metathesis polymerization (ROMP).
E80. The method of example E79, wherein the ROMP polymer product is greater than about 50% isotactic.
E81. The method of example E79, wherein the ROMP polymer product is greater than about 60% isotactic.
E82. The method of example E79, wherein the ROMP polymer product is greater than about 70% isotactic.
E83. The method of example E79, wherein the ROMP polymer product is greater than about 80% isotactic.
E84. The method of example E79, wherein the ROMP polymer product is greater than about 90% isotactic.
E85. The method of example E79, wherein the ROMP polymer product is greater than about 95% isotactic.
E86. The method of example E79, wherein the ROMP polymer product is greater than about 98% isotactic.
E87. The method of any one of examples E79-E86, wherein the ROMP polymer product is greater than about 50% cis.
E88. The method of any one of examples E79-E86, wherein the ROMP polymer product is greater than about 60% cis.
E89. The method of any one of examples E79-E86, wherein the ROMP polymer product is greater than about 70% cis.
E90. The method of any one of examples E79-E86, wherein the ROMP polymer product is greater than about 80% cis.
E91. The method of any one of examples E79-E86, wherein the ROMP polymer product is greater than about 90% cis.
E92. The method of any one of examples E79-E86, wherein the ROMP polymer product is greater than about 95% cis.
E93. The method of any one of examples E79-E92, wherein the ROMP substrate is dicarbomethoxynorbornadiene (DC-MNBD).
E94. The method of any one of examples E79-E92, wherein the ROMP substrate is norbornene.
E95. The method of any one of examples E79-E92, wherein the ROMP substrate is 3-methyl-3-phenylcyclopropene (MPCP).
E96. The method of any one of examples E77-E93, wherein the compound has the structure of formula I or II.
E97. The method of any one of examples E77-E93, wherein the compound has the structure of formula I or II is a compound of any one of examples 1-48.

E98. The method of example E77, wherein the compound has the structure of formula I.
E99. The method of example E77, wherein the compound has the structure of formula II.
E100. The method of example E77, wherein the compound has the structure of formula V.
E101. A compound selected from:
Mo(NC$_6$F$_5$)(CHCMe$_2$Ph)(Me$_2$Pyr)(DFTO), Mo(NC$_6$F$_5$)(CHCMe$_2$Ph)(Me$_2$Pyr)(DFTO)(MeCN), Mo(N(2,6-Me$_2$C$_6$H$_3$))(CHCMe$_2$Ph)(Me$_2$Pyr)(DFTO), and Mo(N(2,6-Me$_2$C$_6$H$_3$))(CHCMe$_2$Ph)(Me$_2$Pyr)(DFTO)(MeCN).
E102. A compound selected from:
Mo(NC$_6$F$_5$)(CH$_2$CH$_2$)(DFTO)$_2$, Mo(NC$_6$F$_5$)($^{13}$CH$_2$$^{13}$CH$_2$)(DFTO)$_2$, and Mo(NC$_6$F$_5$)(CH$_2$CH$_2$)(DCMNBD)(DFTO)$_2$, Mo(NC$_6$F$_5$)(CH$_2$CH$_2$CH$_2$)(DFTO)$_2$, Mo(NC$_6$F$_5$)(CH$_2$CH$_2$CH$_2$CH$_2$)(DFTO)$_2$, Mo(NC$_6$F$_5$)($^{13}$CH$_2$$^{13}$CH$_2$$^{13}$CH$_2$)(DFTO)$_2$, and Mo(NC$_6$F$_5$)($^{13}$CH$_2$$^{13}$CH$_2$$^{13}$CH$_2$$^{13}$CH$_2$) (DFTO)$_2$.
E103. The method of any one of examples 77-95, wherein the compound has the structure of formula I or II is a compound of examples E101 or E102.

Conditions

In some embodiments, a ligand is provided in a molar ratio of about 10:1, 9:1, 8:1, 7:1, 6:1, 5:1, 4:1, 3:1, 2:1, or 1:1 relative to the metal. In some embodiments, a ligand is provided in a molar ratio of about 0.9:1, 0.8:1, 0.7:1, 0.6:1, 0.5:1, 0.4:1, 0.3:1, 0.2:1, or 0.1:1 relative to the metal. In certain embodiments, a ligand is provided in a molar ratio of about 1:1 relative to the metal. One of skill in the art will appreciate that the optimal molar ratio of ligand to metal will depend on, inter alia, whether the ligand is mono- or polydentate. In some embodiments, a ligand or ligand precursor having the structure of formula I is provided in a molar ratio of about 1:1 to Mo or W.

Suitable conditions for performing provided methods generally employ one or more solvents. In certain embodiments, one or more organic solvents are used. Examples of such organic solvents include, but are not limited to, hydrocarbons such as benzene, toluene, and pentane, halogenated hydrocarbons such as dichloromethane, or polar aprotic solvents, such as ethereal solvents including ether, tetrahydrofuran (THF), or dioxanes, or protic solvents, such as alcohols, or mixtures thereof. In certain embodiments, one or more solvents are deuterated.

In some embodiments, a single solvent is used. In certain embodiments, a solvent is benzene. In certain embodiments, a solvent is ether. In some embodiments, a solvent is a nitrile. In some embodiments, a solvent is acetonitrile.

In some embodiments, mixtures of two or more solvents are used, and in some cases may be preferred to a single solvent. In certain embodiments, the solvent mixture is a mixture of an ethereal solvent and a hydrocarbon. Exemplary such mixtures include, for instance, an ether/benzene mixture. Solvent mixtures may be comprised of equal volumes of each solvent or may contain one solvent in excess of the other solvent or solvents. In certain embodiments wherein a solvent mixture is comprised of two solvents, the solvents may be present in a ratio of about 20:1, about 10:1, about 9:1, about 8:1, about 7:1, about 6:1, about 5:1, about 4:1, about 3:1, about 2:1, or about 1:1. In certain embodiments wherein a solvent mixture comprises an ethereal solvent and a hydrocarbon, the solvents may be present in a ratio of about 20:1, about 10:1, about 9:1, about 8:1, about 7:1, about 6:1, about 5:1, about 4:1, about 3:1, about 2:1, or about 1:1 ethereal solvent:hydrocarbon. In certain embodiments, the solvent mixture comprises a mixture of ether and benzene in a ratio of about 5:1. One of skill in the art would appreciate that other solvent mixtures and/or ratios are contemplated herein, that the selection of such other solvent mixtures and/or ratios will depend on the solubility of species present in the reaction (e.g., substrates, additives, etc.), and that experimentation required to optimized the solvent mixture and/or ratio would be routine in the art and not undue.

Suitable conditions, in some embodiments, employ ambient temperatures. In some embodiments, a suitable temperature is about 15° C., about 20° C., about 25° C., or about 30° C. In some embodiments, a suitable temperature is from about 15° C. to about 25° C. In certain embodiments, a suitable temperature is about 20° C., 21° C., 22° C., 23° C., 24° C., or 25° C.

In certain embodiments, a provided method is performed at elevated temperature. In some embodiments, a suitable temperature is from about 25° C. to about 110° C. In certain embodiments, a suitable temperature is from about 40° C. to about 100° C., from about 50° C. to about 100° C., from about 60° C. to about 100° C., from about 70° C. to about 100° C., from about 80° C. to about 100° C., or from about 90° C. to about 100° C. In some embodiments, a suitable temperature is about 80° C. In some embodiments, a suitable temperature is about 30° C. In some embodiments, a suitable temperature is about 40° C. In some embodiments, a suitable temperature is about 50° C. In some embodiments, a suitable temperature is about 60° C. In some embodiments, a suitable temperature is about 70° C. In some embodiments, a suitable temperature is about 80° C. In some embodiments, a suitable temperature is about 90° C. In some embodiments, a suitable temperature is about 100° C. In some embodiments, a suitable temperature is about 110° C.

In certain embodiments, a provided method is performed at temperature lower than ambient temperatures. In some embodiments, a suitable temperature is from about −100° C. to about 10° C. In certain embodiments, a suitable temperature is from about −80° C. to about 0° C. In certain embodiments, a suitable temperature is from about −70° C. to about 10° C. In certain embodiments, a suitable temperature is from about −60° C. to about 10° C. In certain embodiments, a suitable temperature is from about −50° C. to about 10° C. In certain embodiments, a suitable temperature is from about −40° C. to about 10° C. In certain embodiments, a suitable temperature is or from about −30° C. to about 10° C. In some embodiments, a suitable temperature is below 0° C. In some embodiments, a suitable temperature is about −100° C. In some embodiments, a suitable temperature is about −90° C. In some embodiments, a suitable temperature is about −80° C. In some embodiments, a suitable temperature is about −70° C. In some embodiments, a suitable temperature is about −60° C. In some embodiments, a suitable temperature is about −50° C. In some embodiments, a suitable temperature is about −40° C. In some embodiments, a suitable temperature is about −30° C. In some embodiments, a suitable temperature is about −20° C. In some embodiments, a suitable temperature is about −10° C. In some embodiments, a suitable temperature is about 0° C. In some embodiments, a suitable temperature is about 10° C.

In some embodiments, a provided method is performed at different temperatures. In some embodiments, temperature changes in a provided method. In some embodiments, a provided method involves temperature increase from a lower suitable temperature to a higher suitable temperature. In some embodiments, a provided method comprises temperature increase from about −80° C., about −70° C., about −60° C., about −50° C., about −40° C., about −30° C., about −20° C., about −10° C., and about 0° C. to about 0° C., about 10° C., about 20° C., ambient temperature, about 22° C., about 25°

C., about 30° C., about 40° C., about 50° C., about 60° C., about 70° C., about 80° C., about 90° C., about 100° C. and about 110° C. In some embodiments, a provided method comprises temperature increase from about −30° C. to 22° C. In some embodiments, a provided method comprises temperature decrease from a higher suitable temperature to a lower suitable temperature. In some embodiments, a provided method comprises temperature increase from about 110° C., about 100° C., about 90° C., about 80° C., about 70° C., about 60° C., about 50° C., about 40° C., about 30° C., about 25° C., about 22° C., ambient temperature, about 20° C., about 10° C., and about 0° C. to about 0° C., about −10° C., about −20° C., about −30° C., about −40° C., about −50° C., about −60° C., about −70° C., about −80° C., about −90° C., and about −100° C.

Suitable conditions typically involve reaction times of about 1 minute to about one or more days. In some embodiments, the reaction time ranges from about 0.5 hour to about 20 hours. In some embodiments, the reaction time ranges from about 0.5 hour to about 15 hours. In some embodiments, the reaction time ranges from about 1.0 hour to about 12 hours. In some embodiments, the reaction time ranges from about 1 hour to about 10 hours. In some embodiments, the reaction time ranges from about 1 hour to about 8 hours. In some embodiments, the reaction time ranges from about 1 hour to about 6 hours. In some embodiments, the reaction time ranges from about 1 hour to about 4 hours. In some embodiments, the reaction time ranges from about 1 hour to about 2 hours. In some embodiments, the reaction time ranges from about 2 hours to about 8 hours. In some embodiments, the reaction time ranges from about 2 hours to about 4 hours. In some embodiments, the reaction time ranges from about 2 hours to about 3 hours. In certain embodiments, the reaction time is about 1, 2, 3, 4, 5, 6, 7, 8, 9, 10, 11, or 12 hours. In certain embodiments, the reaction time is about 1 hour. In certain embodiments, the reaction time is about 2 hours. In certain embodiments, the reaction time is about 3 hours. In certain embodiments, the reaction time is about 4 hours. In certain embodiments, the reaction time is about 5 hours. In certain embodiments, the reaction time is about 6 hours. In some embodiments, the reaction time is about 12 hours. In certain embodiments, the reaction time is less than about 1 hour. In certain embodiments, the reaction time is about 5, 10, 15, 20, 25, 30, 35, 40, 45, 50, or 55 minutes. In some embodiments, the reaction time is about 5 minutes. In some embodiments, the reaction time is about 10 minutes. In some embodiments, the reaction time is about 15 minutes. In some embodiments, the reaction time is about 20 minutes. In some embodiments, the reaction time is about 25 minutes. In some embodiments, the reaction time is about 30 minutes. In some embodiments, the reaction time is about 35 minutes. In some embodiments, the reaction time is about 40 minutes. In some embodiments, the reaction time is about 100 minutes. In some embodiments, the reaction time is about 110 minutes. In some embodiments, the reaction time is about 200 minutes. In some embodiments, the reaction time is about 300 minutes. In some embodiments, the reaction time is about 400 minutes.

In some embodiments, a provided metal complex compound, e.g. a compound of formula I or II, or an active catalyst formed from a provided compound, is stable under metathesis conditions. In some embodiments, a provided compound, or an active catalyst formed from a provided compound, decomposes under metathesis conditions. In some embodiments, a provided compound, or an active catalyst formed from a provided compound, decomposes under metathesis conditions within about 1 hour. In some embodiments, a provided compound, or an active catalyst formed from a provided compound, decomposes under metathesis conditions within about 2 hours. In some embodiments, a provided compound, or an active catalyst formed from a provided compound, decomposes under metathesis conditions within about 6 hours. In some embodiments, a provided compound, or an active catalyst formed from a provided compound, decomposes under metathesis conditions within about 12 hours. In some embodiments, a provided compound, or an active catalyst formed from a provided compound, decomposes under metathesis conditions within about 24 hours. In some embodiments, a provided compound, or an active catalyst formed from a provided compound, decomposes under metathesis conditions within about 48 hours. In some embodiments, a provided compound, or an active catalyst formed from a provided compound, decomposes under metathesis conditions within about 96 hours.

Some embodiments may provide the ability to selectively synthesize, via a metathesis reaction, products having a Z or E configuration about a double bond. In some embodiments, a method of the present invention provides the ability to synthesize compounds comprising a Z-olefin. In some embodiments, such methods are useful when applied to a wide range of olefin substrates, including those having sterically small or large groups adjacent the olefin. In some embodiments, the substrate olefins are terminal olefins.

In some embodiments, the present invention provides a method for Z-selective metathesis reactions. In some embodiments, a provided method produces a double bond in a Z:E ratio greater than about 1:1, greater than about 2:1, greater than about 3:1, greater than about 4:1, greater than about 5:1, greater than about 6:1, greater than about 7:1, greater than about 8:1, greater than about 9:1, greater than about 95:5, greater than about 96:4, greater than about 97:3, greater than about 98:2, or, in some cases, greater than about 99:1, as determined using methods described herein (e.g., HPLC or NMR). In some cases, about 100% of the double bond produced in the metathesis reaction may have a Z configuration. The Z or cis selectivity may also be expressed as a percentage of product formed. In some cases, the product may be greater than about 50% Z, greater than about 60% Z, greater than about 70% Z, greater than about 80% Z, greater than about 90% Z, greater than about 95% Z, greater than about 96% Z, greater than about 97% Z, greater than about 98% Z, greater than about 99% Z, or, in some cases, greater than about 99.5% Z.

In some embodiments, a metathesis reaction using a compound of the present invention produces a polymer wherein the polymer is >50% cis, >50% syndiotactic. In some embodiments, a metathesis reaction using a compound of the present invention produces a polymer wherein the polymer is >60% cis, >60% syndiotactic. In some embodiments, a metathesis reaction using a compound of the present invention produces a polymer wherein the polymer is >70% cis, >70% syndiotactic. In some embodiments, a metathesis reaction using a compound of the present invention produces a polymer wherein the polymer is 80% cis, >80% syndiotactic. In some embodiments, a metathesis reaction using a compound of the present invention produces a polymer wherein the polymer is >90% cis, 90% syndiotactic. In some embodiments, a metathesis reaction using a compound of the present invention produces a polymer wherein the polymer is >95% cis, 90% syndiotactic. In some embodiments, a metathesis reaction using a compound of the present invention produces a polymer wherein the polymer is >99% cis, 90% syndiotactic. In some embodiments, a metathesis reaction using a compound of the present invention produces a polymer wherein the polymer is >90% cis, >95% syndiotactic. In some embodiments, a metathesis reaction using a compound of the present invention produces a polymer wherein the polymer is >95% cis, >95% syndiotactic. In some embodiments, a metathesis reaction using a compound of the present invention produces a polymer wherein the polymer is >99% cis, >90% syndiotactic. In some embodiments, a metathesis reaction using a compound of the present invention produces a polymer wherein the polymer is >99% cis, >95% syndiotactic. In some embodiments, a metathesis reaction using a compound of the present invention produces a polymer wherein the polymer is >99% cis, >97% syndiotactic. In some embodiments, a metathesis reaction using a compound of the present invention produces a polymer wherein the polymer is >99% cis, >99% syndiotactic.

In some embodiments, an ROMP product is greater than about 50% isotactic. In some embodiments, an ROMP product is greater than about 60% isotactic. In some embodiments, an ROMP product is greater than about 70% isotactic. In some embodiments, an ROMP product is greater than about 80% isotactic. In some embodiments, an ROMP product is greater than about 85% isotactic. In some embodiments, an ROMP product is greater than about 90% isotactic. In some embodiments, an ROMP product is greater than about 91% isotactic. In some embodiments, an ROMP product is greater than about 92% isotactic. In some embodiments, an ROMP product is greater than about 93% isotactic. In some embodiments, an ROMP product is greater than about 94% isotactic. In some embodiments, an ROMP product is greater than about 95% isotactic. In some embodiments, an ROMP product is greater than about 96% isotactic. In some embodiments, an ROMP product is greater than about 97% isotactic. In some embodiments, an ROMP product is greater than about 98% isotactic. In some embodiments, an ROMP product is greater than about 99% isotactic.

In some embodiments, an ROMP product is greater than about 50% cis. In some embodiments, an ROMP product is greater than about 60% cis. In some embodiments, an ROMP product is greater than about 70% cis. In some embodiments, an ROMP product is greater than about 80% cis. In some embodiments, an ROMP product is greater than about 85% cis. In some embodiments, an ROMP product is greater than about 90% cis. In some embodiments, an ROMP product is greater than about 91% cis. In some embodiments, an ROMP product is greater than about 92% cis. In some embodiments, an ROMP product is greater than about 93% cis. In some embodiments, an ROMP product is greater than about 94% cis. In some embodiments, an ROMP product is greater than about 95% cis. In some embodiments, an ROMP product is greater than about 96% cis. In some embodiments, an ROMP product is greater than about 97% cis. In some embodiments, an ROMP product is greater than about 98% cis. In some embodiments, an ROMP product is greater than about 99% cis.

In some embodiments, an ROMP product is greater than about 50% cis and greater than about 50% isotactic. In some embodiments, an ROMP product is greater than about 60% cis and greater than about 50% isotactic. In some embodiments, an ROMP product is greater than about 70% cis and greater than about 50% isotactic. In some embodiments, an ROMP product is greater than about 80% cis and greater than about 50% isotactic. In some embodiments, an ROMP product is greater than about 85% cis and greater than about 50% isotactic. In some embodiments, an ROMP product is greater than about 90% cis and greater than about 50% isotactic. In some embodiments, an ROMP product is greater than about 95% cis and greater than about 50% isotactic. In some embodiments, an ROMP product is greater than about 98% cis and greater than about 50% isotactic. In some embodiments, an ROMP product is greater than about 90% cis and greater than about 60% isotactic. In some embodiments, an ROMP product is greater than about 90% cis and greater than about 70% isotactic. In some embodiments, an ROMP product is greater than about 90% cis and greater than about 80% isotactic. In some embodiments, an ROMP product is greater than about 90% cis and greater than about 90% isotactic. In some embodiments, an ROMP product is greater than about 95% cis and greater than about 90% isotactic. In some embodiments, an ROMP product is greater than about 98% cis and greater than about 90% isotactic. In some embodiments, an ROMP product is greater than about 95% cis and greater than about 95% isotactic.

In some embodiments, a metathesis reaction using a compound of the present invention produces a polymer wherein the polymer is >50% cis, >50% isotactic. In some embodiments, a metathesis reaction using a compound of the present invention produces a polymer wherein the polymer is >60% cis, >60% isotactic. In some embodiments, a metathesis reaction using a compound of the present invention produces a polymer wherein the polymer is >70% cis, >70% isotactic. In some embodiments, a metathesis reaction using a compound of the present invention produces a polymer wherein the polymer is 80% cis, >80% isotactic. In some embodiments, a metathesis reaction using a compound of the present invention produces a polymer wherein the polymer is >90% cis, 90% isotactic. In some embodiments, a metathesis reaction using a compound of the present invention produces a polymer wherein the polymer is >95% cis, 90% isotactic. In some embodiments, a metathesis reaction using a compound of the present invention produces a polymer wherein the polymer is >99% cis, 90% isotactic. In some embodiments, a metathesis reaction using a compound of the present invention produces a polymer wherein the polymer is >90% cis, >95% isotactic. In some embodiments, a metathesis reaction using a compound of the present invention produces a polymer wherein the polymer is >95% cis, >95% isotactic. In some embodiments, a metathesis reaction using a compound of the present invention produces a polymer wherein the polymer is >99% cis, >90% isotactic. In some embodiments, a metathesis reaction using a compound of the present invention produces a polymer wherein the polymer is >99% cis, >95% isotactic. In some embodiments, a metathesis reaction using a compound of the present invention produces a polymer wherein the polymer is >99% cis, >97% isotactic. In some embodiments, a metathesis reaction using a compound of the present invention produces a polymer wherein the polymer is >99% cis, >99% isotactic.

In some embodiments, a provided method requires an amount of a provided compound (e.g., a metal complex having the structure of formula I or II) such that the loading is from about 0.01 mol % to about 20 mol % of the provided compound relative to substrate (e.g., a first or second double bond). In certain embodiments, a provided compound is used in an amount of between about 0.01 mol % to about 10 mol %. In certain embodiments, a provided compound is used in an amount of between about 0.01 mol % to about 6 mol %. In certain embodiments, a provided compound is used in an amount of between about 0.01 mol % to about 5 mol %. In certain embodiments, a provided compound is used in an amount of between about 0.01 mol % to about 4 mol %. In certain embodiments, a provided compound is used in an amount of between about 0.01 mol % to about 3 mol %. In certain embodiments, a provided compound is used in an amount of between about 0.01 mol % to about 1 mol %. In certain embodiments, a provided compound is used in an amount of between about 0.01 mol % to about 0.5 mol %. In certain embodiments, a provided compound is used in an amount of between about 0.01 mol % to about 0.2 mol %. In certain embodiments, a provided compound is used in an amount of about 0.05%, 0.1%, 0.2%, 0.5%, 1%, 2%, 3 mol %, 4 mol %, 5 mol %, 6 mol %, 7 mol %, 8 mol %, 9 mol %, or 10 mol %.

In some embodiments, a method of the present invention requires an amount of solvent such that the concentration of the reaction is between about 0.01 M and about 1 M. In some embodiments, the concentration of the reaction is between about 0.01 M and about 0.5 M. In some embodiments, the concentration of the reaction is between about 0.01 M and about 0.1 M. In some embodiments, the concentration of the reaction is between about 0.01 M and about 0.05 M. In some embodiments, the concentration of the reaction is about 0.01 M. In some embodiments, the concentration of the reaction is about 0.02 M. In some embodiments, the concentration of the reaction is about 0.03 M. In some embodiments, the concentration of the reaction is about 0.04 M. In some embodiments, the concentration of the reaction is about 0.05 M. In some embodiments, the concentration of the reaction is about 0.1 M. In some embodiments, the concentration of the reaction is about 0.3 M.

In some embodiments, a method of the present invention is performed at ambient pressure. In some embodiments, a method of the present invention is performed at reduced pressure. In some embodiments, a method of the present invention is performed at a pressure of less than about 20 torr. In some embodiments, a method of the present invention is performed at a pressure of less than about 15 torr. In some embodiments, a method of the present invention is performed at a pressure of less than about 10 torr. In some embodiments, a method of the present invention is performed at a pressure of about 9, 8, 7, 6, 5, 4, 3, 2, or 1 torr. In certain embodiments, a method of the present invention is performed at a pressure of about 7 torr. In certain embodiments, a method of the present invention is performed at a pressure of about 1 torr.

In some embodiments, a method of the present invention is performed at increased pressure. In some embodiments, a method of the present invention is performed at greater than about 1 atm. In some embodiments, a method of the present invention is performed at greater than about 2 atm. In some embodiments, a method of the present invention is performed at greater than about 3 atm. In some embodiments, a method of the present invention is performed at greater than about 5 atm. In some embodiments, a method of the present invention is performed at greater than about 10 atm. In some embodiments, a method of the present invention is performed at about 2 atm. In some embodiments, a method of the present invention is performed at about 3 atm. In some embodiments, a method of the present invention is performed at about 5 atm. In some embodiments, a method of the present invention is performed at about 10 atm.

As mentioned above, provided compounds are useful for metathesis reactions. Exemplary such methods and reactions are described below.

It will be appreciated that, in certain embodiments, each variable recited is as defined above and described in embodiments, herein, both singly and in combination.

Exemplification

The present invention recognizes, among other things, that there is a continuing demand for compounds and methods for highly efficient and stereoselective metathesis reactions. In some embodiments, the present invention provides novel compounds for metathesis reactions, their preparation methods and use thereof. In some embodiments, the prevent invention provides novel methods for metathesis. Exemplary but non-limiting examples are depicted herein.

Synthesis of BisDFTO Mo Complexes

Treatment of $Mo(NR)(CHCMe_2Ph)(OTf)_2(DME)$ complexes with two equivalents of DFTOLi ($LiO-2,6-(C_6F_5)_2C_6H_3$) at $-30°$ C. in toluene gave the bisDFTO complexes, $Mo(NR)(CHCMe_2Ph)(DFTO)_2$ (1a-1d; $R=2,6-i-Pr_2C_6H_3$, $2,6-Me_2C_6H_3$, $C_6F_5$, and 1-adamantyl; equation 1). These complexes also can be prepared through addition of two equivalents of DFTOH to $Mo(NR)(CHCMe_2Ph)(Me_2Pyr)_2$ in diethyl ether at room temperature.

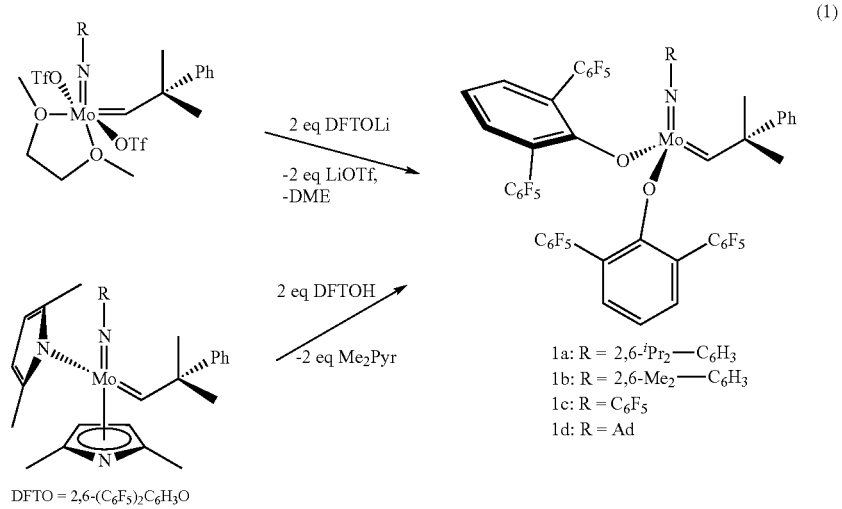

In $^{19}$F NMR spectra of 1a-1d at 20° C., one para, two meta and two ortho fluorine resonances are observed (FIG. 1). Without the intention to be limited by any theory, the presence of two meta and two ortho resonances is consistent with hindered rotation of the C$_6$F$_5$ ring about the C—C connection between C$_6$F$_5$ rings and the central phenyl ring, but free rotation about the Mo—O bonds on the NMR time scale. The $^{19}$F NMR spectrum of 1c at −80° C. reveals resonances (some overlapping) for eight ortho fluorines, eight meta fluorines, and four para fluorines, consistent with no molecular symmetry for 1c on the NMR time scale at that temperature. An X-ray structure (Yuan, J.; Schrock, R. R.; Müller, P.; Axtell, J. C.; Dobereiner, G. E. *Organometallics* 2012, 31, 4650) revealed that the two DFTO ligands are oriented approximately perpendicular to each other to give an enantiomorphic atropisomer in the solid state. The DFTO ligands in the atropisomer resemble the two halves of a baseball cover with the basic C$_2$ symmetry being reduced to C$_s$ as a consequence of the presence of the imido and alkylidene ligands. While not wishing to be limited by theory, we propose that the atropisomeric form leads to the inequivalence of all twenty DFTO fluorines on the NMR time scale. In some embodiments, rotation of the two DFTO ligands past one another and past the imido and alkylidene ligands creates a mirror plane on the NMR time scale at higher temperatures that coincides with the N$_{imido}$—Mo—C plane.

Synthesis of MAP complexes

Treatment of Mo(NC$_6$F$_5$)(CHCMe$_2$Ph)(Me$_2$Pyr)$_2$ with one equivalent of 2,6-dimesitylphenol (HMTOH) at 70° C. for 16 h led to formation of the MAP complex Mo(NC$_6$F$_5$)(CHCMe$_2$Ph)(Me$_2$Pyr)(HMTO) in 60% yield (equation 2). However, addition of one equivalent of DFTOH to Mo(NC$_6$F$_5$)(CHCMe$_2$Ph)(Me$_2$Pyr)$_2$ at 22° C. or −30° C. in toluene followed by warming the sample to 20° C., produced an approximate 1:1:1 mixture of Mo(NC$_6$F$_5$)(CHCMe$_2$Ph)(Me$_2$Pyr)$_2$, Mo(NC$_6$F$_5$)(CHCMe$_2$Ph)(Me$_2$Pyr)(DFTO) (2b) and Mo(NC$_6$F$_5$)(CHCMe$_2$Ph)(DFTO)$_2$ (1c) (through $^1$H NMR integration of alkylidene resonances). Known methods failed to deliver the desired MAP compounds in satisfactory yield and/or purity. To solve this problem, the present invention, among other things, provides new methods for preparing MAP compounds provided in this invention. In some embodiments, a provided MAP compound has the structure of formula I.

In contrast to the previously known method, when reactions between Mo(NC$_6$F$_5$)(CHCMe$_2$Ph)(Me$_2$Pyr)$_2$ and DFTOH were carried out in acetonitrile, Mo(NC$_6$F$_5$)(CHCMe$_2$Ph)(Me$_2$Pyr)(DFTO)(MeCN) (2b') was isolated as an orange solid in 75% yield. Without the intention to be limited by theory, proton NMR studies suggest that the acetonitrile in 2b' dissociates readily; indeed, it can be removed by dissolving 2b' in toluene and removing the toluene and acetonitrile in vacuo in several cycles. Compound 2b was obtained as a red-orange solid that could be recrystallized from a mixture of diethyl ether and pentane. While not wishing to be limited by theory, we propose that in the reaction between Mo(NC$_6$F$_5$)(CHCMe$_2$Ph)(Me$_2$Pyr)$_2$ and DFTOH acetonitrile is a good enough ligand to prevent overprotonation since the oxygen of DFTOH must bind to the metal before the proton can transfer to the pyrrolide ligand; acetonitrile is also a poor enough ligand in this situation to be removed from 2b' in vacuo.

Figure 2:
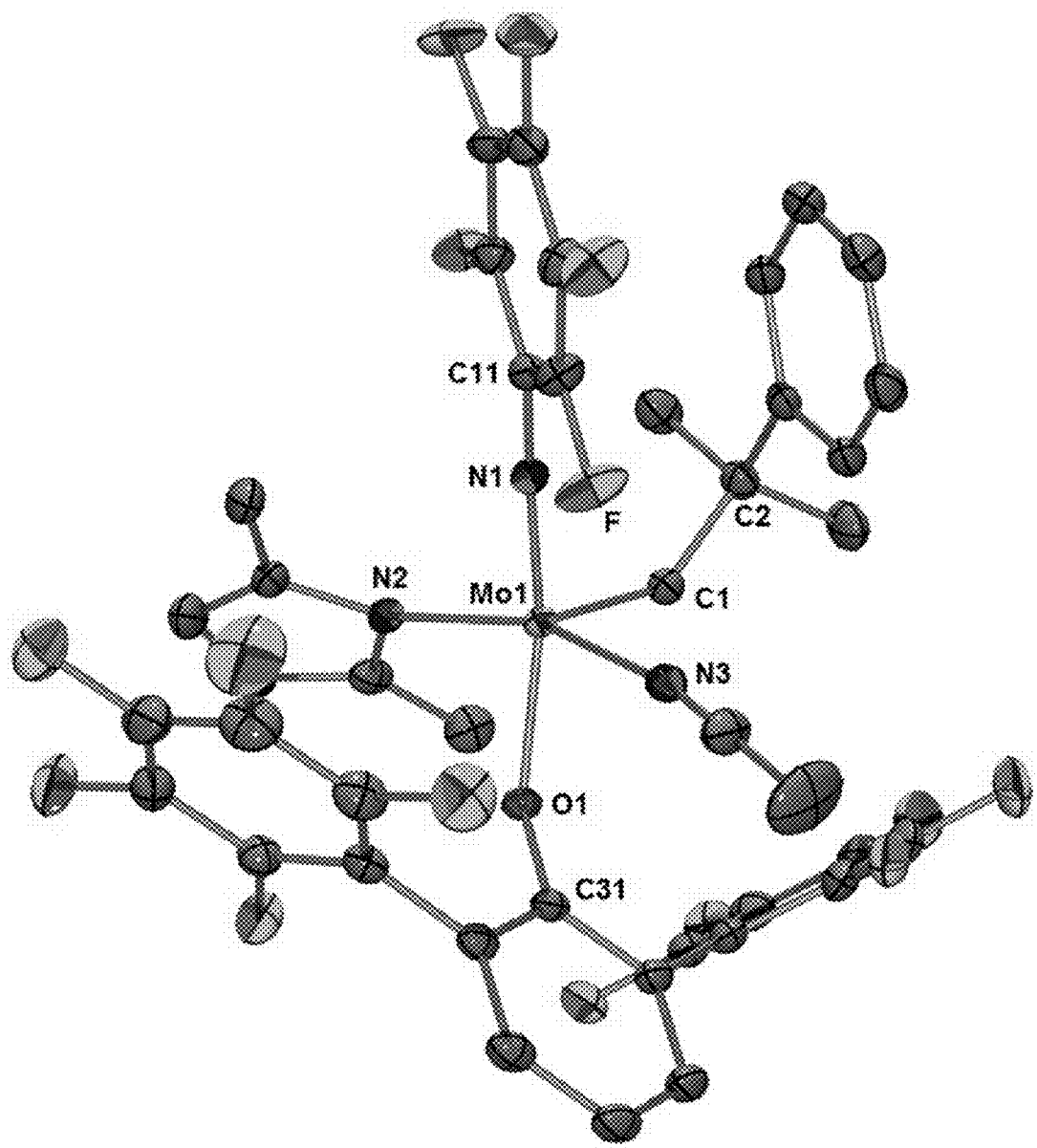
FIG. 2. Thermal ellipsoid plot of the structure of 2b'. Hydrogen atoms have been omitted for clarity. Selected bond distance (Å) and angles (deg): Mo(1)-N(1)=1.751(1), Mo(1)-C(1)=1.889(1), Mo(1)-O(1)=1.995(1), Mo(1)-N(2)=2.084 (1), Mo(1)-N(3)=2.190 (1), C(11)-N(1)=1.378(1); O(1)-C (31)=1.336(1); N(1)-Mo(1)-O(1)=154.35 (4), N(2)-Mo(1)-N (3)=158.37(4).

An X-ray structure of 2b' revealed it to have a square pyramidal structure (T=0.067; τ=0 for a perfect square pyramid) with the alkylidene in the apical position and acetonitrile bound trans to the dimethylpyrrolide (FIG. 2). The Mo(1)-N(1) (1.751(1)Å) and the Mo(1)-C(1) (1.889(1)Å) distances are similar to those found in other square pyramidal MAP adducts that contain PMe$_3$ or THF. The alkylidene is found in the apical position of the square pyramid in crystallographically characterized MAP adducts.

Synthesis of a Molybdenum Ethylene Complex

Figure 3:
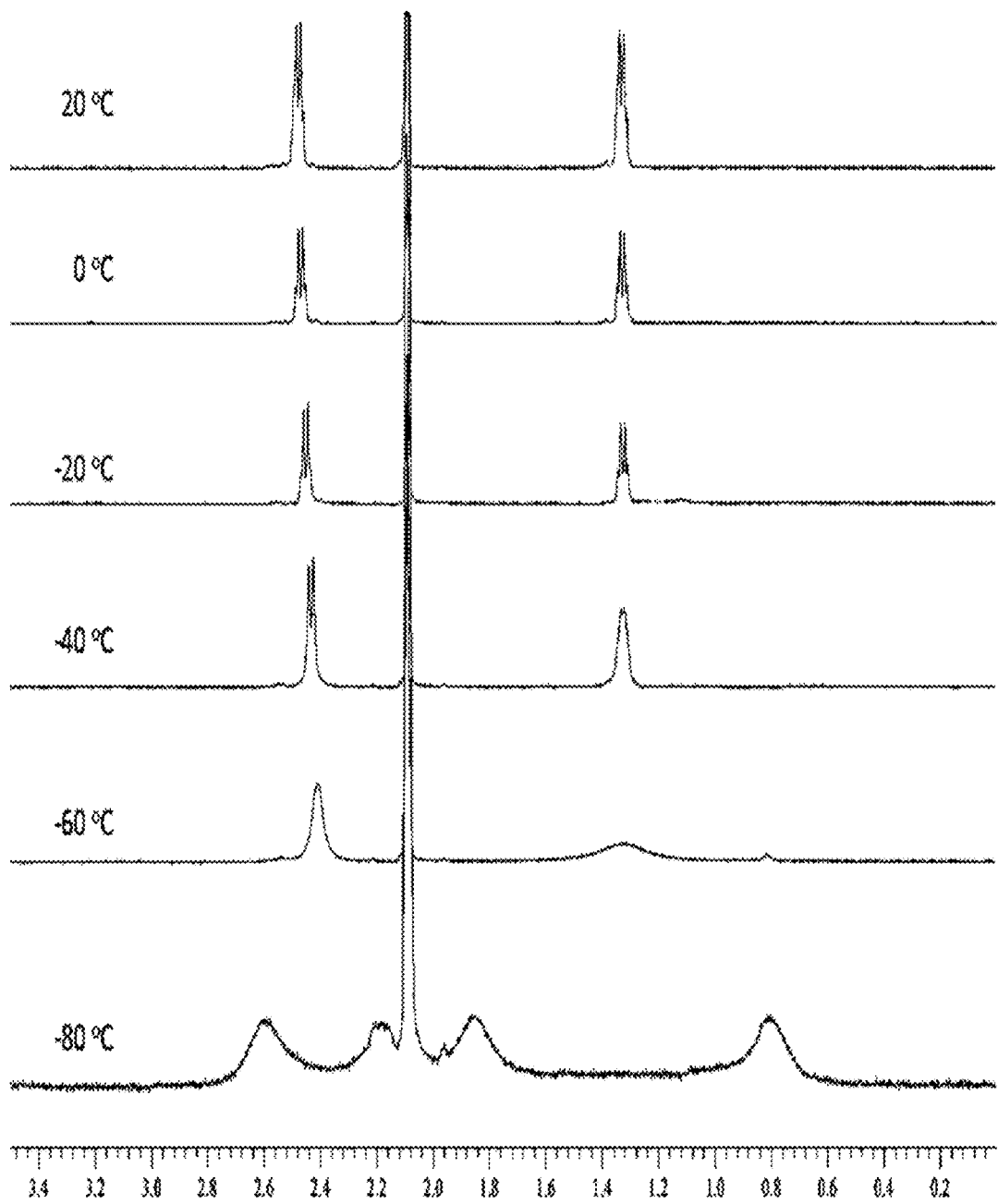
FIG. 3. Variable temperature $^1H$ NMR spectra of 3 (tol-$d_8$).

Exposure of a diethyl ether solution of Mo(NC$_6$F$_5$)(CHCMe$_2$Ph)(DFTO)$_2$ (1c) to 1 atm of ethylene at room temperature led to a color change from orange to deep purple over a period of 16 h and formation of the ethylene complex, Mo(NC$_6$F$_5$)(CH$_2$CH$_2$)(DFTO)$_2$ (3; equation 3), in 76% yield. At room temperature the $^1$H NMR spectrum for 3 in tol-d$_8$ showed two ethylene proton resonances at 1.33 and 2.48 ppm (FIG. 3). At −80° C. these two resonances split to into four at δ 0.81, 1.85, 2.19 and 2.60 ppm. The $^{19}$F NMR spectrum of 3 at −80° C. reveals resonances for eight ortho fluorines, eight meta fluorines, and four para fluorines for the two DFTO ligands, as found for 1c (FIG. 1). All data are consistent with 3 having no symmetry at −80° C. on the NMR time scale, as found for 1c.

(2)

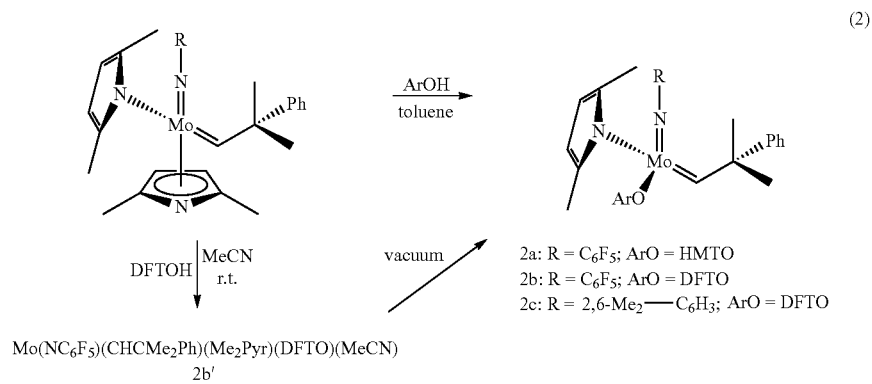

Mo(NC$_6$F$_5$)(CHCMe$_2$Ph)(Me$_2$Pyr)(DFTO)(MeCN)
2b'

2a: R = C$_6$F$_5$; ArO = HMTO
2b: R = C$_6$F$_5$; ArO = DFTO
2c: R = 2,6-Me$_2$—C$_6$H$_3$; ArO = DFTO

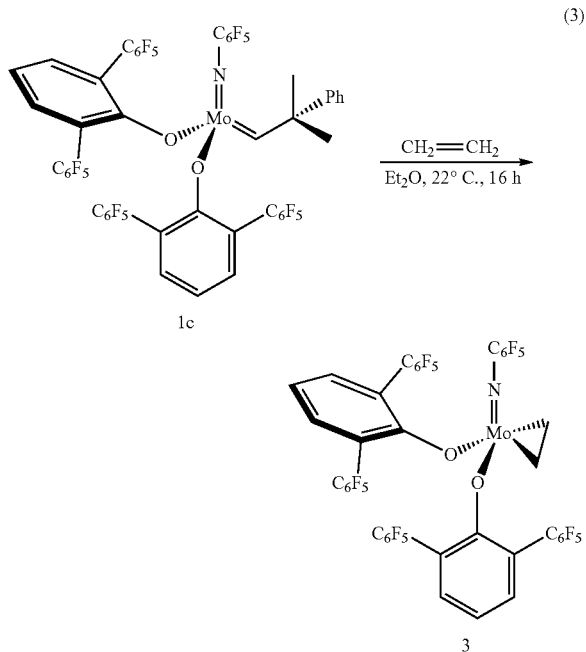

Figure 4:
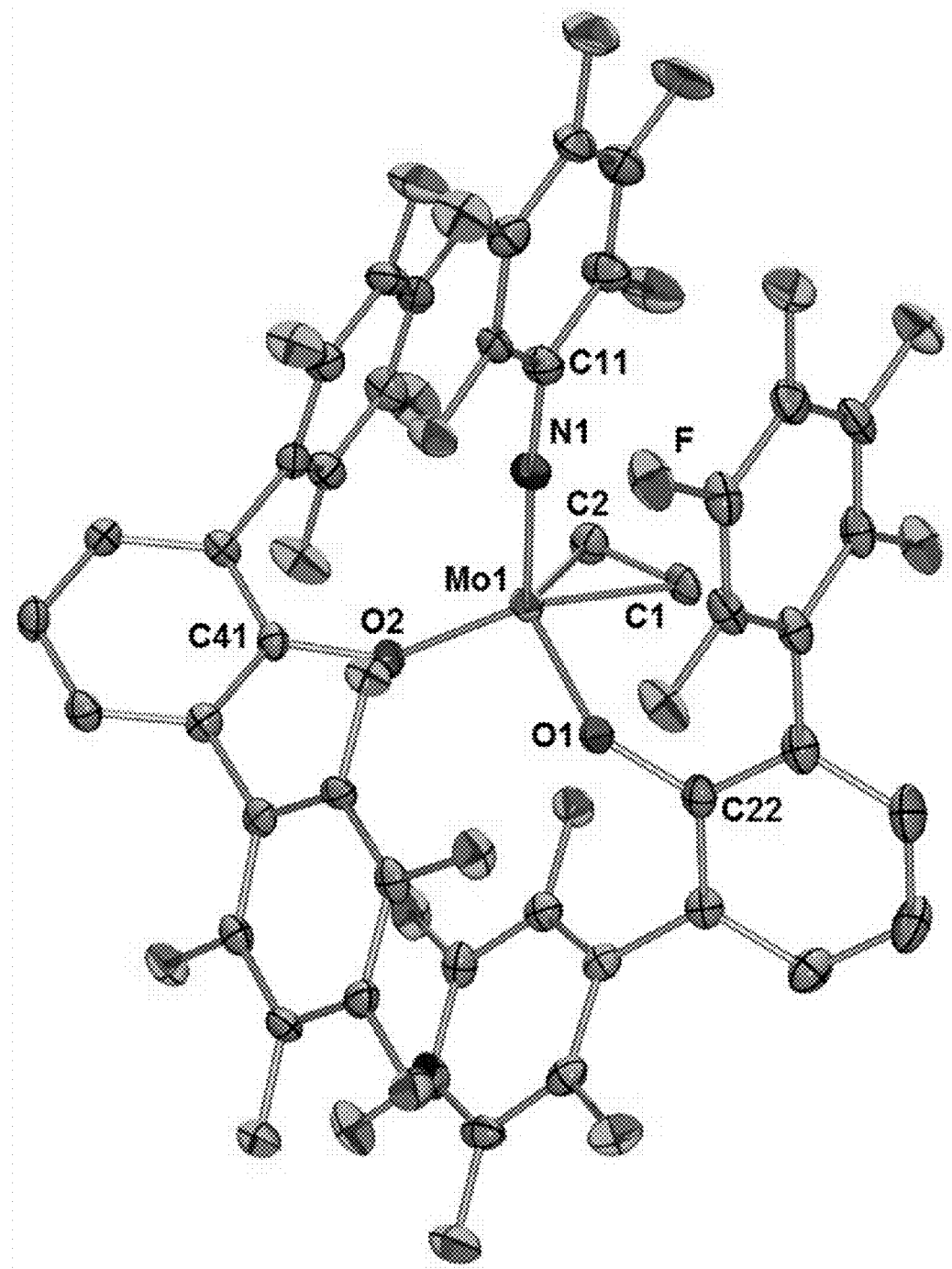
FIG. 4. Thermal ellipsoid plot of 3. Hydrogen atoms have been omitted for clarity. Selected bond distance (Å) and angles (deg): Mo(1)-N(1)=1.720(3), Mo(1)-O(2)=1.935(3), Mo(1)-O(1)=1.946(3), Mo(1)-C(2)=2.140(4), Mo(1)-C(1)=2.153(4), C(1)-C(2)=1.415(6); N(1)-Mo(1)-O(2)=121.37(14), N(1)-Mo(1)-O(1)=114.79(14), O(2)-Mo(1)-O(1)=108.45(11), C(2)-Mo(1)-C(1)=38.49(15), C(2)-C(1)-Mo(1)=70.3(2), C(1)-C(2)-Mo(1)=71.2(2).

The structure of 3 as determined through a single-crystal X-ray diffraction study is shown in FIG. 4. The Mo1-C2 bond (2.140(4) Å) is essentially the same as the Mo1-C1 bond (2.153(4) Å). The C1-C2 bond distance is 1.415(6)Å and the C1-Mo1-C2 angle is 38.49(15)°. The C1-C2 bond is essentially perpendicular to the Mo1-N1 bond (N1-Mo1-C1=97.00 (15); N1-Mo1-C2=96.00(16). These structural features are similar to those observed for the four other Mo imido ethylene complexes in the literature ((a) Jiang, A. J.; Schrock, R. R.; Müller, P. *Organometallics* 2008, 27, 4428. (b) Marinescu, S. C.; King, A. J.; Schrock, R. R.; Singh, R.; Müller, P.; Takase, M. K. *Organometallics* 2010, 29, 6816. (c) Tsang, W. C. P.; Jamieson, J. Y.; Aeilts, S. A.; Hultzsch, K. C.; Schrock, R. R.; Hoveyda, A. H. *Organometallics* 2004, 23, 1997).

Figure 5:
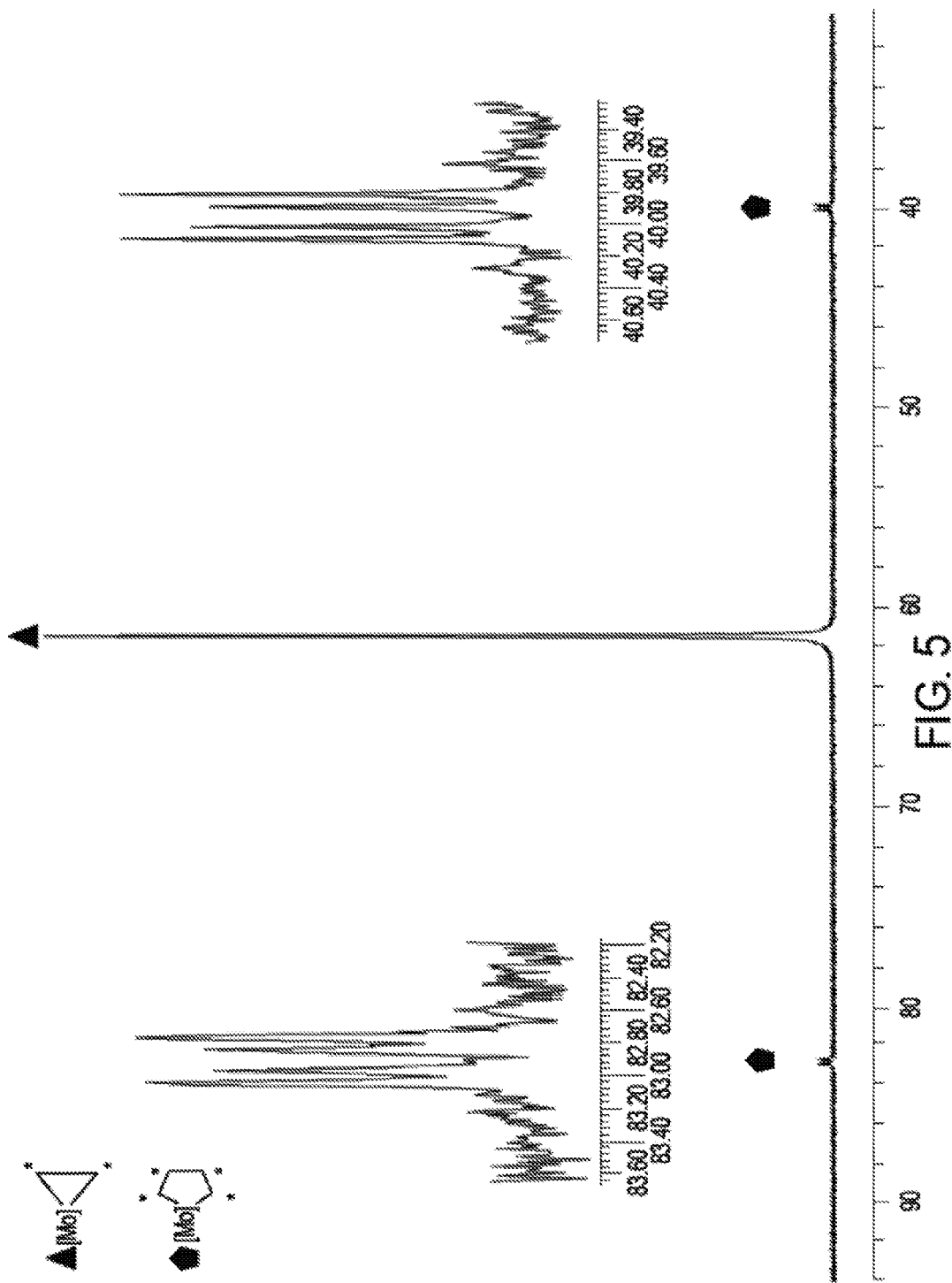
FIG. 5. $^{13}$C NMR spectrum of Mo(NC$_6$F$_5$)($^{13}$CH$_2$=$^{13}$CH$_2$)(DFTO)$_2$ and $^{13}$CH$_2$=$^{13}$CH$_2$ in C$_6$D$_6$ at room temperature ([Mo]=Mo(NC$_6$F$_5$)(DFTO)$_2$).

When 1c was treated with $^{13}CH_2=^{13}CH_2$ in $C_6D_6$ and the reaction followed by $^{13}C$ NMR, 1c was fully converted into a mixture of a TBP metallacyclobutane complex, $Mo(NC_6F_5)$ $(^{13}CH_2^{13}CH_2^{13}CH_2)(DFTO)_2$, and $^{13}CH_2=CHCMe_2Ph$ in 5 min. After 15 min, resonances for $Mo(NC_6F_5)(^{13}CH_2^{13}CH_2)$ $(DFTO)_2$ (3*) and $^{13}CH_2=^{13}CH^{13}CH_3$ could be observed; after 24 h conversion to 3* and $^{13}CH_2=^{13}CH^{13}CH_3$ was complete. According to proton NMR spectra the amount of propylene was less than one equivalent as, without the intention to be limited by theory, a consequence of some being lost into the head space. A $^{13}C$ NMR spectrum of isolated 3* under ~0.5 atm of $^{13}CH_2^{13}CH_2$ at room temperature showed that two carbon resonances were present at δ 82.9 and 39.9 ppm (with a second order coupling pattern), consistent with formation of a small amount of the metallacyclopentane complex, $Mo(NC_6F_5)(^{13}CH_2^{13}CH_2^{13}CH_2^{13}CH_2)(DFTO)_2$ (~2%; FIG. 5) (Tsang, W. C. P.; Jamieson, J. Y.; Aeilts, S. A.; Hultzsch, K. C.; Schrock, R. R.; Hoveyda, A. H. *Organometallics* 2004, 23, 1997). While not wishing to be limited by theory, we propose that $Mo(NC_6F_5)(^{13}CH_2^{13}CH_2^{13}CH_2)$ $(DFTO)_2$ rearranges to $Mo(NC_6F_5)(^{13}CH_2=^{13}CH^{13}CH_3)$ $(DFTO)_2$ and that propylene is then displaced (most likely) by ethylene to give $Mo(NC_6F_5)(^{13}CH_2^{13}CH_2)(DFTO)_2$ and free propylene. Without the intention to be limited by theory, in some embodiments, the mechanism of rearrangement is proposed to consist of β hydride elimination in the metallacyclobutane complex to give an intermediate allyl hydride followed by reductive elimination. Formation of an alkyl intermediate through CH activation in either DFTO or NC6F5 ligands is not possible. However, without the intention to be limited by theory, in some embodiments, migration of the 13 hydride in the metallacyclobutane to the imido nitrogen to give an intermediate Mo(IV) complex, $Mo(NHC_6F_5)(^{13}CH_2^{13}CH^{13}CH_2)(DFTO)_2$, may be possible.

Polymerization of DCMNBD Initiated by 1

Polymerization of 2,3-dicarbomethoxynorbornadiene (DCMNBD) is employed as a means of assessing the potential stereoselectivity of a given compound. As shown in Table 1, it was surprisingly found that compounds 1a-d could produce a polymer with isotactic structure, on the basis of the chemical shift of the methylene carbon (C(7)) at 38.7 ppm in $CDCl_3$ (McConville, D. H.; Wolf, J. R*; Schrock, R. R. *J. Am. Chem. Soc.* 1993, 115, 4413); this contrasts with a chemical shift for C(7) of 38.0 ppm in cis, syndiotactic poly(DCMNBD) (Flook, M. M.; Jiang, A. J.; Schrock, R. R.; Müller, P.; Hoveyda, A. H. *J. Am. Chem. Soc.* 2009, 131, 7962). Previously, it was known that compounds containing chiral bidentate ligands (e.g., biphenolate and binaphtholate) produced cis, isotactic poly(DCMNBD) through enantiomorphic site control (Schrock, R. R. *Dalton Trans.* 2011, 40, 7484). It is unexpected that provided methods, wherein metal complexes contain only monodentate aryloxide ligands, can deliver isotactic structure, in some embodiments, with >98% selectivity.

TABLE 1

| Poly(DCMNBD) formed employing $Mo(NR)(CHCMe_2Ph)(DFTO)_2$ initiators. | | | |
|---|---|---|---|
| Compounds | R | % cis | % tacticity |
| 1a | 2,6-i-$Pr_2C_6H_3$ | 89 | 72 iso |
| 1b | 2,6-$Me_2C_6H_3$ | >98 | >98 iso |
| 1c | $C_6F_5$ | >98 | >98 iso |
| 1d | Adamantyl | | atactic |

Figure 9:
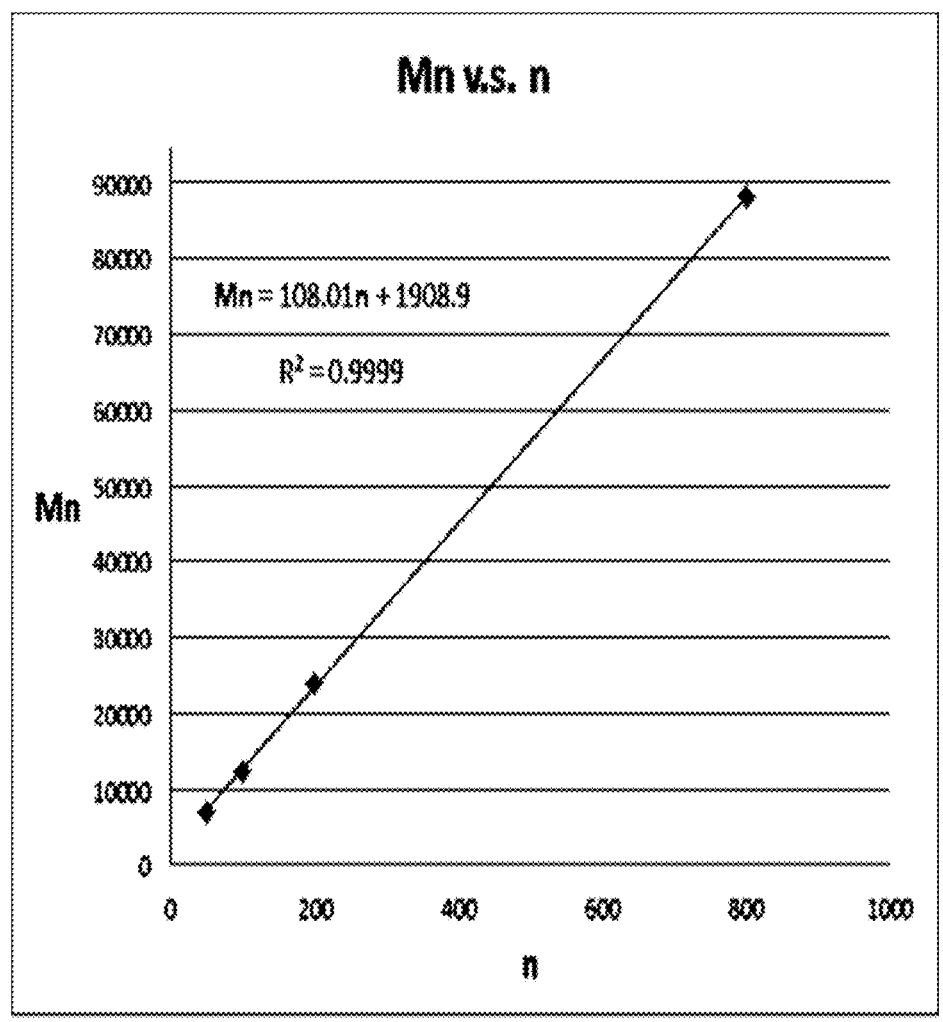
FIG. 9. Molecular weight (M$_n$) of poly(DCMNBD) (in CHCl$_3$ vs. polystyrene) versus equiv of monomer (n) added.

GPC analyses of cis, isotactic poly(DCMNBD) made from 50, 100, 200 and 800 equivalents of DCMNBD in $CHCl_3$ at room temperature with initiator 1c (Table 2) showed that the polydispersity of each sample is relatively low and decreases as the polymer length increases, both of which suggest that the polymerization is relatively well-behaved. The relationship between the number of equivalents of monomer employed and the number average molecular weight of the polymers measured in $CHCl_3$ versus polystyrene standards is linear with an $R^2$ value 0.9999 (FIG. 9).

TABLE 2

| GPC studies of Poly(DCMNBD) prepared with 1c as the initiator ($M_n$ in $CHCl_3$ v.s. Polystyrene; n = equiv of monomer added). | | | |
|---|---|---|---|
| n | conversion (%) | Mn | PDI |
| 50 | >98 | 7000 | 1.19 |
| 100 | >98 | 13000 | 1.17 |
| 200 | >98 | 24000 | 1.15 |
| 800 | >98 | 88000 | 1.10 |

In some embodiments, polymerization of DCMNBD by bisDFTO initiators 1b or 1c to yield cis, isotactic poly(DCMNBD) would seem to require that the monomer attack the same side of a M=C bond in each step. While not wishing to be limited by theory, we tentatively suggest that cis, isotactic poly(DCMNBD) forms through a type of chain end control where one diastereomer is created through interlocking of the terphenoxide ligands in combination with the chirality of the last inserted monomer; the other diastereomer is not competitive.

Polymerization of DCMNBD Initiated by 2a-2c

Addition of 100 equivalents of DCMNBD to 2a, a previously known MAP initiator, led to consumption of the monomer and formation of polymer within 30 min. The polymer is >98% cis, syndiotactic (Table 3), as is the poly(DCMNBD) produced employing Mo(NAd)(CHCMe$_2$Ph)(Pyr)(HMTO) (Flook, M. M.; Gerber, L. C. H.; Debelouchina, G. T.; Schrock, R. R. *Macromolecules* 2010, 43, 7515) or Mo(NAd) (CHCMe$_2$Ph)(Pyr)(OHIPT) (Flook, M. M.; Jiang, A. J.; Schrock, R. R.; Müller, P.; Hoveyda, A. H. *J. Am. Chem. Soc.* 2009, 131, 7962) as an initiator. The polymer obtained with 2b', although still largely cis, unexpectedly contains a high amount of isotactic structure, making the product atactic. Even more surprising, treatment of 2b with 100 equivalents of DCMNBD led to the formation of a new polymer that has a 95% cis and 91% isotactic structure, while poly(DCMNBD) prepared with 2c as the initiator was found to contain ~98% cis and 96% isotactic dyads. Formation of cis, isotactic polymer with a MAP initiator has never been observed although formation of trans, isotactic-poly[(+)-2,3-dicarbomethoxynorbornene] employing a MAP initiator has been reported recently (Flook, M. M.; Börner, J.; Kilyanek, S.; Gerber, L. C. H.; Schrock, R. R. *Organometallics* 2012, 31, 6231). The change in tacticity upon changing from HMTO (in 2a) to DFTO (in 2b, 2c) is striking, as is the disruption of the tacticity of the poly(DCMNBD) in the presence of one equivalent of acetonitrile (in 2b').

TABLE 3

Poly(DCMNBD) formed with initiators Mo(NR)(CHCMe$_2$Ph)(Me$_2$Pyr)(OAr) (2a-2c).

| initiator | R | ArO | cis (%) | Tacticity |
|---|---|---|---|---|
| 2a | C$_6$F$_5$ | HMTO | >98 | >98% syndio |
| 2b' | C$_6$F$_5$ | DFTO | 92 | atactic |
| 2b | C$_6$F$_5$ | DFTO | 95 | 91% iso |
| 2c | 2,6-Me$_2$C$_6$H$_3$ | DFTO | >98 | 96% iso |

TABLE 4

GPC studies of Poly(DCMNBD) Samples using 2b as an initiator (M$_n$ in CHCl$_3$ v.s. Polystyrene; n = equiv of monomer added; n' = the required equiv of monomer to produce Mn with initiator 1c).

| n | conversion (%) | Mn | PDI | n' | n/n' |
|---|---|---|---|---|---|
| 50 | >99 | 28000 | 1.19 | 242 | 0.21 |
| 100 | >99 | 55000 | 1.20 | 490 | 0.20 |
| 200 | >99 | 90000 | 1.26 | 817 | 0.24 |

Figure 10:
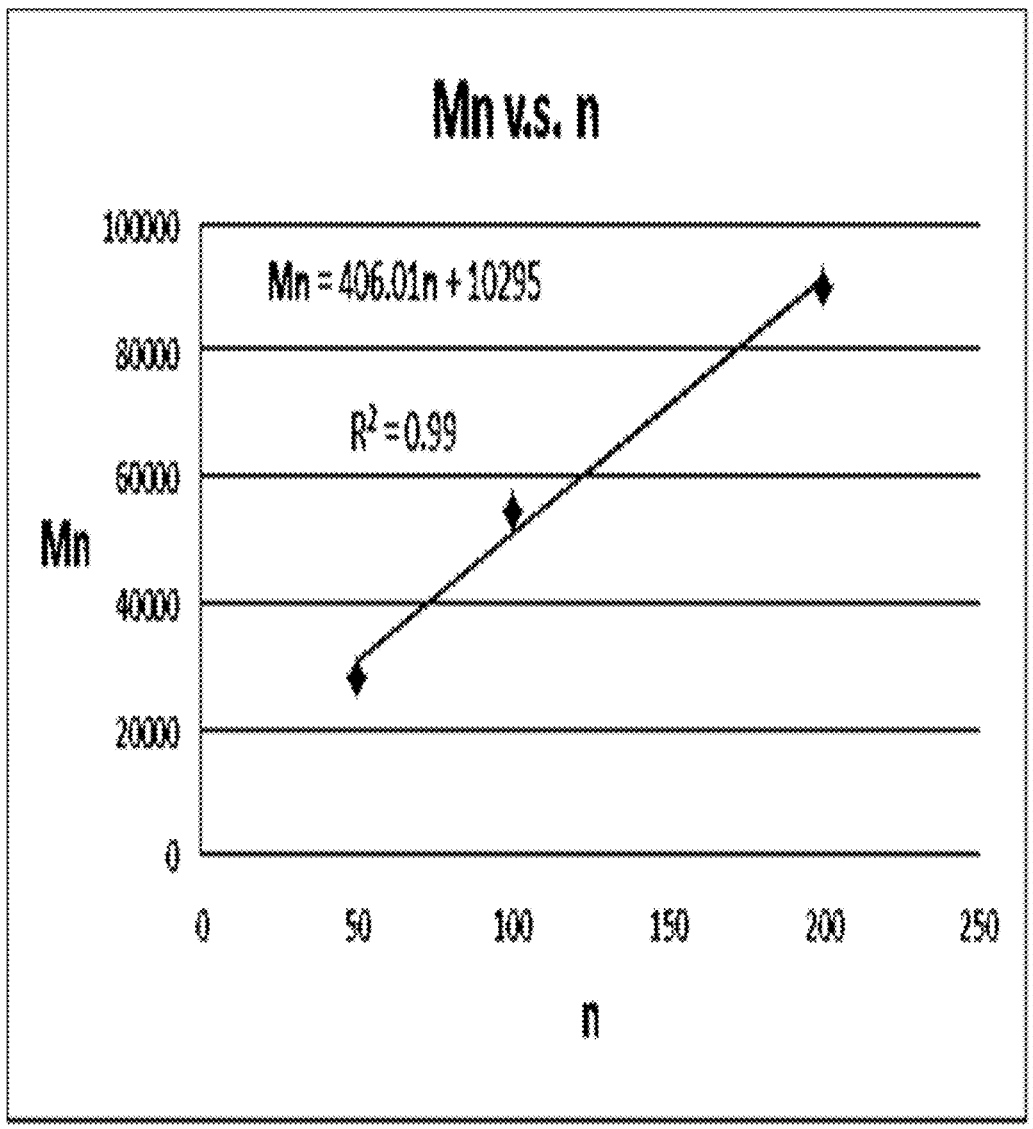
FIG. 10. Molecular weight (M$_n$) of poly(DCMNBD) (in CHCl$_3$ versus polystyrene) versus equivalents of monomer (n) added using 2b as a catalyst.

Poly(DCMNBD) made from 50, 100 and 200 equivalents of monomer in CHCl$_3$ with initiator 2b were analyzed by GPC (Table 4). Compared to the polymer produced by initiator 1c (Table 2), the polydispersities of each of the samples is relatively high and increases as the polymer length increases. The relationship between the number of equivalents of monomer employed and the number average molecular weight of the polymers measured in CHCl$_3$ versus polystyrene standards is also linear with an R$^2$ value 0.99 (FIG. 10). The molecular weights of these polymers are about five times what they are when 1c is employed as the initiator, as can be seen from the data in Table 2; the ratio of n/n' is ~0.2, where n' would be the required number of equivalents to produce an observed Mn, and n the equivalents required with initiator 1c.

Formation of largely cis, isotactic-poly(DCMNBD) by 2b and 2c contrasts dramatically with the cis, syndiotactic-poly (DCMNBD) formed when 2a is employed as an initiator. While not wishing to be limited by theory, formation of cis, isotactic-poly(DCMNBD) could be explained only if the accepted "rule" concerning approach of the monomer trans to a pyrrolide ligand does not hold in this situation, or if a turnstile rotation of a metallacyclobutane intermediate is invoked followed by a rotation of the alkylidene ligand, as shown in Scheme 1. It is noted that compounds of formula I have good stability. In some embodiments, a compound of formula I does not decompose via disproportion. In some embodiments, a compound of formula I does not disproportionates to bispyrrolide and bisaryloxide complexes. In some embodiments, a compound of formula I-a does not decompose via disproportion. In some embodiments, a compound of formula I-a does not disproportionates to bispyrrolide and bisaryloxide complexes. In some embodiments, a compound of formula III and a compound of formula V do not react with each other and form a compound of formula I. For example, a 1:1 mixture of 1c and Mo(NC$_6$F$_5$)(CHCMe$_2$Ph)(Me$_2$Pyr)$_2$ in C$_6$D$_6$ did not give any 2b at room temperature or upon heating to 50° C. for 16 h.

ROMP Initiated by Mo(NC$_6$F$_5$)(CH$_2$CH$_2$)(DFTO)$_2$ (3)

Figure 6:
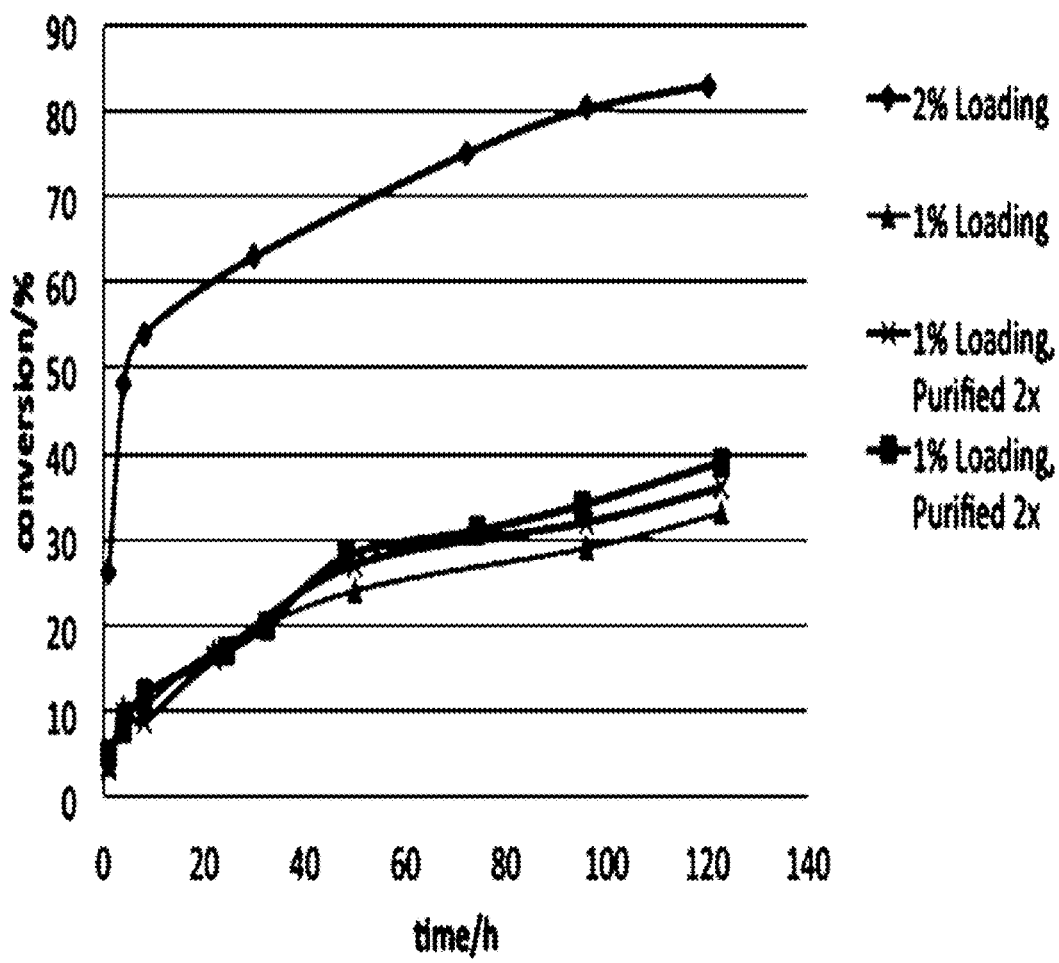
FIG. 6. Consumption of DCMNBD in CDCl$_3$ by 3 at 50° C. Diamonds imply 2% catalyst loading, triangles imply 1% catalyst loading, squares and crosses are 1% catalyst loading with 3 that had been exposed to ethylene to remove any alkylidene impurities.

When Mo(NC$_6$F$_5$)(CH$_2$CH$_2$)(DFTO)$_2$ was treated with 50 equivalents of DCMNBD in CDCl$_3$ in a J. Young tube, a trace amount of polymer was observed after 16 hours at room temperature. Upon heating the reaction for 4 hours at 50° C., 48% of the monomer was consumed. The reaction was monitored by $^1$H NMR and conversion vs. time is shown in FIG. 6. All monomer was consumed after 16 hours at 50° C. in a Schlenk flask when ethylene was removed in a flow of nitrogen gas. $^{13}$C NMR analysis of the poly(DCMNBD) showed that, surprisingly, the polymer is >99% cis and isotactic. The same phenomenon was observed when 1% catalyst was employed, even when samples of 3 were exposed multiple times to ethylene and recovered. The formation of cis, isotactic poly(DCMNBD) using a monodentate bisalkoxide or bisaryloxide complex having the structure of formula II is unexpected, as previous results strongly taught that bidentate ligands were required for cis, isotactic selectivity.

Figure 7:
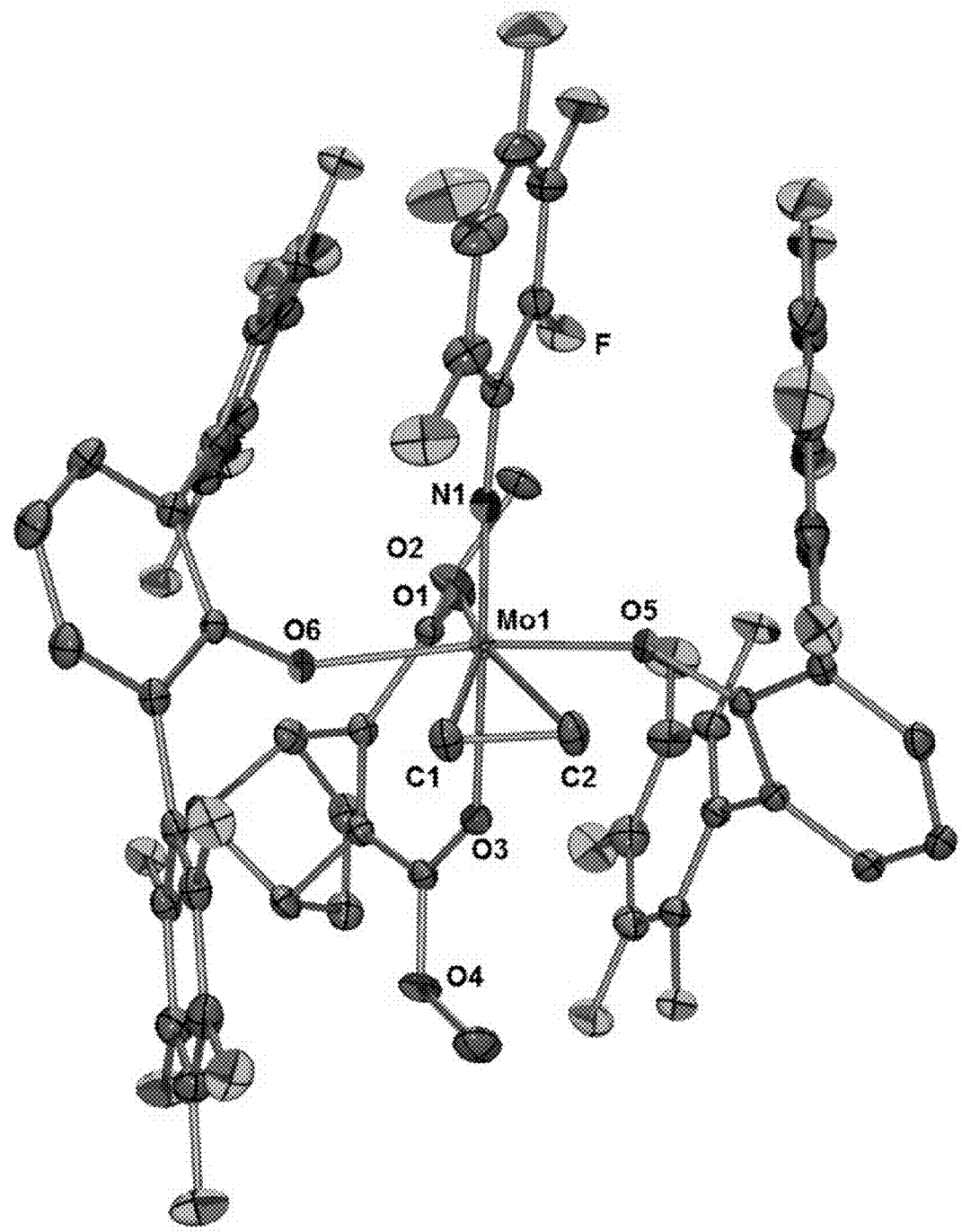
FIG. 7. Thermal ellipsoid plot of 5. Hydrogen atoms have been omitted for clarity. Selected bond distance (A) and angles (deg): C(1)-C(2)=1.416(2), Mo(1)-C(1)=2.187(1), Mo(1)-C(2)=2.195(1), Mo(1)-N(1)=1.7290(9), Mo(1)-O(1)=2.1983(8), Mo(1)-O(3)=2.2198(8), Mo(1)-O(5)=2.0664(7), Mo(1)-O(6)=2.1041(7); N(1)-Mo(1)-O(3)=178.92(4), O(5)-Mo(1)-O(6)=148.94(3), C(1)-Mo(1)-C(2)=37.70(4).

Addition of one equivalent of DCMNBD to Mo(NC$_6$F$_5$) (CH$_2$CH$_2$)(DFTO)$_2$ led to, surprisingly, formation of a red-orange crystalline product in 57% yield with the apparent composition Mo(NC$_6$F$_5$)(CH$_2$CH$_2$)(DCMNBD)(DFTO)$_2$ (5). Given the high steric demand of the two terphenoxide ligands, the formation of six-coordinated 5 is unexpected. The $^1$H NMR spectrum showed four triplet of doublet resonances (12 Hz, 4 Hz) at δ 1.43, 1.77, 2.72 and 3.07 ppm for the ethylene protons, which is indicative of a product with no symmetry. An X-ray diffraction study showed that the DCMNBD has bonded to Mo through the carbonyl groups in the two esters (FIG. 7), rather than forming a "mixed" metallacylopentane from DCMNBD and ethylene. One ester is trans to the ethylene ligand while the other is trans to the imido group. The two DFTO ligands are trans to each other. The bond lengths and angles are unsurprising. The Mo1-C1 distance (2.187(1)Å) is slightly shorter than the Mo1-C2 distance (2.195(1)Å) and the C1-C2 distance is 1.416(2)Å).

Figure 11:
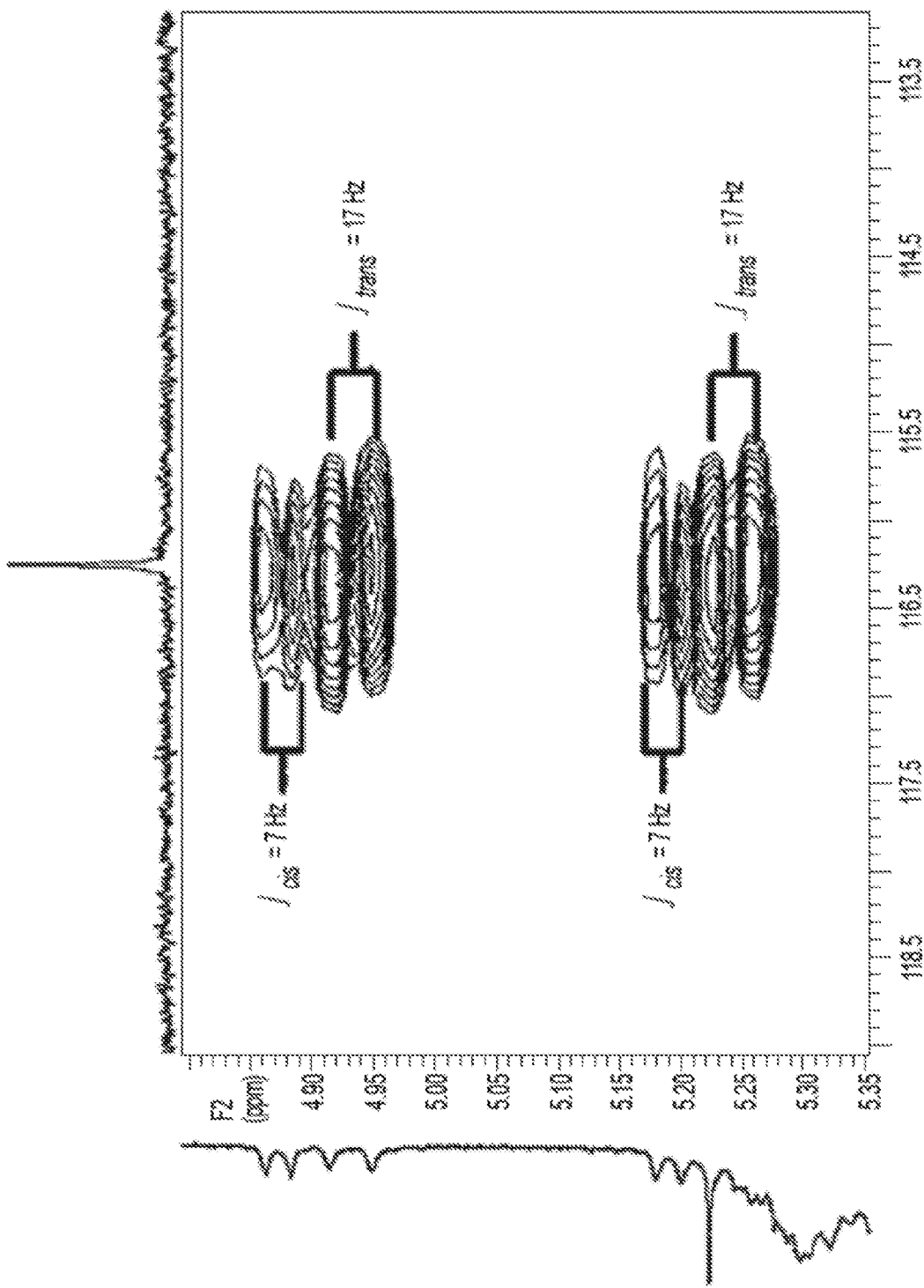
FIG. 11. The 2D $^{13}$C—$^1$H HMBC spectrum of 8 in CDCl$_3$.

Addition of 100 equivalents of DCMNBD to Mo(NC$_6$F$_5$)($^{13}$CH$_2$$^{13}$CH$_2$)(DFTO)$_2$ led to the formation of ~50% yield of polymer in 8 h at 50° C. in CDCl$_3$. The $^{13}$C NMR spectra exhibit one $^{13}$C resonance at δ 116.1 ppm along with others expected for naturally abundant $^{13}$C in the polymer. A 2D $^{13}$C—$^1$H HMBC experiment (FIG. 11) confirmed that the $^{13}$C resonance at 116.1 ppm is that in a PCH=$^{13}$CH$_2$ group (P=polymer) at one end of the poly(DCMNBD); the magnitudes of the coupling of the two protons in the $^{13}$CH$_2$ group to a third olefinic proton were found to be 17 Hz ($J_{trans}$) and 7 Hz ($J_{cis}$). Without the intention to be limited by theory, we propose that the PCH=$^{13}$CH$_2$ group could result from a back reaction between liberated $^{13}$CH$_2$$^{13}$CH$_2$ and a growing polymer chain.

Addition of 100 equivalents of norbornene to 3 at room temperature led to formation of poly(norbornene) in seconds. The $^{13}$C NMR spectrum of the polymer in CDCl$_3$ showed only four sharp resonances (at 134.00, 42.83, 38.72, and 33.34 ppm), characteristic of pure cis poly(NBE) (Ivin, K. H.; Layerty, D. T.; Rooney, J. J. Makromol. Chem. 1977, 178, 1545). Samples prepared with initiators 1c or 2a were identical to those prepared with initiator 3. The widths of the resonances at half height are ~9 Hz at 125 MHz, which are unusually narrow. This is the first time that pure >98% cis and highly (>98%) tactic poly(norbornene) has been prepared.

Addition of one equivalent of norbornene to Mo(NC$_6$F$_5$)($^{13}$CH$_2$$^{13}$CH$_2$)(DFTO)$_2$ at −78° C. in toluene-d$_8$ showed that after 1 h, 69% of the ethylene complex was converted to the "mixed" metallacyclopentane complex 6 (equation 5). The $^{13}$CH$_2$ resonances in the metallacycle were observed as first order doublets at δ 84.7 and 46.6 ppm ($^1J_{cc}$=37 Hz) in the $^{13}$C NMR at −70° C., without the intention to be limited by theory, consistent with one isomer of 6 being formed. When the temperature was raised to −50° C., the concentration of 6 decreased while the concentration of 3 and poly(norbornene) increased. After 1 hour at −50° C., all the norbornene had been consumed and the ethylene complex 3 was observed as the only Mo species to contain a $^{13}$C label, i.e., no PCH=$^{13}$CH$_2$ group was detected in this experiment. Without the intention to be limited by theory, in some embodiments, ethylene does not appear to be involved in formation of the initiator.

(5)

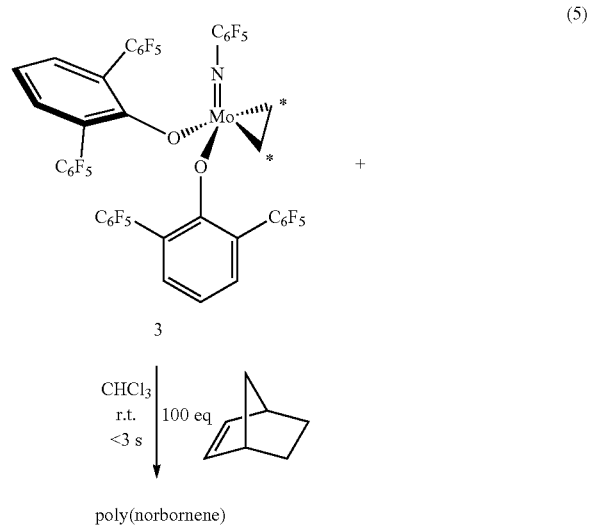

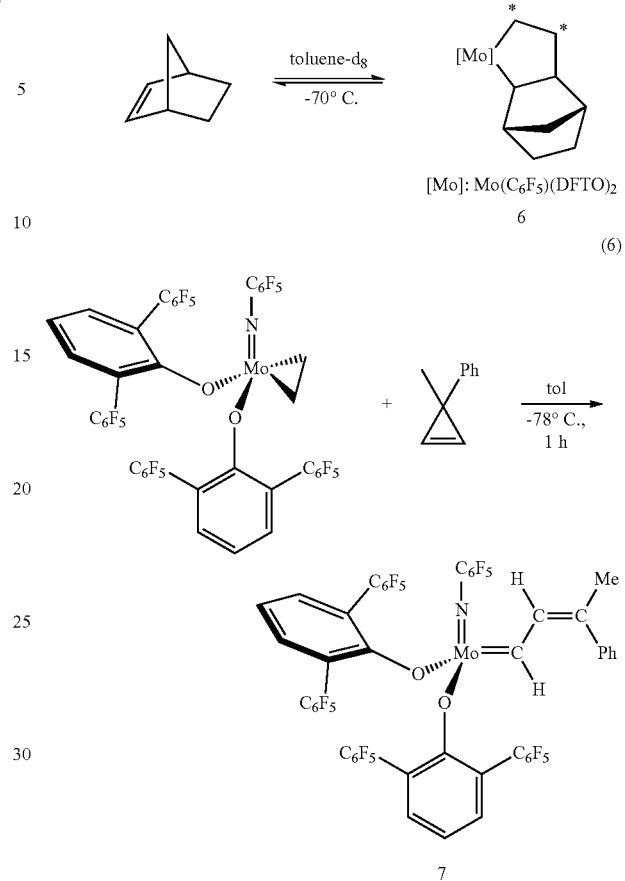

(6)

Figure 8:
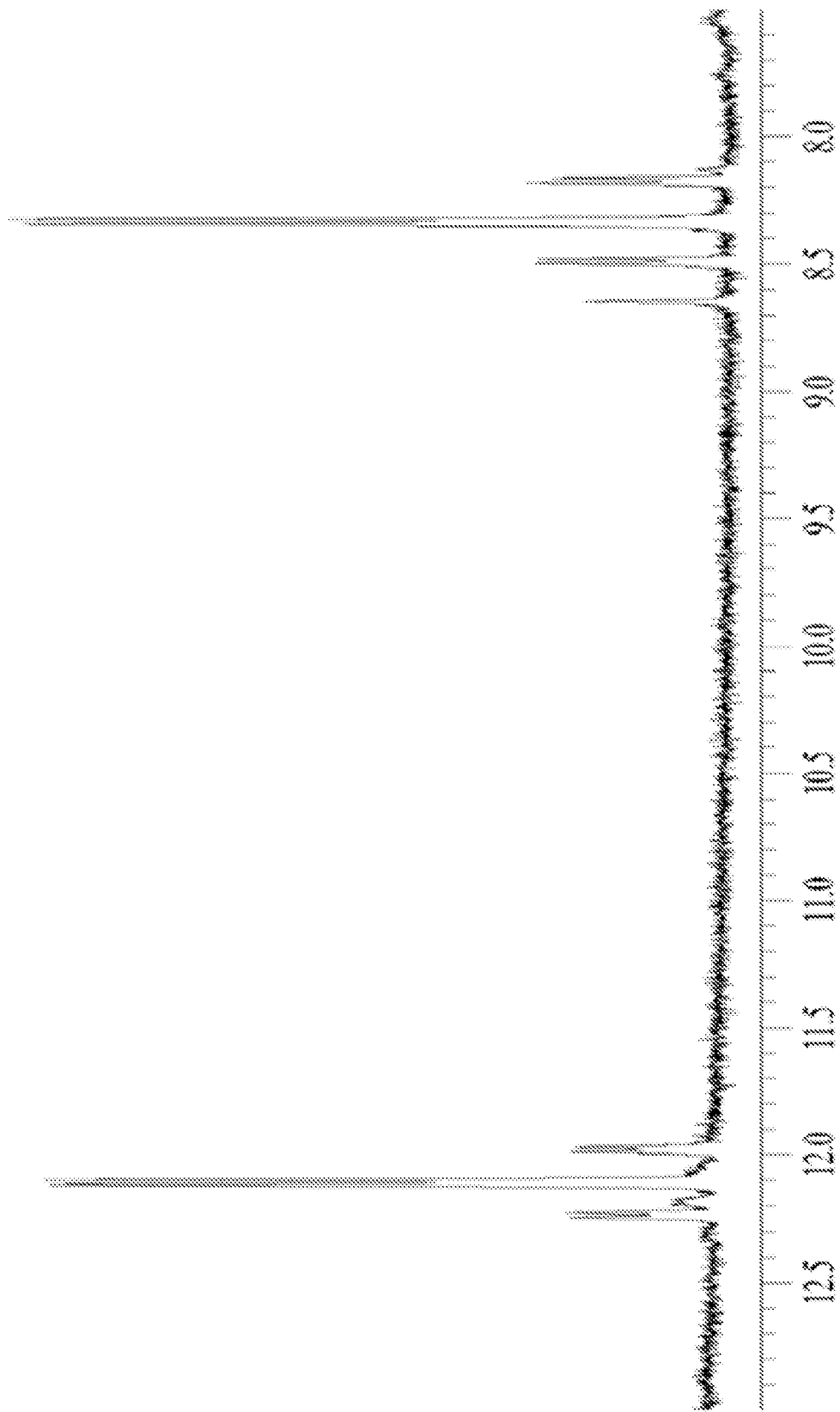
FIG. 8. $^1$H NMR spectrum of 7 in C$_6$D$_6$.

Treatment of 3 with one equivalent of a mixture of labeled and unlabeled 3-methyl-3-phenylcyclopropene (MPCP; two parts of unlabeled MCPC to one part in which one CH is $^{13}$C labeled) at −78° C. led to an immediate color change from purple to orange and formation of Mo(NC$_6$F$_5$)(CHCH=CMePh)(DFTO)$_2$ (7; equation 6) upon warming the sample to room temperature. Since ⅓ of the MPCP was monolabeled with $^{13}$C in an olefinic position, the alkylidene proton resonance consists of a doublet at δ 12.10 ppm (d, $^3J_{IM}$=9 Hz) along with two $^{13}$C satellites ($^1J_{CH}$=130 Hz, $^3J_{HH}$=9 Hz) in a ratio of 1:4:1 (FIG. 8), consistent with 7 being a mixture of [Mo]=$^{13}$CHCH=C(Me)Ph, [Mo]=CH$^{13}$CH=C(Me)Ph, and [Mo]=CHCH=C(Me)Ph in one isomeric form (where [M]=Mo(NC$_6$F$_5$)(DFTO)$_2$). (The isomer shown in equation 6 is arbitrary.) A similar coupling pattern was observed for the β-hydrogen at δ 8.33 ppm O$_m$=159 Hz, $^3J_{HH}$=9 Hz). In the $^{13}$C NMR spectrum, the alkylidene carbon resonance was found at δ 264.5 ppm and the β-carbon resonance was found at δ 136.0 ppm. The vinyl alkylidene 7 rapidly initiates ROMP of MPCP at −78° C. or room temperature to yield atactic poly(MPCP) (Flook, M. M.; Gerber, L. C. H.; Debelouchina, G. T.; Schrock, R. R. Macromolecules 2010, 43, 7515). While not wishing to be limited by theory, we propose that MPCP in some embodiments replaces ethylene in 3 to give a MPCP complex that then rearranges to form the vinyl alkylidene complex 7. A single experiment employing 3, unlabeled ethylene, and trimethoxybenzene as an internal standard showed that Mo(NC$_6$F$_5$)(CHCH=CMePh)(DFTO)$_2$ was formed in 50% yield. While not wishing to be limited by theory, we propose that some MPCP is polymerized in the process.

Without the intention to be limited by theory, in some embodiments, the ROMP of DCMNBD with 3 to give cis, isotactic-poly(DCMNBD) could suggest that some Mo(NC$_6$F$_5$)(ODFT)$_2$(CRR') initiator is formed from DCM-NBD; the ROMP of norbornene by 3 could similarly suggest that some initiator forms from norbornene.

As evidenced by results including those presented herein, compounds provided by the present invention behave surprisingly different from complexes that contain superficially similar terphenoxides such as HMTO. In some embodiments, results, such as the formation of cis, isotactic polymers from compounds having the structure of formula I, cannot be readily predicted and explained by known rules concerning the selectivity in polymer formation. Compounds and methods provided by the present invention enable metathesis reaction to deliver products with unexpected selectivity and/or efficiency.

Experimental

General.

All manipulations were conducted under a nitrogen atmosphere in a glove box under nitrogen or through Schlenk techniques. All glassware was oven-dried prior to use. Ether, pentane, toluene, dichloromethane, toluene, and benzene were degassed with dinitrogen and passed through activated alumina columns under nitrogen. All dried and deoxygenated solvents were stored over molecular sieves in a nitrogen or argon-filled glove box. NMR spectra, unless otherwise specified, were recorded on a 500 MHz spectrometer at room temperature. Chemical shifts for $^1$H spectra were referenced to the residual $^1$H resonances of the deuterated solvent ($^1$H NMR: C$_6$D$_6$ δ 7.16 ppm; CDCl$_3$ δ 7.26 ppm; toluene-d$_8$ 7.09, 7.01, 6.97, 2.08 ppm; $^{13}$C NMR: C$_6$D$_6$ δ 7.16 ppm; CDCl$_3$ δ 77.16 ppm; toluene-d$_8$ 20.43 ppm) and are reported as parts per million relative to tetramethylsilane. Midwest Microlab, Indianapolis, Ind., provided elemental analyses. The following abbreviations refer to the multiplicity: s=singlet, d=doublet, t=triplet, m=multiplet, br=broad. Mo(NC$_6$F$_5$)(CHCMe$_2$Ph)(OTf)$_2$(DME), Mo(NC$_6$F$_5$)(CHCMe$_2$Ph)(Me$_2$Pyr)$_2$, Mo(NAr')(CHCMe$_2$Ph)(OTf)$_2$(DME), Mo(NAr')(CHCMe$_2$Ph)(Me$_2$Pyr)$_2$, Mo(NC$_6$F$_5$)(CHCMe$_2$Ph)(DFTO)$_2$, Mo(NAd)(CHCMe$_2$Ph)(Me$_2$Pyr)$_2$, and DFTOH were prepared as described in the literature (Yuan, J.; Schrock, R. R.; Müller, P.; Axtell, J. C.; Dobereiner, G. E. *Organometallics* 2012, 31, 4650; Jiang, A. J.; Zhao, Y.; Schrock, R. R.; Hoveyda, A. H. *J. Am. Chem. Soc.* 2009, 131, 16630; Marinescu, S. C.; Singh, R.; Hock, A. S.; Wampler, K. M.; Schrock, R. R.; Müller, P. *Organometallics* 2008, 27, 6570; the content of each of which is incorporated herein by reference). All the other reagents were used as received unless noted otherwise (Ar'=2,6-Me$_2$C$_6$H$_3$, Ad=1-adamantyl, 2,6-i-Pr$_2$C$_6$H$_3$).

Mo(N(2,6-i-Pr$_2$C$_6$H$_3$))(CHCMe$_2$Ph)(DFTO)$_2$ (1a)

Mo(N(2,6-i-Pr$_2$C$_6$H$_3$))(CHCMe$_2$Ph)(Me$_2$Pyr)$_2$ (100 mg, 0.159 mmol) was dissolved in benzene (5 mL). DFTOH (136 mg, 0.320 mmol) was added at room temperature and the mixture was heated at 100° C. for 16 hours. The solvent was removed to give an oily orange product. The residue was recrystallized from a mixture of diethyl ether and pentane to give yellow solid (174 mg, 87%): $^1$H NMR (500 MHz, C$_6$D$_6$, 20° C.) δ 11.69 (s, 1H, Mo=CH), 6.97 (m, 3H), 6.84 (d, 8 Hz, 5H), 6.76 (d, $^3J_{HH}$=8 Hz, 2H), 6.68 (m, 4H), 1.90 (sept, $^3J_{HH}$=7 Hz, 2H), 1.36 (s, $^3J_{HH}$=6 Hz), 0.84 (s, 12H); $^{19}$F NMR (282 MHz, C$_6$D$_6$, 20° C.) δ −137.8 (m, 4F), −139.2 (m, 4F), −154.6 (m, 4F), −161.2 (m, 4F), −161.7 (m, 4F); $^{13}$C{$^1$H} NMR (125 MHz, C$_6$D$_6$, 20° C.) δ 288.7 (s, 1C, Mo=C), 164.5, 147.6, 14.7 (d, $^1J_{CF}$=252 Hz), 141.4 (d, $^1J_{CF}$=250 Hz), 138.3 (d, $^1J_{CF}$=254 Hz), 134.8, 133.5, 125.6 (d, 50 Hz), 124.3 (d, 52 Hz), 122.5, 121.2, 118.3, 113.0, 56.8, 29.3, 28.3. Anal. Calcd for C$_{58}$H$_{30}$F$_{20}$MoNO$_2$: C, 55.65; H, 2.81; N, 1.12. Found: C, 55.39; H, 2.93; N, 1.14.

Mo(NAr')(CHCMe$_2$Ph)(DFTO)$_2$ (1b)

Mo(NAr')(CHCMe$_2$Ph)(OTf)$_2$(DME) (Ar'=2,6-Me$_2$C$_6$H$_3$; 100 mg, 0.121 mmol) was suspended in toluene (5 mL) and mixture was cooled to −30° C. DFTOLi (110.4 mg, 0.255 mmol) was added at −30° C. and the temperature was allowed to rise to 22° C. After 1 hour, the solvent was removed in vacuo and the dark oily residue was extracted with CH$_2$Cl$_2$ and the solvent was removed again in vacuo. Pentane (2 mL) was added and the mixture was stirred for 30 min. The resulting yellow precipitate was filtered off and dried in vacuo to give a yellow solid; yield 115 mg (79%); $^1$H NMR (500 MHz, C$_6$D$_6$, 20° C.) δ 11.39 (s, 1H, Mo=CH), 6.91 (d, $^3J_{HH}$=7.5 Hz, 4H), 6.83 (d, $^3J_{HH}$=7.5 Hz, 2H), 6.75 (d, $^3J_{HH}$=7.5 Hz, 2H), 6.72 (m, 3H), 6.54 (t, $^3J_{HH}$=7.5 Hz, 2H), 6.43 (d, $^3J_{HH}$=7.5 Hz, 2H), 1.49 (s, 6H), 1.02 (s, 6H); $^{19}$F NMR (282 MHz, C$_6$D$_6$, 20° C.) δ −138.9 (d, $^3J_{FF}$=23 Hz, 4F), −139.7 (d, $^3J_{FF}$=23 Hz, 4F), −154.7 (t, $^3J_{FF}$=23 Hz, 4F), −161.7 (m, 4F), −162.0 (m, 4F); $^{13}$C{$^1$H} NMR (125 MHz, C$_6$D$_6$, 20° C.) δ 286.0 (s, 1C, Mo=C), 164.7, 156.3, 147.3, 144.7 (dm, $^1J_{CF}$=249 Hz), 141.5 (dm, $^1J_{CF}$=252 Hz), 138.3 (dm, $^1J_{CF}$=252 Hz), 135.9, 125.5, 121.7, 117.8, 112.7 (m), 55.2, 29.5, 17.5. Anal. Calcd for C$_{54}$H$_{27}$F$_{20}$MoNO$_2$: C, 54.15; H, 2.27; N, 1.17. Found: C, 53.83; H, 1.96; N, 0.99.

Mo(NAd)(CHCMe$_2$Ph)(DFTO)$_2$ (1d)

Mo(NAd)(CHCMe$_2$Ph)(Me$_2$Pyr)$_2$ (100 mg, 0.177 mmol) was suspended in diethyl ether (5 mL). DFTOH (151 mg, 0.354 mmol) was added at room temperature. After 1 hour, the solvent was removed to give yellow oil. Pentane (1 mL) was added and the mixture was stirred for 30 min to give a yellow precipitate. The precipitate was filtered off and dried in vacuo to give yellow solid (190 mg, 88%): $^1$H NMR (500 MHz, C$_6$D$_6$, 20° C.) δ 11.08 (s, 1H, Mo=CH), 7.02 (m, 6H), 6.92 (t, $^3J_{HH}$=12 Hz, 1H), 6.77 (t, $^3J_{HH}$=12 Hz, 2H), 6.58 (d, $^3J_{HH}$=12 Hz, 2H), 1.57 (s, 2H), 1.14 (s, 6H), 1.08 (s, 6H), 0.97 (s, 6H); $^{19}$F NMR (282 MHz, C$_6$D$_6$, 20° C.) δ −139.6 (m, 4F), −140.1 (m, 4F), −155.1 (t, $^3J_{FF}$=21 Hz, 4F), −162.1 (m, 4F), −162.5 (m, 4F); $^{13}$C{$^1$H} NMR (125 MHz, C$_6$D$_6$, 20° C.) δ 280.0 (s, 1C, Mo=C), 162.967, 149.5, 144.7 (d, $^1J_{CF}$=247 Hz), 141.4 (d, $^1J_{CF}$=254 Hz), 138.2 (d, $^1J_{CF}$=247 Hz), 133.7 (m), 126.5, 121.6, 117.8, 115.0, 112.7, 78.8, 53.1, 50.1, 43.6 (m), 35.1 (m), 31.6, 29.7 (m). Anal. Calcd for C$_{56}$H$_{33}$F$_{20}$MoNO$_2$: C, 54.78; H, 2.71; N, 1.14. Found: C, 54.82; H, 2.61; N, 1.20.

Mo(NC$_6$F$_5$)(CHCMe$_2$Ph)(Me$_2$Pyr)(HMTO) (2a)

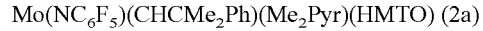

Mo(NC$_6$F$_5$)(CHCMe$_2$Ph) (Me$_2$Pyr)$_2$ (300 mg, 0.502 mmol) was dissolved in benzene (5 mL). HMTOH (183 mg, 0.557 mmol) was added and the mixture was heated to 70° C. After 16 h, the solvent was removed in vacuo to give dark oily product. The residue was recrystallized from a mixture of pentane and diethyl ether to give an orange solid; yield 259 mg (60%): $^1$H NMR (500 MHz, C$_6$D$_6$, 20° C.) δ 11.08 (s, 1H, Mo=CH), 7.24 (d, $^3J$=8 Hz, 2H), 6.94 (m, 3H), 6.88 (m, 2H), 6.79 (s, 2H), 6.73 (s, 2H), 6.69 (m, 1H), 6.07 (s, 2H), 2.05 (d, J=10.5 Hz, 12H), 1.98 (br, 12H), 1.36 (d, J=11.3 Hz, 6H); $^{19}$F NMR (282 Hz, $C_6D_6$, 20° C.) −145.7 (d, 2F, $^3J$=23 Hz, o-Ar), −159.4 (t, 1F, $^3J$=24 Hz, p-Ar), −165.0 (t, 2F, $^3J$=23 Hz, m-Ar); $^{13}C\{^1H\}$ NMR (125 MHz, $C_6D_6$, 20° C.) δ 295.3 (s, 1C, Mo=C), 157.9, 148.4, 143.0 (d, $^1J_{CF}$=245 Hz), 139.4 (d, $^1J_{CF}$=260 Hz), 136.9, 136.8, 136.4, 135.5 (d, $^1J_{CF}$=235 Hz), 135.2, 134.7, 131.9, 129.8, 129.1, 127.3, 126.0, 123.4, 109.7, 155.5, 34.4, 32.5, 28.6, 22.7, 21.1, 19.9, 16.8, 14.4. Anal. Calcd for $C_{46}H_{45}F_5MoN_2O_2$: C, 66.34; H, 5.45; N, 3.36. Found: C, 66.27; H, 5.49; N, 3.33.

$Mo(NC_6F_5)(CHCMe_2Ph)(Me_2Pyr)(DFTO)$ (2b)

$Mo(NC_6F_5)(CHCMe_2Ph)$ $(Me_2Pyr)_2$ (300 mg, 0.491 mmol) was dissolved in MeCN (10 mL) and DFTOH (209 mg, 0.491 mmol) was added as solid at room temperature. After 16 h, the solvent was removed in vacuo to give orange oily product. Diethyl ether (1 mL) was added and the mixture was stirred for 30 min to give an orange solid $Mo(NC_6F_5)(CHCMe_2Ph)(Me_2Pyr)(DFTO)(MeCN)$ (356 mg, 75%). The solid was dissolved in toluene and the solvent was removed in vacuo. This step was repeated 10 times to remove MeCN and give 2b as a red foam (341 mg). $^1H$ NMR (500 MHz, $C_6D_6$, 20° C.) δ 11.64 (br, 1H, Mo=CH), 7.13 (d, $^3J_{HH}$=7.5 Hz, 2H), 6.99 (d, $^3J_{HH}$=7.5 Hz, 2H), 6.88 (t, $^3J_{HH}$=7.5 Hz, 1H), 6.79 (brt, $^3J_{HH}$=7 Hz, 2H), 6.60 (brt, $^3J_{HH}$=7 Hz, 1H), 5.68 (br, 2H), 2.01 (br, 6H), 1.29 (br, 3H), 1.05 (s, 3H); $^{19}F$ NMR (282 MHz, $C_6D_6$, 20° C.) δ −140.0 (br, 2F), −140.4 (br, 2F), −148.0 (d, $^3J_{FF}$=20 Hz, 2F), −154.7 (br, 2F), −156.5 (t, $^3J_{FF}$=20 Hz, 1F), −162.1 (br, 2F), −162.8 (br, 2F), −163.8 (m, 2F); $^{13}C\{^1H\}$ NMR (125 MHz, $C_6D_6$, 20° C.) δ 298.8 (br, Mo=C), 165.3, 147.6, 144.6 (dm, $^1J_{CF}$=246 Hz), 142.8 (dm, $^1J_{CF}$=241 Hz), 141.4 (dm, $^1J_{CF}$=246 Hz), 140.5 (dm, $^1J_{CF}$=246 Hz), 138.4 (dm, $^1J_{CF}$=249 Hz), 137.4 (dm, $^1J_{CF}$=251 Hz), 133.9, 133.6, 131.3 (t, 15 Hz), 126.7, 126.4, 122.1, 117.7, 112.3, 110.2, 55.7, 29.1, 15.7 (br); $^1H$ NMR (500 MHz, $CDCl_3$, 20° C.) δ 11.59 (br, 1H, Mo=CH), 7.37 (d, $^3J_{HH}$=7 Hz, 2H), 7.19 (t, $^3J_{HH}$=8 Hz, 1H), 7.12 (d, $^3J_{HH}$=7.5 Hz, 2H), 7.06 (t, $^3J_{HH}$=7.5 Hz, 2H), 6.93 (t, $^3J_{HH}$=7.5 Hz, 1H), 5.73 (br, 2H), 2.00 (br, 6H), 1.41 (s, 3H), 1.25 (s, 3H); $^{19}F$ NMR (282 MHz, $CDCl_3$, 20° C.) δ −139.4 (br, 2F), −140.1 (br, 2F), −147.2 (d, $^3J_{FF}$=20 Hz, 2F), −154.4 (br, 2F), −155.8 (t, $^3J_{FF}$=20 Hz, 1F), −161.9 (br, 2F), −162.5 (br, 2F), −163.3 (m, 2F). The foam-like solid was recrystallized from a mixture of acetonitrile, diethyl ether, and pentane to give analytical pure orange crystals of $Mo(NC_6F_5)(CHCMe_2Ph)(Me_2Pyr)(DFTO)(MeCN)(½Et_2O)$: $^1H$ NMR (500 MHz, $C_6D_6$, 20° C.) δ 12.13 (br, 1H, Mo=CH), 7.08 (d, $^3J_{HH}$=7.5 Hz, 2H), 7.01 (d, $^3J_{HH}$=7.5 Hz, 2H), 6.83 (t, $^3J_{HH}$=7.5 Hz, 3H), 6.67 (brt, $^3J_{HH}$=7 Hz, 1H), 5.83 (br, 2H), 3.25 (q, $^3J_{HH}$=7 Hz, 2H), 2.06 (br, 6H), 1.30 (s, 3H), 1.19 (s, 3H), 1.12 (t, $^3J_{HH}$=7 Hz, 3H), 0.62 (br, 3H); $^{19}F$ NMR (282 MHz, $C_6D_6$, 20° C.) δ −140.3 (br, 4F), −147.9 (d, $^3J_{FF}$=20 Hz, 2F), −154.9 (br, 2F), −156.1 (t, $^3J_{FF}$=20 Hz, 1F), −162.1 (br, 2F), −162.7 (br, 2F), −163.7 (m, 2F). Anal. Calcd for $C_{44}H_{31}F_{15}MoN_3O_{1.5}$: C, 52.50; H, 3.10; N, 4.17. Found: C, 52.82; H, 3.29; N, 4.04.

$Mo(NAr')(CHCMe_2Ph)(Me_2Pyr)(DFTO)$ (2c)

$Mo(NAr')(CHCMe_2Ph)$ $(Me_2Pyr)_2$ (130 mg, 0.242 mmol) was suspended in toluene (5 mL). The suspension was cooled to −30° C. and DFTOH (103 mg, 0.242 mmol) was added at −30° C. The mixture was allowed to warm to room temperature. After 1 hour, the solvent was removed in vacuo to give a dark red oily product. Pentane (2 mL) was added and the mixture was stirred for 30 min to give a homogenous reddish solution and MeCN (3 drops) was added. The brownish precipitate was recrystallized from a mixture of ether and pentane to give 2c as a yellow solid; yield 162 mg (76%): $^1H$ NMR (500 MHz, $C_6D_6$, 20° C.) δ 12.08 (s, 1H, Mo=CH), 7.13 (d, $^3J_{HH}$=7.5 Hz, 2H), 6.99 (d, $^3J_{HH}$=7.5 Hz, 2H), 6.91 (d, $^3J_{HH}$=7.5 Hz, 2H), 6.88 (d, $^3J_{HH}$=7.5 Hz, 1H), 6.82 (d, $^3J_{HH}$=7.5 Hz, 1H), 6.61 (d, $^3J_{HH}$=7.5 Hz, 1H), 6.53 (d, $^3J_{HH}$=7.5 Hz, 2H), 5.85 (br, 2H), 1.93 (br, 6H), 1.69 (br, 6H), 1.30 (s, 3H), 1.24 (s, 3H); $^{19}F$ NMR (282 MHz, $C_6D_6$, 20° C.) δ −139.8 (dm, $^3J_{FF}$=23 Hz, 2F), −140.6 (dm, $^3J_{FF}$=23 Hz, 2F), −153.9 (t, $^3J_{FF}$=23 Hz, 2F), −161.7 (m, 4F); $^{13}C\{^1H\}$ NMR (125 MHz, $C_6D_6$, 20° C.) δ 294.6 (s, 1C, Mo=C), 164.9, 155.8, 147.2, 144.7 (dm, $^1J_{CF}$=242 Hz), 141.2 (dm, $^1J_{CF}$=252 Hz), 138.2 (dm, $^1J_{CF}$=247 Hz), 133.7 (d, $J_{CF}$=22 Hz), 121.8, 117.6, 115.9, 112.5, 109.9 (br), 100.9, 55.2, 30.6, 17.6, 14.2. Crystals of 2c', the MeCN adduct, were obtained from a mixture of diethyl ether and MeCN. Anal. Calcd for $C_{42}H_{32}F_{10}MoN_2O$: C, 58.22; H, 3.89; N, 4.64. Found: C, 58.51; H, 4.19; N, 4.26.

$Mo(NC_6F_5)(CH_2CH_2)(DFTO)_2$ (3)

$Mo(NC_6F_5)(CHCMe_2Ph)(DFTO)_2$ (138 mg, 0.119 mmol) was dissolved in ether (10 mL). The Schlenk bomb was freeze-pump-thaw three times. $CH_2=CH_2$ (1 atm) was added at room temperature. After stirring for 16 h, the orange solution turned to dark purple. The solvent was removed to give dark oil. Pentane (1 mL) was added and stirred to 30 min to give purple solid. The mixture was cooled at −30° C. for overnight and filtered. The solid was washed with cold pentane and dried in vacuo; yield 105 mg (76%): $^1H$ NMR (500 MHz, tol-$d_8$, 20° C.) δ 6.95 (d, $^3J$=8 Hz, 4H), 6.78 (t, $^3J$=8 Hz, 2H), 2.48 (dt, J=8 Hz, J=5 Hz, 2H, $CH_2=CH_2$), 1.33 (dt, J=8 Hz, J=5 Hz, 2H, $CH_2=CH_2$); $^{19}F$ NMR (282 MHz, tol-$d_8$, 20° C.) δ −140.7 (d, $^3J_{FF}$=22 Hz, 8F, o-F), −150.7 (d, $^3J_{FF}$=25 Hz, 2F, o-F of $NC_6F_5$), −154.8 (m, 5F), −162.3 (m, 10F); $^{13}C\{^1H\}$ NMR (125 MHz, tol-$d_8$, 20° C.) δ 161.5, 144.4 (dm, $^1J_{CF}$=246 Hz, 8C, DFTO), 142.9 (dm, $^1J_{CF}$=253 Hz, 2C, $NC_6F_5$), 141.2 (dm, $^1J_{CF}$=255 Hz, 4C, DFTO), 140.5 (dm, $^1J_{CF}$=255 Hz, 1C, $NC_6F_5$), 138.2 (dm, $^1J_{CF}$=253 Hz, 8C, DFTO), 137.3 (dm, $^1J_{CF}$=255 Hz, 2C, $NC_6F_5$), 133.8 (m), 122.5 (m), 118.2, 112.3 (td, 9 Hz, 4 Hz), 61.1 ($CH_2=CH_2$); $^1H$ NMR (500 MHz, tol-$d_8$, −80° C.) δ 7.05 (br, 4H), 6.81 (br, 2H), 2.60 (br, 1H), 2.19 (br, 1H), 1.85 (br, 1H), 0.81 (br, 1H); $^{19}F$ NMR (282 MHz, tol-$d_8$, −80° C.) δ −140.0 (1F), −141.2 (1F), −142.1 (1F), −142.3 (1F), −143.3 (4F), −151.5 (1F), −152.0 (2F), −154.5 (2F), −154.8 (2F), −159.7 (1F), −161.4 (1), −162.4 (5F), −163.5 (2F), −164.2 (1F). Anal. Calcd for $C_{44}H_{10}F_{25}MoNO_2$: C, 45.74; H, 0.87; N, 1.21. Found: C, 45.79; H, 1.06; N, 1.26.

$Mo(NC_6F_5)(CH_2CH_2)(DCMNBD)(DFTO)_2$ (5)

$Mo(NC_6F_5)(CH_2=CH_2)$ $(DFTO)_2$ (40 mg, 0.0341 mmol) was dissolved in $C_6D_6$ (0.5 mL). DCMNBD (7.1 mg, 0.0341 mol) was added as a solution of $C_6D_6$ (0.071 mL, 100 mg/mL). After 16 hours, reddish-orange crystals were formed (27 mg, 57%). $^1H$ NMR (500 MHz, $C_6D_6$, 20° C.) δ 7.16 (d, J=8 Hz, 2H), 7.10 (br, 2H), 6.89 (br, 2H), 6.79 (br, 1H), 6.72 (t, J=8 Hz, 1H), 3.91 (s, 1H), 3.85 (s, 1H), 3.73 (s, 3H), 3.07 (td, J=12 Hz, J=4 Hz, 1H, $CH_2=CH_2$), 2.72 (td, J=12 Hz, J=4 Hz, 1H, $CH_2=CH_2$), 2.39 (s, 3H, OMe), 2.45 (d, 8 Hz, 1H), 1.94 (d, 8 Hz, 1H), 1.77 (td, J=12 Hz, J=4 Hz, 1H, $CH_2=CH_2$), 1.43 (td, J=12 Hz, J=4 Hz, 1H, $CH_2=CH_2$); $^{19}F$ NMR (282 MHz, $C_6D_6$, 20° C.) δ −133.3 (br, 1F), −137.3 (br, 1F), −140.9 (s, 2F), −145.3 (br, 1F), −150.5 (s, 1F), −151.5 (s, 1F), −152.0 (s, 1F), 154.6 (s, 1F), −156.2 (s, 1F), −157.0 (m, 2F), −158.9 (br, 2F), −162.3 (bs, 4F), −163.9 (m, 4F).

Mo(NC$_6$F$_5$)($^{13}$CH$_2$$^{13}$CH$_2$$^{13}$CH$_2$)(DFTO)$_2$ (5*)

Mo(NC$_6$F$_5$)(CHCMe$_2$Ph)(DFTO)$_2$ (10 mg) was dissolved in C$_6$D$_6$ (0.5 mL) in a J. Young NMR tube. The solution was freeze-pump-thaw three times. $^{13}$CH$_2$=$^{13}$CH$_2$ (<1 atm) was added through vacuum transfer. After 5 min, all of the starting material was consumed and 5* was formed in addition to Mo(NC$_6$F$_5$)($^{13}$CH$_2$$^{13}$CH$_2$$^{13}$CH$_2$)(DFTO)$_2$: $^1$H NMR (500 MHz, C$_6$D$_6$, 20° C.) δ 3.67 (brd, J$_{CH}$=165 Hz, 2H, α-H), 3.55 (brd, J$_{CH}$=155 Hz, 2H, α-H), −0.72 (brd, J$_{CH}$=154 Hz, 1H, β-H), −1.33 (brd, J$_{CH}$=154 Hz, 1H, β-H); $^{13}$C{$^1$H} NMR (125 MHz, C$_6$D$_6$, 20° C.) δ 102.5 (C$_α$), −3.1 (C$_β$).

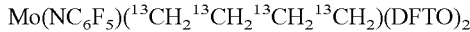
Mo(NC$_6$F$_5$)($^{13}$CH$_2$$^{13}$CH$_2$$^{13}$CH$_2$$^{13}$CH$_2$)(DFTO)$_2$ Mo(NC$_6$F$_5$)($^{13}$CH$_2$$^{13}$CH$_2$)(DFTO)$_2$ (10 mg, 0.00852 mmol) was dissolved in C$_6$D$_6$ (0.5 mL) in a J. Young NMR tube. The solution was freeze-pump-thaw three times. $^{13}$CH$_2$=$^{13}$CH$_2$ was added through vacuum transfer. After 2 days, about 1% Mo(NC$_6$F$_5$)(CH$_2$CH$_2$CH$_2$CH$_2$)(DFTO)$_2$ was formed; $^{13}$C{$^1$H} NMR (125 MHz, C$_6$D$_6$, 20° C.) δ 82.9 (m, AA'BB', C$_α$), 39.9 (m, AA'BB', c$_β$).

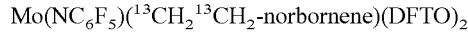
Mo(NC$_6$F$_5$)($^{13}$CH$_2$$^{13}$CH$_2$-norbornene)(DFTO)$_2$

Mo(NC$_6$F$_5$)($^{13}$CH$_2$$^{13}$CH$_2$)(DFTO)$_2$ (10 mg, 0.00852 mmol) was dissolved in toluene-d$_8$ (0.5 mL) in a J. Young NMR tube and cooled at −78° C. The norbornene (0.8 mg, 0.00852 mmol) was added as a solution of toluene-d$_8$ (0.5 mL) drop by drop. The NMR tube was insert to a −70° C. NMR. After 1 hour, 69% product was formed: $^{13}$C{$^1$H} NMR (125 MHz, C$_6$D$_6$, 20° C.) δ 84.7 (d, $^1$J$_{cc}$=37 Hz, MoCO, 46.6 ppm (d, $^1$J$_{cc}$=37 Hz, C$_β$).

Mo(NC$_6$F$_5$)(CHCHCMePh)(DFTO)$_2$

Mo(NC$_6$F$_5$)(CH$_2$CH$_2$)(DFTO)$_2$ (10 mg, 0.00853 mmol) was dissolved in toluene (4 mL) and the solution was cooled to −78° C. The MPCP (1.11 mg, 0.00853 mmol) was added drop by drop as a solution in toluene (1 mL). The purple color changed to orange immediately. After one hour, the mixture was warmed up to room temperature and the solvent removed to give an oily orange product (12 mg): $^1$H NMR (500 MHz, C$_6$D$_6$, 20° C.) δ 12.10 (dd, $^1$J$_{CH}$=130 Hz, $^3$J$_{HH}$=9 Hz, MoCH), 8.33 (dd, $^1$J$_{CH}$=159 Hz, $^3$J$_{HH}$=9 Hz, β-H). The other resonances overlap with polymer resonances; $^{13}$C{$^1$H} NMR (125 MHz, C$_6$D$_6$, 20° C.) δ 264.5 (s, C$_a$), 136.0 (s, C$_β$).

Procedure for ROMP of DCMNBD

The initiator (1 mg) was dissolved in CDCl$_3$ (0.5 mL). DCMNBD (100 eq) was added as a solution in CDCl$_3$ (0.5 mL). After 30 min, benzaldehyde (0.1 mL) was added to the mixture. The reaction mixture became deep green within 5 minutes, and was stirred for 1 h. The entire mixture was added dropwise to 100 mL of vigorously stirred methanol. A fine white solid formed immediately. After 2 h the polymer was filtered off, rinsed with MeOH, and dried in vacuo.

Measurement of Conversion of DCMNBD by 3

DCMNBD (50 mg, 0.240 mmol) and an internal standard of anthracene were dissolved in CDCl$_3$ in a J. Young NMR tube. A $^1$H NMR spectrum was obtained. A 12.0 mM solution of 3 was prepared and 0.2 mL (2.4 μmol) was added to the NMR tube. The tube was inverted to mix, and the tube was then heated to 50° C. $^1$H NMR spectra were obtained over 120 h. Conversion was measured by integration of the olefinic resonance of DCMNBD against the anthracene internal standard.

Crystallographic Details

Low-temperature diffraction data (φ- and ω-scans) were collected on a Siemens Platform three-circle diffractometer coupled to a Bruker-AXS Smart Apex CCD detector with graphite-monochromated Mo Kα radiation (λ=0.71073 Å) for the structure of compound 5 and on a Bruker-AXS X8 Kappa Duo diffractometer coupled to a Smart Apex2 CCD detector with Mo Kα radiation (λ=0.71073 Å) from an Incoatec IμS micro-source for the structures of compounds 2b' and 3. The structures were solved by direct methods using SHELXS (Sheldrick, G. M., Acta Cryst. 1990, A46, 467-473) and refined against F$^2$ on all data by full-matrix least squares with SHELXL-97 (Sheldrick, G. M., Acta Cryst. 2008, A64, 112-122) following established refinement strategies (Müller, P. Crystallography Reviews 2009, 15, 57-83). All non-hydrogen atoms were refined anisotropically. Except for hydrogen atoms on carbon atoms in direct contact with the metal (for details see below), all hydrogen atoms were included into the model at geometrically calculated positions and refined using a riding model. The isotropic displacement parameters of all hydrogen atoms were fixed to 1.2 times the U value of the atoms they are linked to (1.5 times for methyl groups).

Compound 2b' crystallizes in the monoclinic space group P2$_1$/c with two molecules of 2b' and one disordered molecule of diethyl ether per asymmetric unit. One of the two independent molecules, that of molybdenum atom Mo1, is well-behaved, the other shows higher than average molecular motion of some of the ligands. This motion could be modeled as disorder over two components for the pentafluorophenyl and the alkylidene ligands. For discussions of molecular geometry, parameters derived from the well-behaved molecule are used. All disorders were refined with the help of similarity restraints on 1-2 and 1-3 distances and displacement parameters as well as rigid bond restraints for anisotropic displacement parameters. The ratios between the two components of all disorders were refined freely and converged at 0.53(4) (alkylidene), 0.53 (2) (pentafluorophenyl), and 0.550(5) (solvent), respectively. Coordinates for the hydrogen atoms on C1, C51 and C51A, that is the carbon atoms directly binding to the metal, were taken from the difference Fourier synthesis where they were found among the eight highest residual density maxima (the same starting-coordinates were used for the hydrogen atoms in C51 and C51A). These three hydrogen atom positions were subsequently refined semi-freely with the help of distance restraints (target C—H-distance 0.95(2) Å). The circumstance that the crystal contains one solvent molecule for every two target molecules leads to a non-integer value for the element type oxygen in the empirical formula.

Compound 3 crystallizes in the monoclinic space group P2$_1$/c with one molecule per asymmetric unit. Coordinates for the hydrogen atoms on C1 and C2, that is the carbon atoms directly binding to the metal, were taken from the difference Fourier synthesis where they corresponded to the four highest residual density maxima. These hydrogen atoms were subsequently refined semi-freely with the help of distance restraints on the C—H-distances (target 0.95(2) Å) and similarity restraints on the two H—C—H-angles.

Compound 5 crystallizes in the triclinic space group P1 with one molecule of 5 and two benzene molecules per asymmetric unit. One of the two benzene molecules is disordered over two positions. The ratio between the two components of this disorders was refined freely and converged at 0.710(8). Similarity restraints on 1-2 and 1-3 distances and displacement parameters as well as rigid bond restraints for anisotropic displacement parameters were applied to all atoms in the solvent molecules. In addition, the three benzene molecules were restraint to be approximately planar. Coordinates for the hydrogen atoms on C1 and C2, that is the carbon atoms directly binding to the metal, were taken from the difference Fourier synthesis where they corresponded to the four highest residual density maxima. These hydrogen atoms were subsequently refined semi-freely with the help of distance restraints on the C—H-distances (target 0.95(2) Å) and similarity restraints on the two H—C—H-angles.

TABLE 5

Crystal data and structure refinement for 2b'.

| | |
|---|---|
| Identification code | X8_12207 |
| Empirical formula | $C_{44} H_{31} F_{15} Mo N_3 O_{1.5}$ |
| Formula weight | 1006.66 |
| Temperature | 100(2) K |
| Wavelength | 0.71073 Å |
| Crystal system | Triclinic |
| Space group | $P\bar{1}$ |
| Unit cell dimensions | a = 11.9807(8) Å   α = 96.2670(10)°. |
| | b = 16.7624(11) Å   β = 105.5080(10)°. |
| | c = 22.1895(15) Å   γ = 100.9520(10)°. |
| Volume | 4155.1(5) Å$^3$ |
| Z | 4 |
| Density (calculated) | 1.609 Mg/m$^3$ |
| Absorption coefficient | 0.424 mm$^{-1}$ |
| F(000) | 2020 |
| Crystal size | 0.32 × 0.17 × 0.14 mm$^3$ |
| Theta range for data collection | 1.26 to 31.51°. |
| Index ranges | $-16 \leq h \leq 17, -24 \leq k \leq 24, -32 \leq l \leq 32$ |
| Reflections collected | 249296 |
| Independent reflections | 27615 [$R_{int}$ = 0.0325] |
| Completeness to theta = 31.51° | 99.8% |
| Absorption correction | Semi-empirical from equivalents |
| Max. and min. transmission | 0.9430 and 0.8762 |
| Refinement method | Full-matrix least-squares on F$^2$ |
| Data/restraints/parameters | 27615/870/1420 |
| Goodness-of-fit on F$^2$ | 1.023 |
| Final R indices [I > 2σ(I)] | R1 = 0.0270, wR2 = 0.0657 |
| R indices (all data) | R1 = 0.0332, wR2 = 0.0693 |
| Largest diff. peak and hole | 0.552 and −0.490 e.Å$^{-3}$ |

TABLE 6

Crystal data and structure refinement for 3.

| | |
|---|---|
| Identification code | X8_12143 |
| Empirical formula | $C_{44} H_{10} F_{25} Mo N O_2$ |
| Formula weight | 1155.47 |
| Temperature | 100(2) K |
| Wavelength | 0.71073 Å |
| Crystal system | Monoclinic |
| Space group | $P2_1/c$ |
| Unit cell dimensions | a = 11.9310(11) Å   α = 90°. |
| | b = 43.920(4) Å   β = 105.667(2)°. |
| | c = 7.9516(7) Å   γ = 90°. |
| Volume | 4011.9(6) Å$^3$ |
| Z | 4 |
| Density (calculated) | 1.913 Mg/m$^3$ |
| Absorption coefficient | 0.487 mm$^{-1}$ |
| F(000) | 2256 |
| Crystal size | 0.25 × 0.08 × 0.01 mm$^3$ |
| Theta range for data collection | 1.77 to 26.02°. |

TABLE 6-continued

Crystal data and structure refinement for 3.

| | |
|---|---|
| Index ranges | $-14 \leq h \leq 8, -53 \leq k \leq 54, -9 \leq l \leq 9$ |
| Reflections collected | 35662 |
| Independent reflections | 7820 [$R_{int}$ = 0.0504] |
| Completeness to theta = 26.02° | 98.9% |
| Absorption correction | Semi-empirical from equivalents |
| Max. and min. transmission | 0.9951 and 0.8879 |
| Refinement method | Full-matrix least-squares on F$^2$ |
| Data/restraints/parameters | 7820/5/670 |
| Goodness-of-fit on F$^2$ | 1.180 |
| Final R indices [I > 2σ(I)] | R1 = 0.0538, wR2 = 0.0975 |
| R indices (all data) | R1 = 0.0671, wR2 = 0.1014 |
| Largest diff. peak and hole | 0.477 and −0.744 e.Å$^{-3}$ |

TABLE 7

Crystal data and structure refinement for 5.

| | |
|---|---|
| Identification code | 12173 |
| Empirical formula | $C_{67} H_{34} F_{25} Mo N O_6$ |
| Formula weight | 1519.89 |
| Temperature | 100(2) K |
| Wavelength | 0.71073 A |
| Crystal system | Triclinic |
| Space group | $P\bar{1}$ |
| Unit cell dimensions | a = 11.6122(15) Å   α = 91.318(2)°. |
| | b = 12.2993(16) Å   β = 105.053(2)°. |
| | c = 22.146(3) Å   γ = 101.085(2)°. |
| Volume | 2988.6(7) Å$^3$ |
| Z | 2 |
| Density (calculated) | 1.689 Mg/m$^3$ |
| Absorption coefficient | 0.354 mm$^{-1}$ |
| F(000) | 1516 |
| Crystal size | 0.34 × 0.26 × 0.21 mm$^3$ |
| Theta range for data collection | 1.69 to 30.51°. |
| Index ranges | $-16 \leq h \leq 16, -17 \leq k \leq 17, -31 \leq l \leq 31$ |
| Reflections collected | 137101 |
| Independent reflections | 18222 [$R_{int}$ = 0.0423] |
| Completeness to theta = 30.51° | 99.8% |
| Absorption correction | Semi-empirical from equivalents |
| Max. and min. transmission | 0.9293 and 0.8878 |
| Refinement method | Full-matrix least-squares on F$^2$ |
| Data/restraints/parameters | 18222/542/970 |
| Goodness-of-fit on F$^2$ | 1.053 |
| Final R indices [I > 2σ(I)] | R1 = 0.0247, wR2 = 0.0646 |
| R indices (all data) | R1 = 0.0277, wR2 = 0.0668 |
| Largest diff. peak and hole | 0.461 and −0.494 e.Å$^{-3}$ |

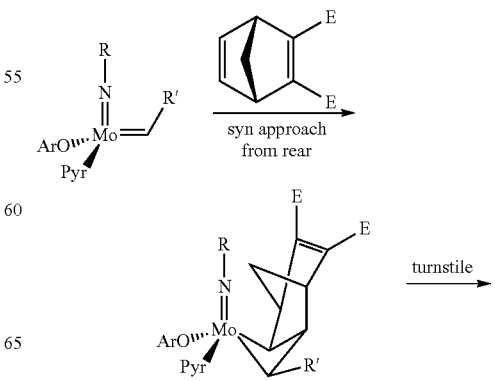

Scheme 1. A possible mechanism that leads to cis, isotactic-poly(DCMNBD).

-continued

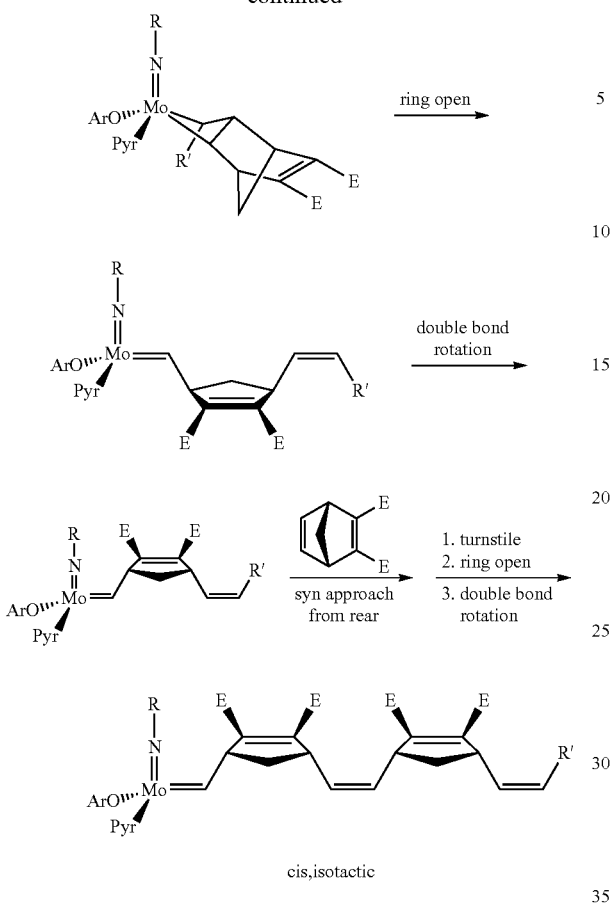

cis,isotactic

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The invention claimed is:
1. A compound of formula I:

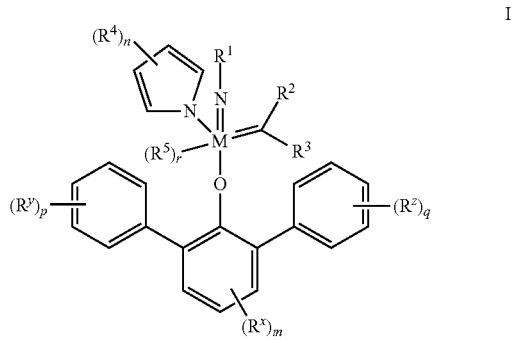

wherein:
M is molybdenum or tungsten;
$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;
each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR' SO$_2$R';
n is 0-4;
r is 0-2;
each $R^4$ is independently hydrogen or optionally substituted $C_{1-4}$ aliphatic;
each $R^5$ is independently a monodentate ligand, or two $R^5$ are optionally taken together to form a bidentate ligand;
each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur; and

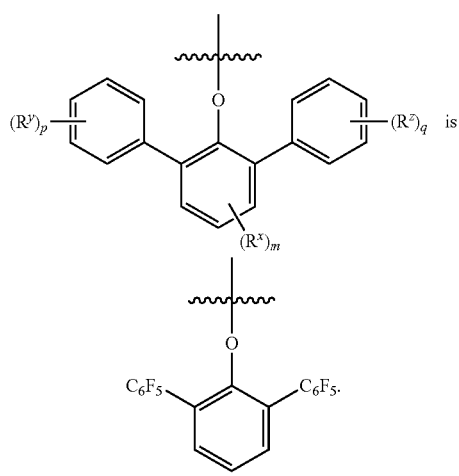

2. The compound of claim 1, wherein one of $R^2$ and $R^3$ is hydrogen and the other is —C(Me)$_3$ or —C(Me)$_2$Ph.

3. The compound of claim 1, wherein r is 0.

4. The compound of claim 1, wherein r is 1 and $R^5$ is R'CN.

5. The compound of claim 1, wherein

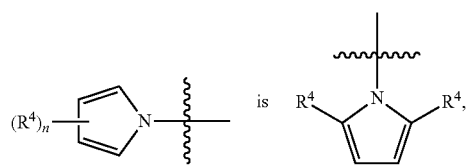

and each $R^4$ is methyl.

6. The compound of claim 1, wherein $R^1$ is selected from

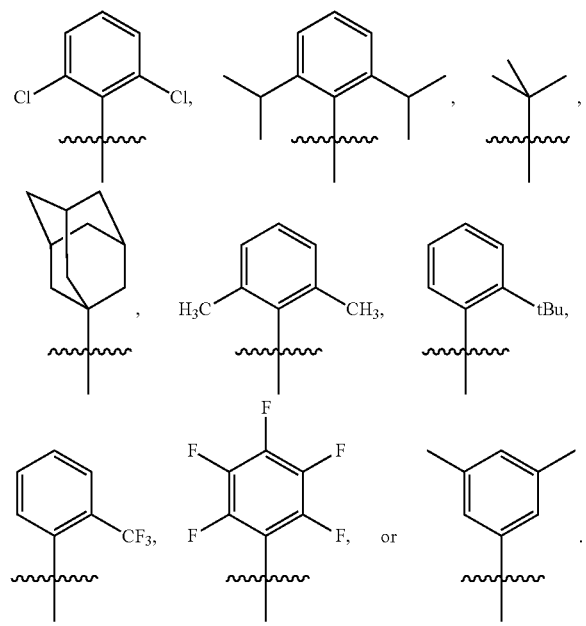

7. The compound of claim 1, wherein the compound is Mo(NC$_6$F$_5$)(CHCMe$_2$Ph)(Me$_2$Pyr)(DFTO), Mo(NC$_6$F$_5$)(CHCMe$_2$Ph)(Me$_2$Pyr)(DFTO)(MeCN), Mo(N(2,6-Me$_2$C$_6$H$_3$))(CHCMe$_2$Ph)(Me$_2$Pyr)(DFTO), or Mo(N(2,6-Me$_2$C$_6$H$_3$))(CHCMe$_2$Ph)(Me$_2$Pyr)(DFTO)(MeCN), wherein Me$_2$Pyr is 2,5-dimethylpyrrolyl, and DFTO is 2,6-(C$_6$F$_5$)$_2$C$_6$H$_3$O—.

8. The compound of claim 1, wherein the compound is isolated.

9. The compound of claim 3, wherein the compound is isolated.

10. A method for preparing a compound of claim 1, comprising steps of:
1) providing a compound having the structure of formula III:

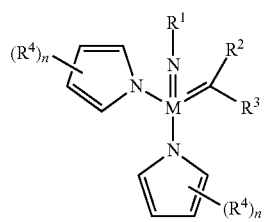

2) providing a first ligand or ligand precursor; and
3) reacting the compound of formula III with a second ligand or ligand precursor in the presence of the first ligand or ligand precursor, wherein the second ligand or ligand precursor having the structure of formula IV:

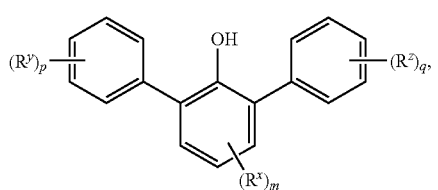

or a salt thereof.

11. The method of claim 10, wherein a first ligand or ligand precursor is $R^5$.

12. The method of claim 10, wherein a first ligand or ligand precursor is CH$_3$CN.

13. A method for performing a metathesis reaction, comprising providing a compound of claim 1.

14. The method of claim 13, wherein the metathesis reaction is ring-opening metathesis polymerization (ROMP), and the ROMP polymer product is greater than about 95% isotactic and greater than about 95% cis.

15. A compound of formula II:

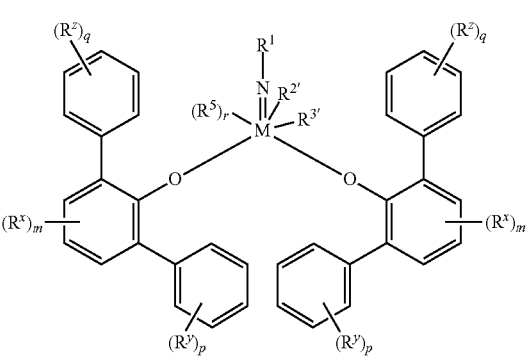

wherein

M is molybdenum or tungsten;

$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

$R^{2'}$ and $R^{3'}$ are taken together with their intervening metal atoms to form an optionally substituted 3-8 membered saturated or partially unsaturated ring having, in addition to the intervening metal atom, 0-4 heteroatoms independently selected from nitrogen, oxygen, or sulfur;

m is 0-3;

each of p and q is independently 0-5, and at least one of p and q is not 0;

r is 0-2;

each of $R^x$, $R^y$ and $R^z$ is independently an electron-withdrawing group;

each $R^5$ is independently a monodentate ligand, or two $R^5$ are optionally taken together to form a bidentate ligand; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

16. The compound of claim 15, wherein $R^{2'}$ and $R^{3'}$ are taken together with M to form an optionally substituted 3-membered ring.

17. The compound of claim 8, wherein the compound has the structure of formula II-a:

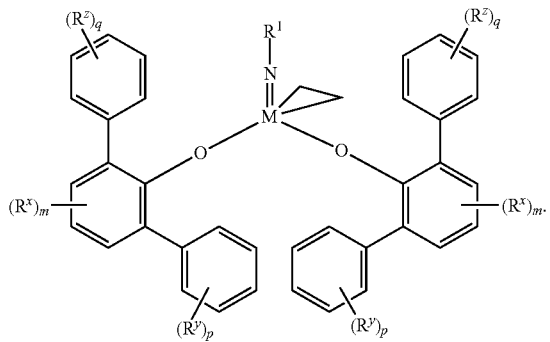

18. The compound of claim 17, wherein

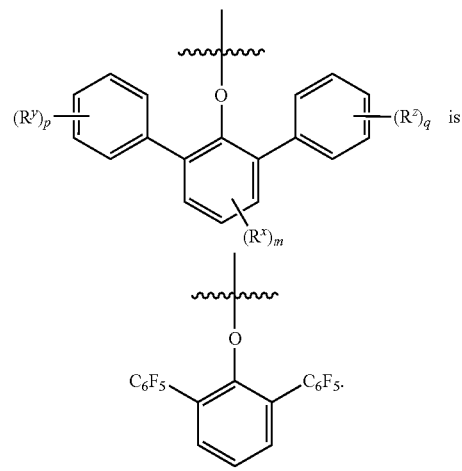 is

19. The compound of claim 17, wherein the compound is isolated.

20. The compound of claim 15, wherein r is 0.

21. The compound of claim 15, wherein r is 1 and $R^5$ is R'CN.

22. The compound of claim 15, wherein

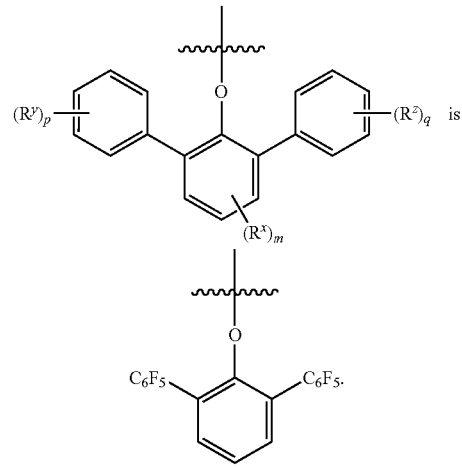 is

23. The compound of claim 15, wherein $R^1$ is selected from

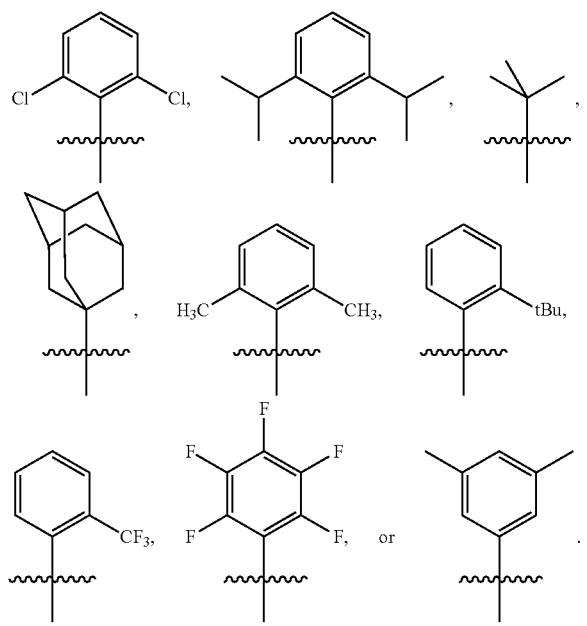

24. The compound of claim 15, wherein the compound is $Mo(NC_6F_5)(CH_2CH_2)(DFTO)_2$, $Mo(NC_6F_5)(CH_2CH_2)(DCMNBD)(DFTO)_2$, $Mo(NC_6F_5)(CH_2CH_2CH_2)(DFTO)_2$, or $Mo(NC_6F_5)(CH_2CH_2CH_2CH_2)(DFTO)_2$, wherein DFTO is $2,6-(C_6F_5)_2C_6H_3O-$.

25. A method for preparing a compound of claim 15, comprising:
reacting a compound having the structure of formula V:

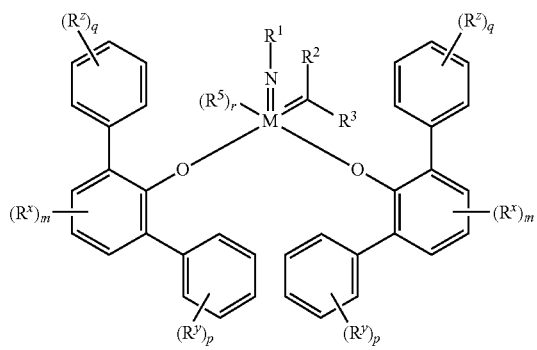

with an olefin, wherein:
M is molybdenum or tungsten;
$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;
each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR' SO$_2$R';
m is 0-3;
each of p and q is independently 0-5, and at least one of p and q is not 0;
r is 0-2;
each of $R^x$, $R^y$ and $R^z$ is independently an electron-withdrawing group;
each $R^5$ is independently a monodentate ligand, or two $R^5$ are optionally taken together to form a bidentate ligand; and
each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:
two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

26. A method for preparing a compound of claim 15, wherein the compound has the structure of formula II':

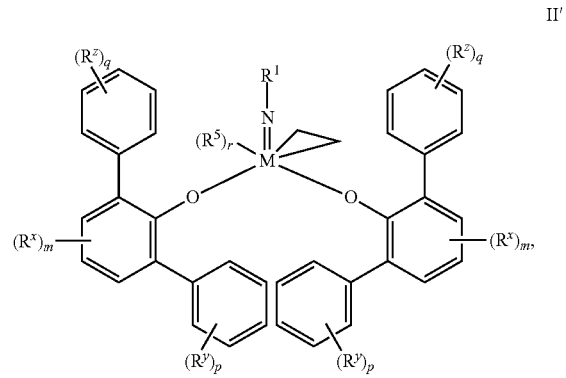

wherein:
M is molybdenum or tungsten;
$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

m is 0-3;

each of p and q is independently 0-5, and at least one of p and q is not 0;

r is 1-2;

each of $R^x$, $R^y$ and $R^z$ is independently an electron-withdrawing group;

each $R^5$ is independently a monodentate ligand, or two $R^5$ are optionally taken together to form a bidentate ligand;

each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur, comprising:
reacting a compound having the structure of formula II-a:

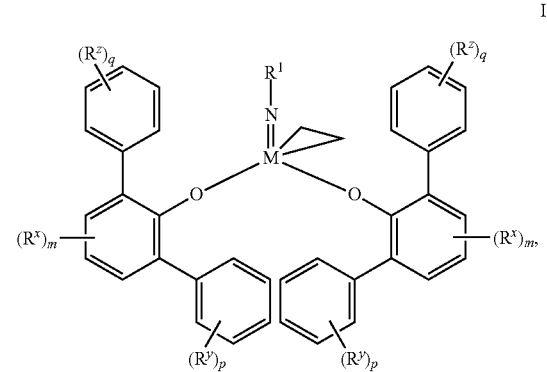

II-a with a ligand or ligand precursor comprising or having the structure of $R^5$.

27. A method for performing a metathesis reaction, comprising providing a compound of claim 15.

28. The method of claim 27, wherein the metathesis reaction is ring-opening metathesis polymerization (ROMP), and the ROMP polymer product is greater than about 95% isotactic and greater than about 95% cis.

29. A compound of formula V:

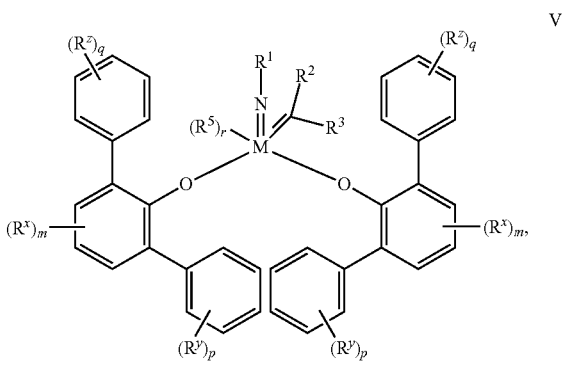

V wherein:

M is molybdenum or tungsten;

$R^1$ is an optionally substituted group selected from $C_{1-20}$ aliphatic, $C_{1-20}$ heteroaliphatic having 1-3 heteroatoms independently selected from nitrogen, oxygen, or sulfur, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur;

each of $R^2$ and $R^3$ is independently R', —OR', —SR', —N(R')$_2$, —OC(O)R', —SOR', —SO$_2$R', —SO$_2$N(R')$_2$, —C(O)N(R')$_2$, —NR'C(O)R', or —NR' SO$_2$R';

m is 0-3;

each of p and q is independently 0-5, and at least one of p and q is not 0;

r is 0-2;

each of $R^x$, $R^y$ and $R^z$ is independently an electron-withdrawing group;

each $R^5$ is independently a monodentate ligand, or two $R^5$ are optionally taken together to form a bidentate ligand; and each R' is independently hydrogen or an optionally substituted group selected from $C_{1-6}$ aliphatic, phenyl, a 3-7 membered saturated or partially unsaturated carbocyclic ring, an 8-10 membered bicyclic saturated, partially unsaturated or aryl ring, a 5-6 membered monocyclic heteroaryl ring having 1-4 heteroatoms independently selected from nitrogen, oxygen, or sulfur, a 3-7 membered saturated or partially unsaturated heterocyclic ring having 1-3 heteroatoms independently selected from nitrogen, oxygen, or sulfur, a 7-10 membered bicyclic saturated or partially unsaturated heterocyclic ring having 1-5 heteroatoms independently selected from nitrogen, oxygen, or sulfur, or an 8-10 membered bicyclic heteroaryl ring having 1-5 heteroatoms independently selected from nitrogen, oxygen, or sulfur; or:

two R' groups on the same nitrogen atom are optionally taken together with the nitrogen atom to form an optionally substituted 3-8 membered, saturated, partially unsaturated, or aryl ring having 1-4 heteroatoms independently selected from nitrogen, oxygen, or sulfur.

30. The compound of claim 29, wherein

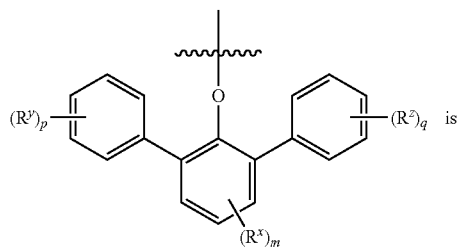

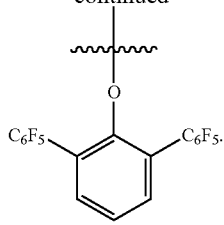

-continued

31. The compound of claim 30, wherein the compound is Mo(NC$_6$F$_5$)(CHCMe$_2$Ph)(DFTO)$_2$, Mo(NC$_6$F$_5$)(CHCH=C(Me)Ph)(DFTO)$_2$, Mo(N(2,6-i-Pr$_2$C$_6$H$_3$))(CHCMe$_2$Ph)(DFTO)$_2$, Mo(N(2,6-Me$_2$C$_6$H$_3$))(CHCMe$_2$Ph)(DFTO)$_2$, or Mo(N(1-adamantyl))(CHCMe$_2$Ph)(DFTO)$_2$, wherein DFTO is 2,6-(C$_6$F$_5$)$_2$C$_6$H$_3$O—.

32. A method for performing a metathesis reaction, comprising providing a compound of claim 29.

33. The method of claim 32, wherein the metathesis reaction is ring-opening metathesis polymerization (ROMP), and the ROMP product is greater than about 95% cis and greater than about 95% isotactic.

* * * * *